(12) United States Patent
Hitomi et al.

(10) Patent No.: US 12,469,729 B2
(45) Date of Patent: Nov. 11, 2025

(54) STORAGE SYSTEM

(71) Applicant: Kioxia Corporation, Tokyo (JP)

(72) Inventors: Tatsuro Hitomi, Hiratsuka Kanagawa (JP); Yasuhito Yoshimizu, Kawasaki Kanagawa (JP); Arata Inoue, Chigasaki Kanagawa (JP); Hiroyuki Dohmae, Yokohama Kanagawa (JP); Kazuhito Hayasaka, Tokyo (JP); Tomoya Sanuki, Yokkaichi Mie (JP)

(73) Assignee: Kioxia Corporation, Tokyo (JP)

( * ) Notice: Subject to any disclaimer, the term of this patent is extended or adjusted under 35 U.S.C. 154(b) by 244 days.

(21) Appl. No.: 18/371,669

(22) Filed: Sep. 22, 2023

(65) Prior Publication Data

US 2024/0014062 A1 Jan. 11, 2024

Related U.S. Application Data

(63) Continuation of application No. PCT/JP2021/011856, filed on Mar. 23, 2021.

(51) Int. Cl.
*H01L 21/677* (2006.01)
*H01L 21/68* (2006.01)

(52) U.S. Cl.
CPC .... *H01L 21/67781* (2013.01); *H01L 21/6773* (2013.01); *H01L 21/67766* (2013.01); *H01L 21/67769* (2013.01); *H01L 21/68* (2013.01)

(58) Field of Classification Search
CPC . H01L 21/67781; H01L 21/6773; G11C 5/04; G01R 31/2808; G01R 31/2868; G01R 31/2893; G01R 1/0491; G01R 31/318511

USPC ............ 324/756.01, 757.01, 756.03, 757.03
See application file for complete search history.

(56) References Cited

U.S. PATENT DOCUMENTS

| | | | |
|---|---|---|---|
| 5,945,834 | A | 8/1999 | Nakata |
| 6,005,401 | A | 12/1999 | Nakata et al. |
| 6,084,215 | A | 7/2000 | Furuya et al. |
| 6,297,658 | B1 | 10/2001 | Nakata et al. |
| 6,307,390 | B1 | 10/2001 | Akaike et al. |
| 6,317,647 | B1 | 11/2001 | Akaike et al. |
| 6,441,606 | B1 | 8/2002 | Caldwell et al. |
| 6,580,283 | B1 | 6/2003 | Carbone et al. |
| 7,091,733 | B2 | 8/2006 | Takekoshi et al. |

(Continued)

FOREIGN PATENT DOCUMENTS

| | | |
|---|---|---|
| JP | H8-5666 A | 1/1996 |
| JP | H10-284548 A | 10/1998 |

(Continued)

*Primary Examiner* — Roberto Velez
(74) *Attorney, Agent, or Firm* — Maier & Maier, PLLC

(57) ABSTRACT

According to one embodiment, when a first case-mounted memory device that includes a first memory device is not connected to a slot of a host apparatus and is stored in a second stocker, the host apparatus causes a second transport device to transport the first case-mounted memory device to the slot, and to connect it thereto. When the first case-mounted memory device is not connected to the slot and is not stored in the second stocker, the host apparatus causes a first transport device to transport the first memory device from a first stocker to a mounter, causes the mounter to mount the first memory device in a case, and causes the second transport device to transport the first case-mounted memory device to the slot and to connect it thereto.

20 Claims, 44 Drawing Sheets

(56) References Cited

U.S. PATENT DOCUMENTS

| | | | |
|---|---|---|---|
| 7,719,300 B2 | 5/2010 | Washio et al. | |
| 7,800,382 B2 | 9/2010 | Lindsey et al. | |
| 7,884,631 B2 * | 2/2011 | Co | G11C 29/56 |
| | | | 324/757.04 |
| 8,314,626 B2 | 11/2012 | Di Lello | |
| 8,872,532 B2 | 10/2014 | Breinlinger et al. | |
| 10,649,022 B2 | 5/2020 | Jovanovic et al. | |
| 2008/0038098 A1 * | 2/2008 | Ito | G01R 31/31718 |
| | | | 414/222.01 |
| 2011/0037492 A1 | 2/2011 | Seubert et al. | |
| 2020/0249272 A1 | 8/2020 | Nam et al. | |
| 2020/0379037 A1 | 12/2020 | Endo | |
| 2021/0149568 A1 * | 5/2021 | Yoshimizu | G06F 3/0679 |
| 2022/0204270 A1 | 6/2022 | Yoshimizu et al. | |
| 2022/0206058 A1 | 6/2022 | Motomura | |
| 2022/0223552 A1 | 7/2022 | Yoshimizu et al. | |

FOREIGN PATENT DOCUMENTS

| | | |
|---|---|---|
| JP | H11-121548 A | 4/1999 |
| JP | H11-121549 A | 4/1999 |
| JP | H11-121550 A | 4/1999 |
| JP | H11-121551 A | 4/1999 |
| JP | H11-121555 A | 4/1999 |
| JP | H11-121569 A | 4/1999 |
| JP | H11-135582 A | 5/1999 |
| JP | H11-145217 A | 5/1999 |
| JP | H11-145224 A | 5/1999 |
| JP | H11-145226 A | 5/1999 |
| JP | H11-145271 A | 5/1999 |
| JP | H11-297796 A | 10/1999 |
| JP | H11-330207 A | 11/1999 |
| JP | 2000-12637 A | 1/2000 |
| JP | 2000-164647 A | 6/2000 |
| JP | 2001-338952 A | 12/2001 |
| JP | 2002-228718 A | 8/2002 |
| JP | 2003-504890 A | 2/2003 |
| JP | 2003-168709 A | 6/2003 |
| JP | 2003-297887 A | 10/2003 |
| JP | 2004-228311 A | 8/2004 |
| JP | 2004-228313 A | 8/2004 |
| JP | 2004-356641 A | 12/2004 |
| JP | 2008-177562 A | 7/2008 |
| JP | 2008-227148 A | 9/2008 |
| JP | 2010-93085 A | 4/2010 |
| JP | 2010-527515 A | 8/2010 |
| JP | 2011-508432 A | 3/2011 |
| JP | 2013-516770 A | 5/2013 |
| JP | 2020-511788 A | 4/2020 |
| JP | 2020-194889 A | 12/2020 |
| JP | 2020-198354 A | 12/2020 |
| WO | 01/04643 A1 | 1/2001 |
| WO | 2018/160557 A1 | 9/2018 |
| WO | 2021/095251 A1 | 5/2021 |
| WO | 2021/095252 A1 | 5/2021 |

* cited by examiner

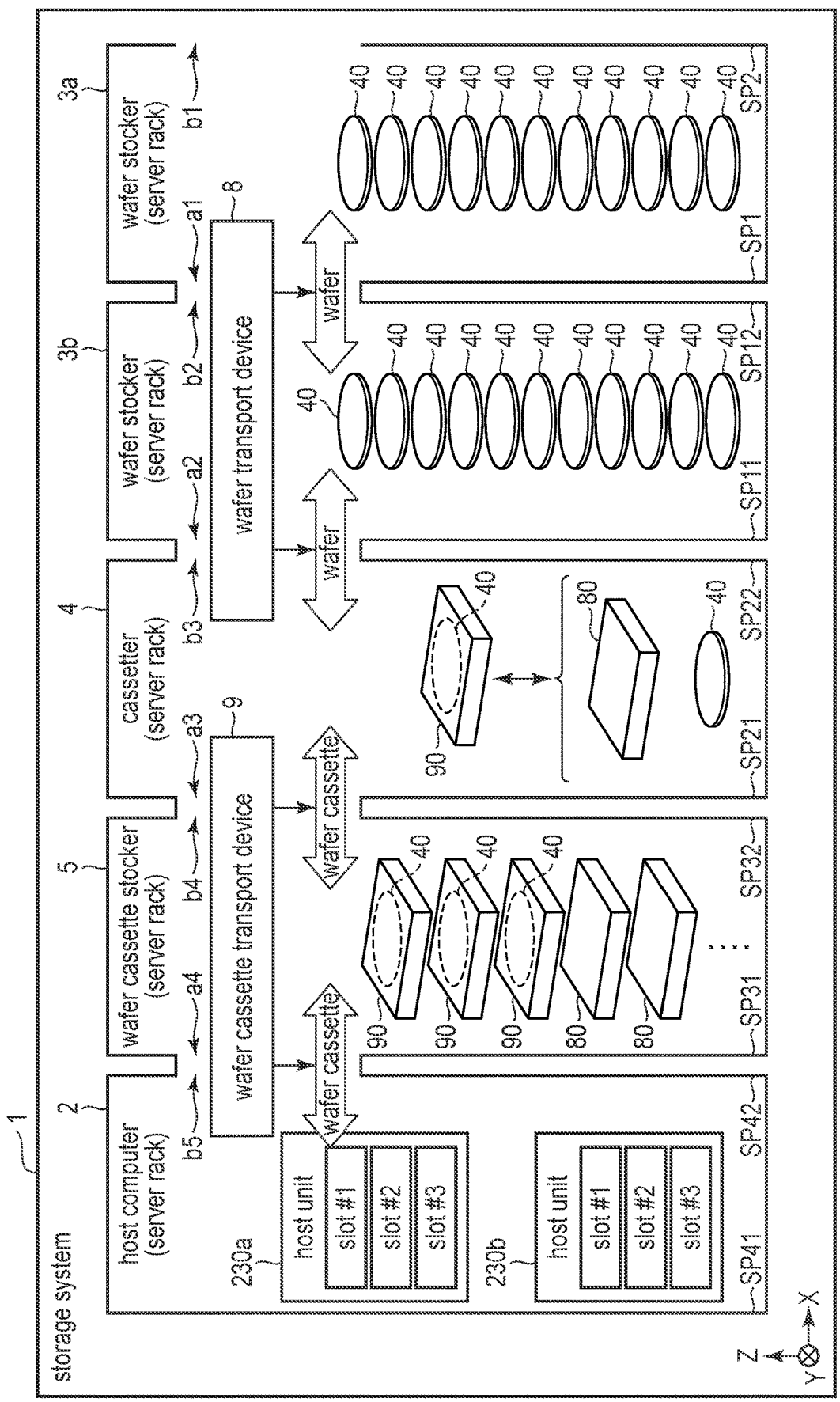
F I G. 1

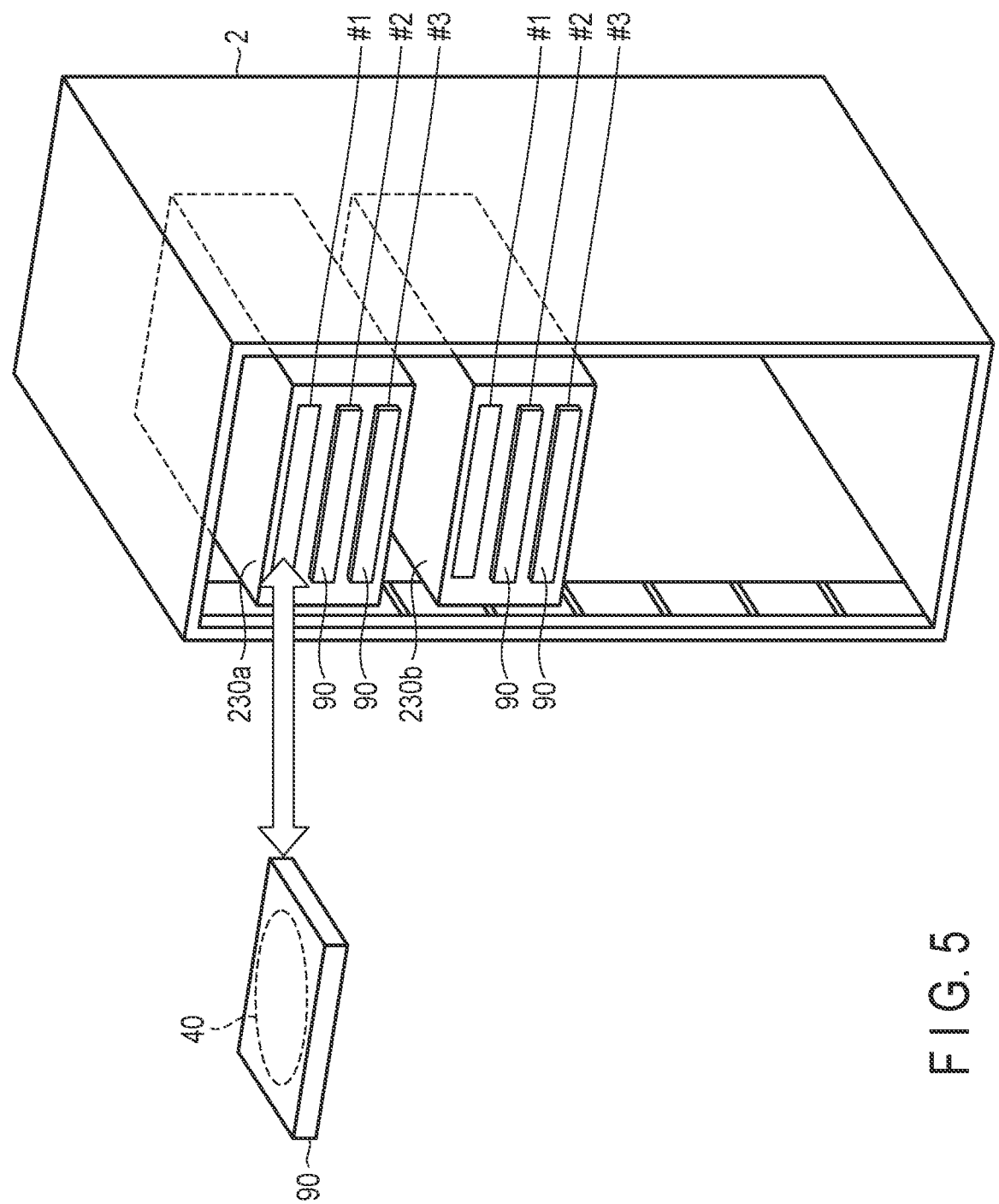
F I G. 5

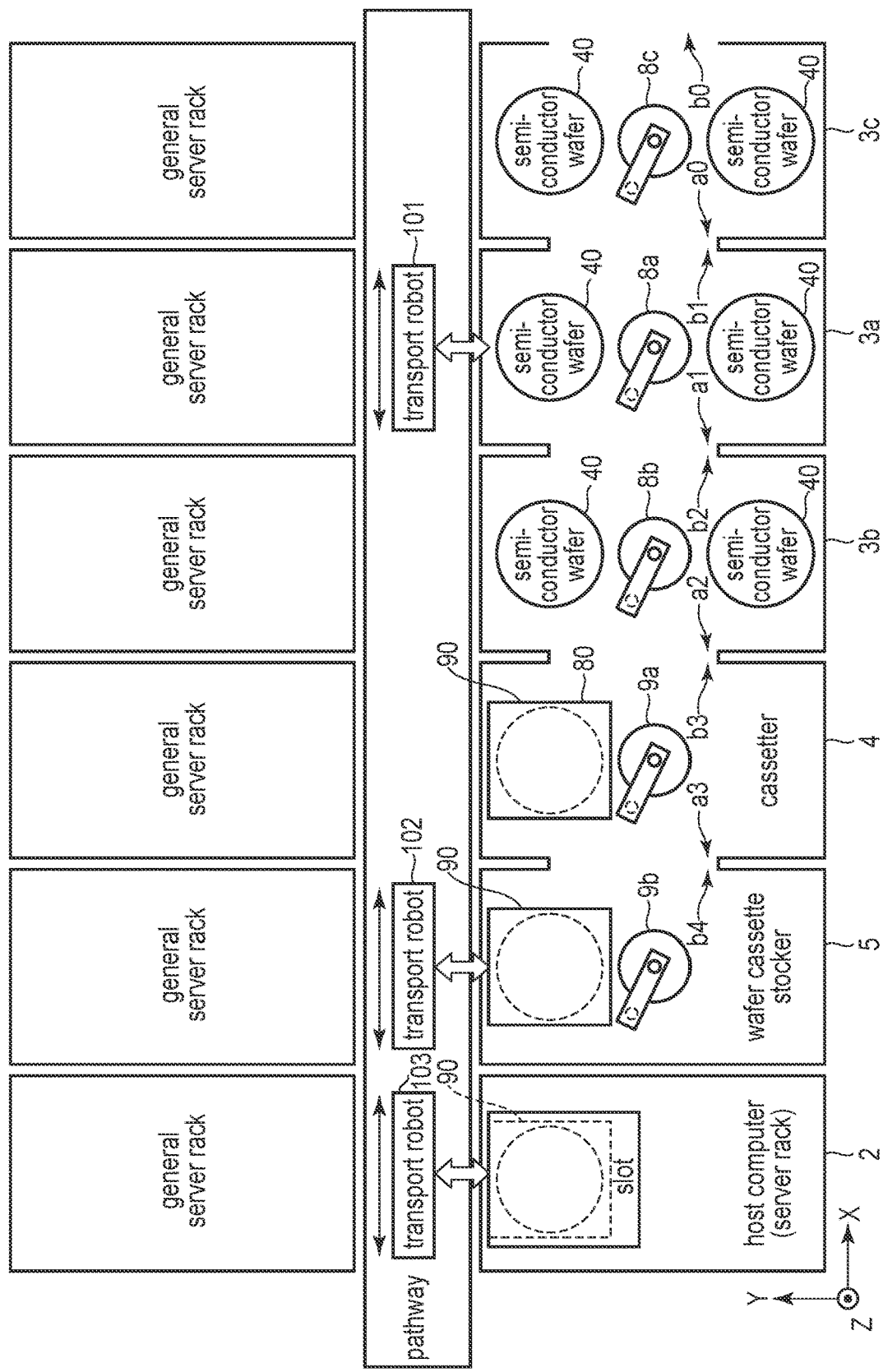
F I G. 10

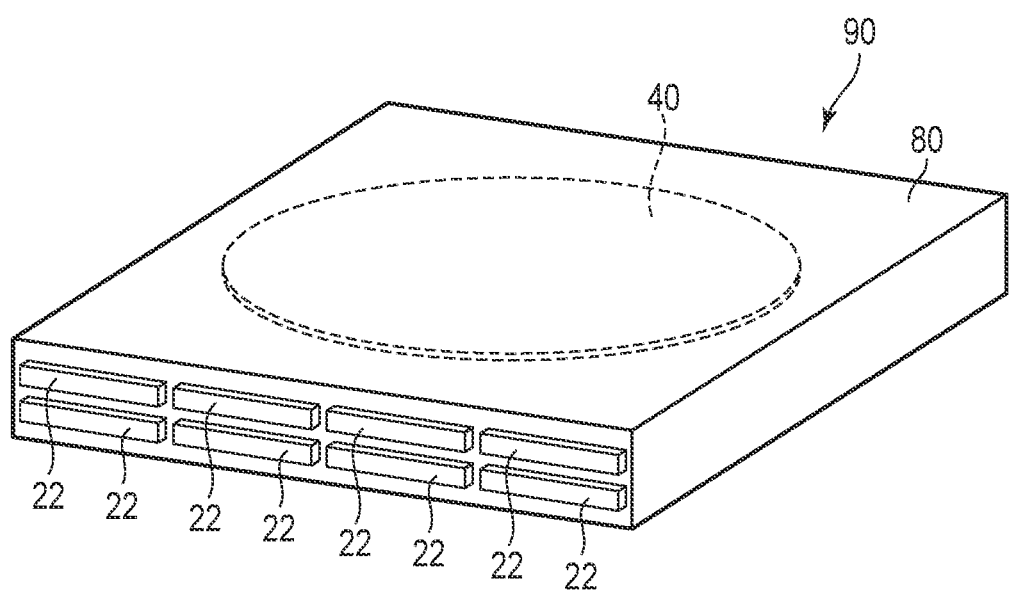
F I G. 12

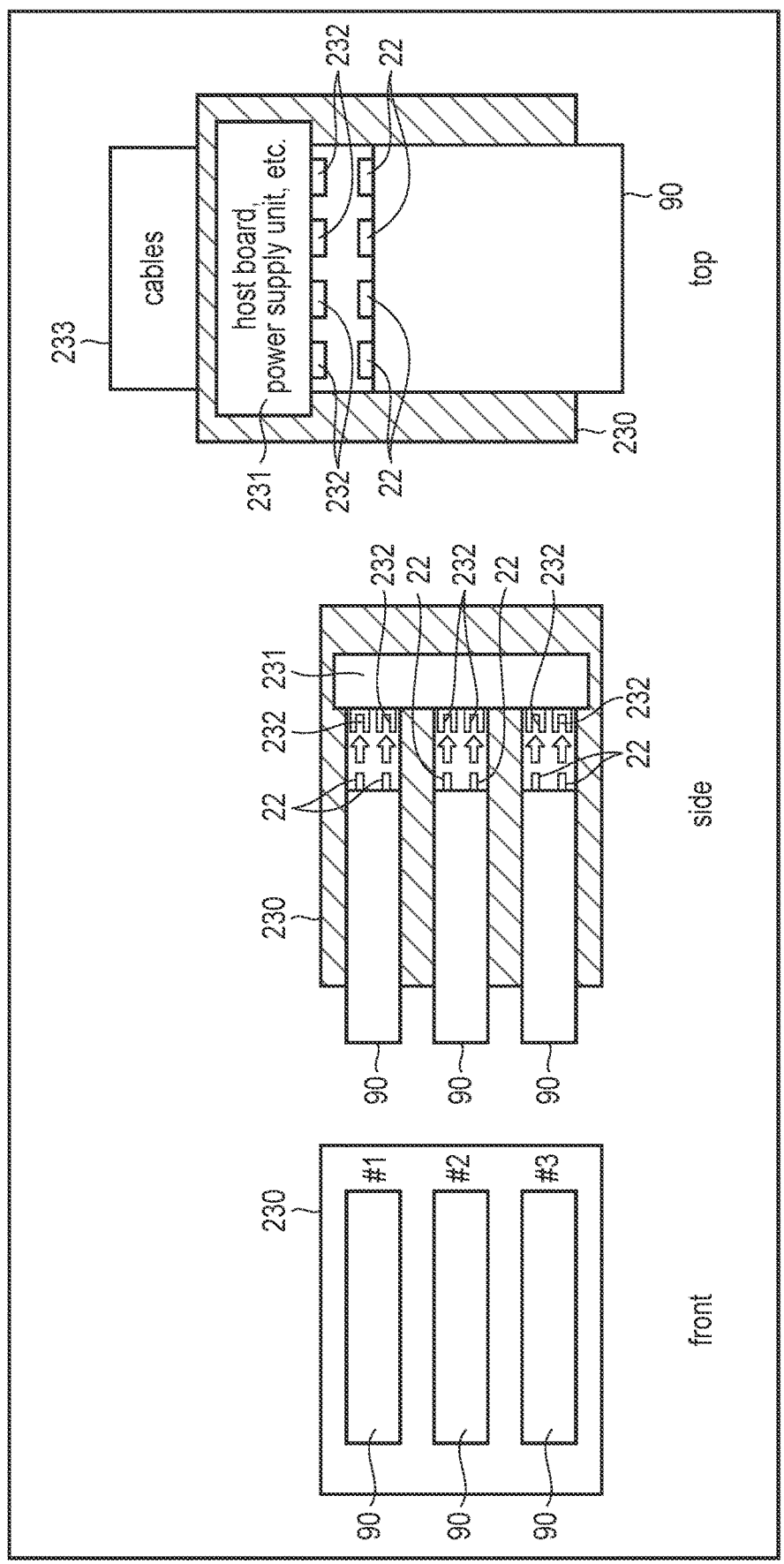
F I G. 13

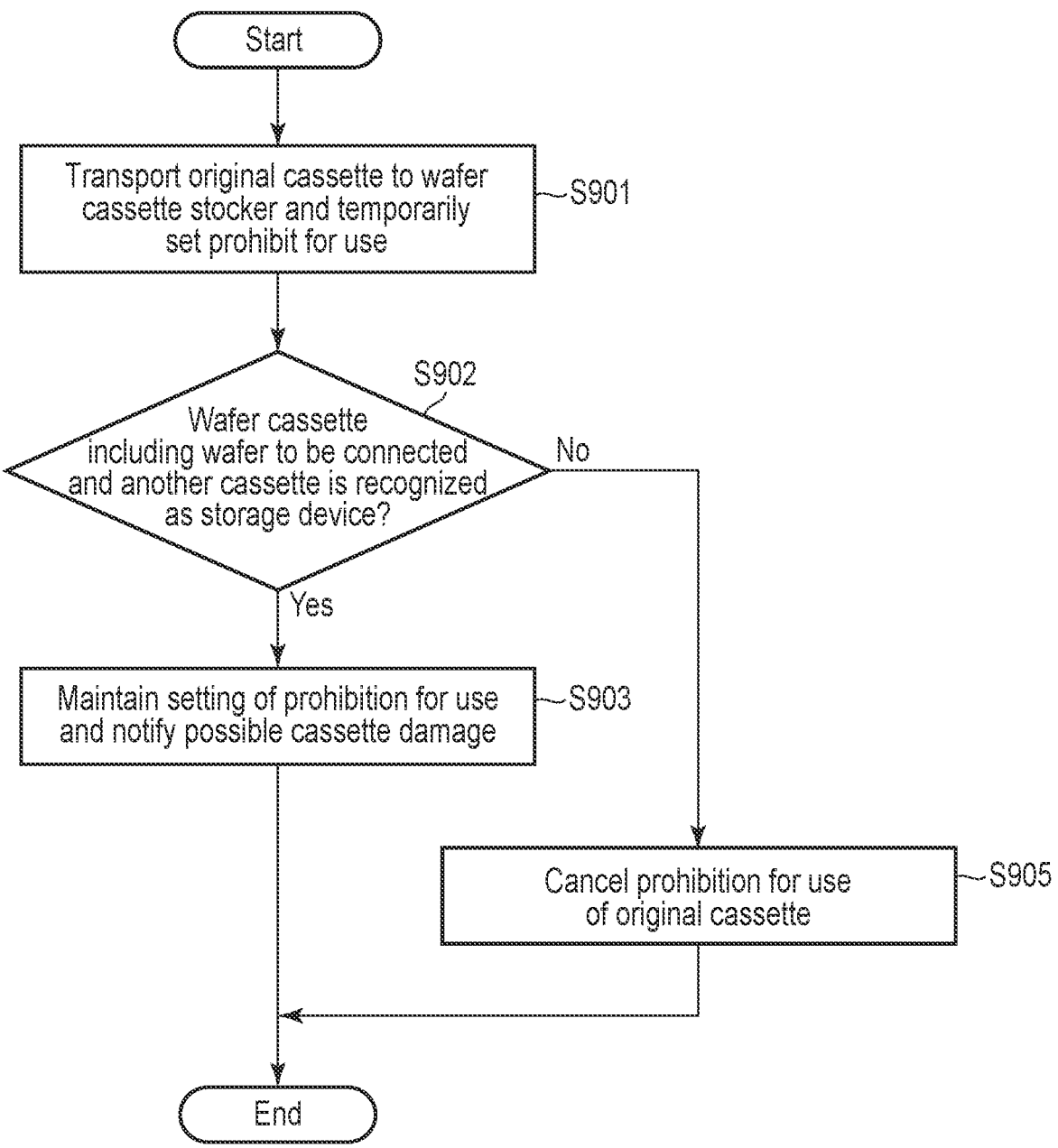
F I G. 25

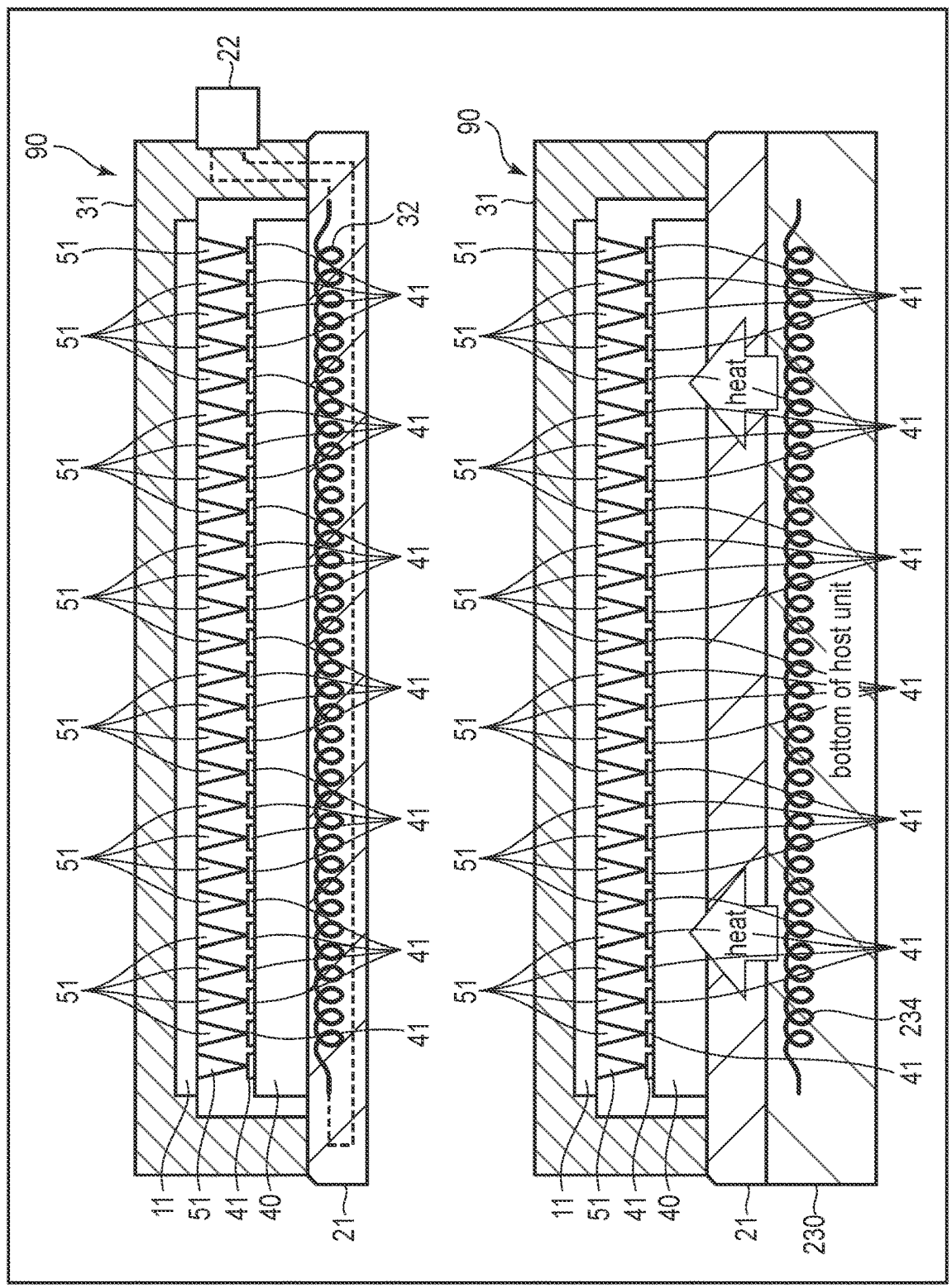
F I G. 26

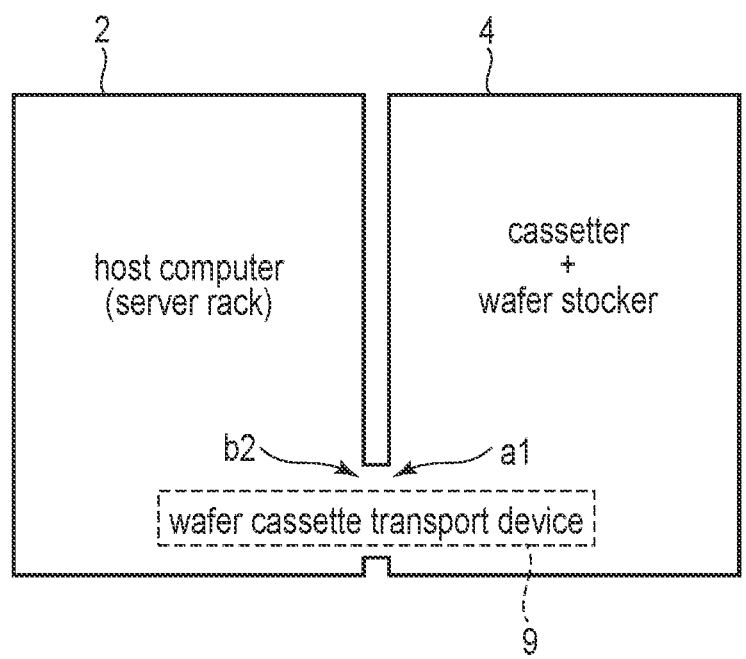
F I G. 30

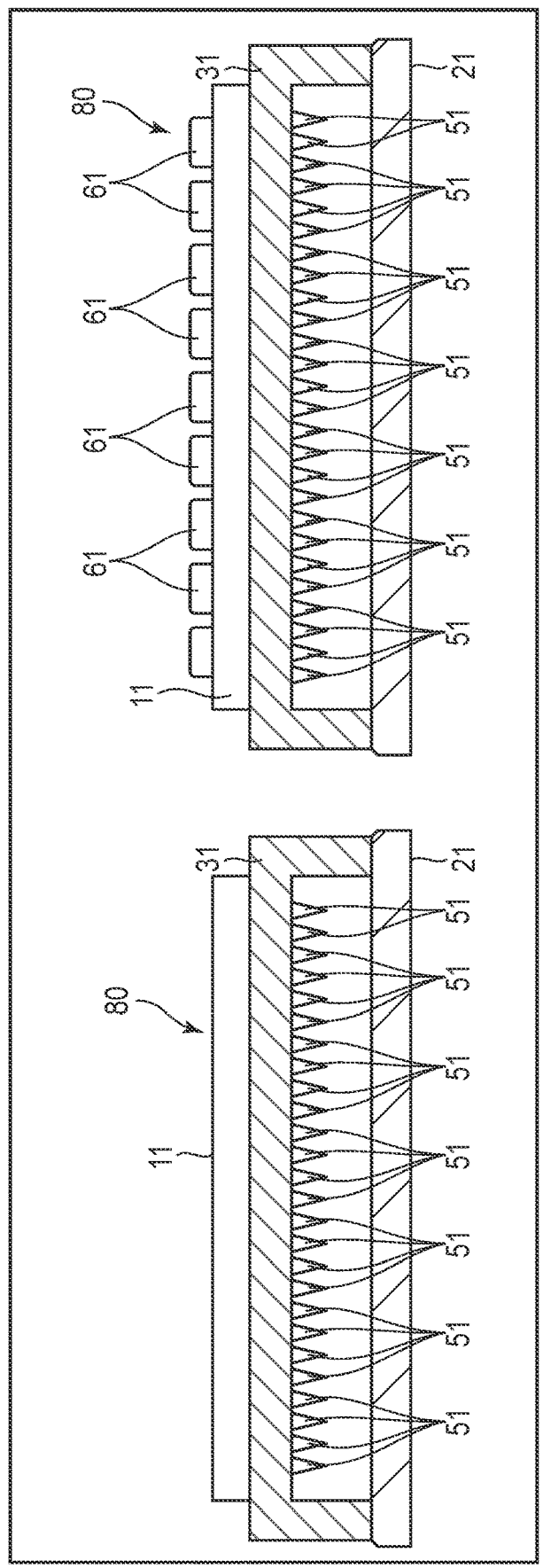
F I G. 33

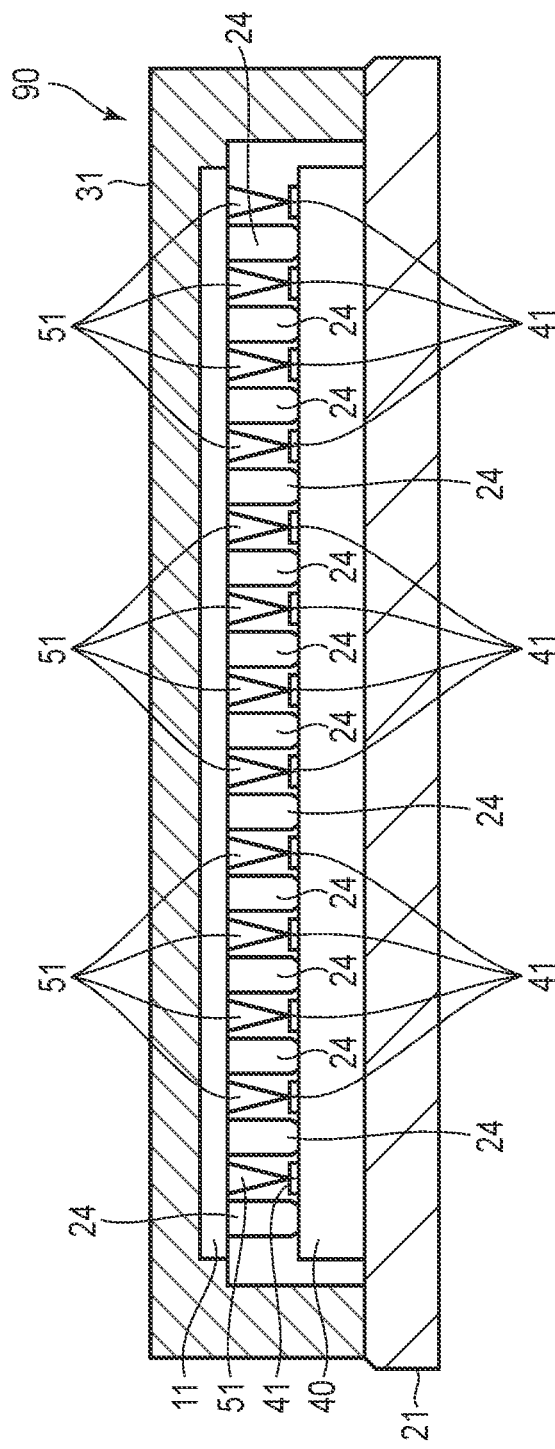
F I G. 36

STORAGE SYSTEM

CROSS-REFERENCE TO RELATED APPLICATIONS

This application is a Continuation Application of PCT Application No. PCT/JP2021/011856, filed Mar. 23, 2021, the entire contents of which are incorporated herein by reference.

FIELD

Embodiments described herein relate generally to technology for controlling nonvolatile memories.

BACKGROUND

Storage devices implemented with a nonvolatile memory have recently become widespread. As one of such storage devices, a solid state drive (SSD) implemented with a NAND flash memory has been known.

The SSD is used as a storage in various computers. Recently, the SSD is used as a storage in data centers as well.

In data centers, it is necessary to write and read large amounts of data at high speeds.

Under these circumstances, there is a need to realize a new storage system that is useful for processing large amounts of data.

BRIEF DESCRIPTION OF THE DRAWINGS

FIG. 1 is a diagram illustrating an example of a configuration of a storage system according to an embodiment.

FIG. 5 is a diagram illustrating an example of a configuration of a host computer according to the embodiment.

FIG. 10 is a plan view illustrating an example of arrangement of the wafer transport device and a plurality of robot arms used as the wafer cassette transport device, according to the embodiment.

FIG. 12 is a diagram illustrating an example of a configuration of the wafer cassette according to the embodiment.

FIG. 13 is a diagram illustrating an example of a configuration of a host apparatus according to the embodiment.

FIG. 25 is a flowchart illustrating a procedure of processing on a cassette case that is prohibited to be used, as executed by the host apparatus according to the embodiment.

FIG. 26 is a diagram illustrating a configuration for raising the temperature of a semiconductor wafer included in a wafer cassette according to the embodiment.

FIG. 30 is a diagram illustrating a configuration of a cassetter according to the embodiment.

FIG. 33 is a diagram illustrating still another example of the configuration of the cassette case according to the embodiment.

FIG. 36 is a diagram illustrating still another example of the configuration of the cassette case according to the embodiment.

DETAILED DESCRIPTION

Figure 2:
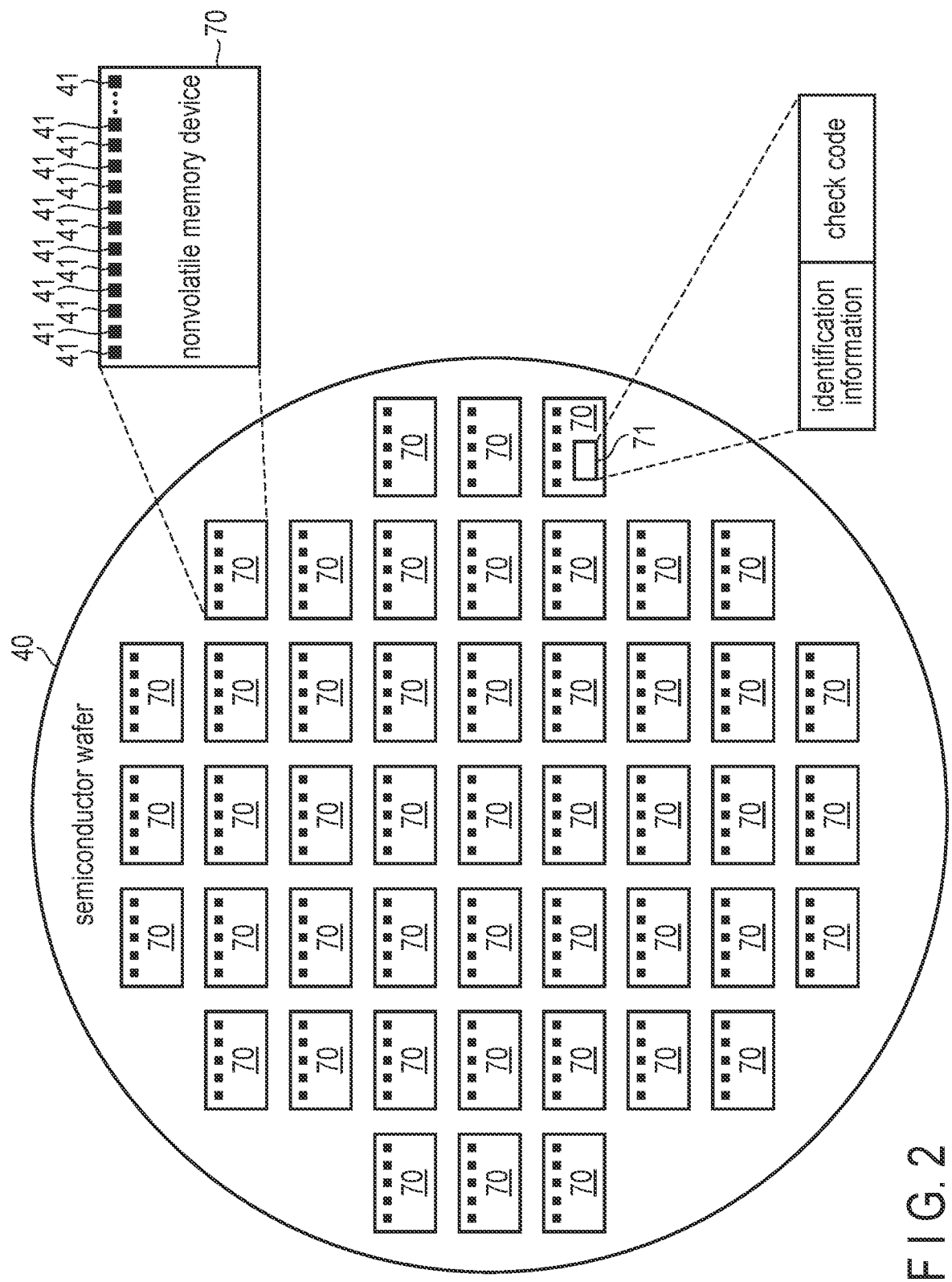
FIG. 2 is a diagram illustrating an example of a configuration of a semiconductor wafer according to the embodiment.

Various embodiments will be described hereinafter with reference to the accompanying drawings.

In general, according to one embodiment, a storage system comprises a first stocker, a mounter, a second stocker, a host apparatus, a first transport device, and a second transport device. The first stocker is capable of storing a plurality of memory devices, each of the plurality of memory devices including a plurality of non-volatile memory chips. The mounter is configured to mount at least one of the plurality of memory devices in a case. The second stocker is capable of storing a case-mounted memory device, the case-mounted memory device including the case and the at least one of the plurality of memory devices mounted in the case. The host apparatus includes at least one slot to which the case-mounted memory device is connectable. The host apparatus is configured to read or write data from or to the at least one of the plurality of memory devices included in the case-mounted memory device connected to the slot. The first transport device is configured to transport the plurality of memory devices between the first stocker and the mounter. The second transport device is configured to transport the case-mounted memory device among the mounter, the second stocker, and the host apparatus. The host apparatus determines a first memory device to be accessed among the plurality of memory devices. When a first case-mounted memory device, which is the case-mounted memory device that includes the first memory device, is connected to the slot of the host apparatus, the host apparatus executes reading or writing of data from or to the first memory device. When the first case-mounted memory device is not connected to the slot of the host apparatus and is stored in the second stocker, the host apparatus causes the second transport device to transport the first case-mounted memory device to the slot of the host apparatus, and to connect the first case-mounted memory device to the slot. When the first case-mounted memory device is not connected to the slot of the host apparatus and is not stored in the second stocker, the host apparatus causes the first transport device to transport the first memory device from the first stocker to the mounter, causes the mounter to mount the transported first memory device in the case for assembling the first case-mounted memory device, and causes the second transport device to transport the first case-mounted memory device to the slot of the host apparatus, and to connect the first case-mounted memory device to the slot.

First, a configuration of a storage system according to an embodiment will be described. FIG. 1 is a diagram illustrating an example of a configuration of a storage system 1 according to the embodiment. The storage system 1 may be used in a data center.

In the descriptions of the embodiment, each of an X-axis, a Y-axis, and a Z-axis is defined. The X-axis, Y-axis, and Z-axis intersect orthogonal to each other. An X-Y plane defined by the X-axis and Y-axis corresponds to a floor of the data center. The Z-axis corresponds to a height direction of the data center.

The storage system 1 includes a host computer 2, wafer stockers 3, a cassetter 4, a wafer cassette stocker 5, a wafer transport device 8, and a wafer cassette transport device 9.

FIG. 1 illustrates an example case where the host computer 2, the wafer cassette stocker 5, the cassetter 4, and the wafer stockers 3 (two wafer stockers 3b and 3a) are aligned in a single row along the X-axis direction.

In this case, the X-axis is along the width of each of the host computer 2, the wafer cassette stocker 5, the cassetter 4, and the wafer stocker 3. The Y-axis is along the depth of each of the host computer 2, the wafer cassette stocker 5, the cassetter 4, and the wafer stockers 3. The Z-axis is along the height of each of the host computer 2, the wafer cassette stocker 5, the cassetter 4, and the wafer stockers 3.

The storage system 1 uses a semiconductor wafer 40 as a storage medium. The semiconductor wafer 40 includes a plurality of non-volatile memory devices. The storage system 1 is configured to write data to the nonvolatile memory devices in the semiconductor wafer 40 and to read data from the nonvolatile memory devices in the semiconductor wafer 40. Each of the non-volatile memory devices in the semiconductor wafer 40 is, for example, a NAND flash memory.

Usually, nonvolatile memory devices formed in a semiconductor wafer are cut out as chips by dicing. The cut-out chips each may as well be referred to as a nonvolatile memory die. By contrast, in the storage system 1, the semiconductor wafer 40 itself, which includes multiple nonvolatile memory devices, is used as a storage medium. The semiconductor wafer 400 utilized in the storage system 1 has a thickness of, for example, 500 µm or more.

A semiconductor wafer before non-volatile memory devices formed therein are cut out as chips, may be used as the semiconductor wafers 40. Or, a semiconductor wafer obtained by performing a remounting process of gathering nonvolatile memory dies which are cut out from several semiconductor wafers, may be used as the semiconductor wafer 40.

Here, an example of a configuration of a storage system according to a comparative example will be described. The storage system according to the comparative example uses semiconductor wafers as storage media. The storage system according to the comparative example includes a prober and a host apparatus. The prober includes a probe card and a stage. In the storage system according to the comparative example, the host apparatus connected to the prober performs writing and reading of data to and from a semiconductor wafer placed on the stage via the probe card.

However, with the configuration of the comparative example, while a semiconductor wafer is being accessed by the host apparatus, the prober is occupied only by this semiconductor wafer. In order for the host apparatus to access another semiconductor wafer to be accessed, it is necessary to remove the semiconductor wafer currently placed on the stage from the prober and place said another semiconductor wafer on the stage. Further, it is necessary to align the multiple probe pins of the probe card with the multiple electrodes of said another semiconductor wafer to be accessed on the stage.

As a result, a certain amount of time (latency) is required until the host apparatus can actually read or write data with respect to said another semiconductor wafer to be accessed, which is placed on the stage.

Here, in order to shorten this latency, it is necessary to transfer the semiconductor wafer from the wafer stocker to the prober at high speed. In this case, however, the semiconductor wafer may be undesirably damaged.

In the storage system 1 of the embodiment, instead of the host apparatus accessing a semiconductor wafer 40 via the prober, a wafer cassette 90 is used as a storage device accessible by the host apparatus. The wafer cassette 90 includes a cassette case 80 and a semiconductor wafer 40.

The host computer 2 includes a host unit 230. FIG. 1 illustrates an example case in which two host units 230a and 230b are included in the host computer 2. Note here that the number of host units 230 included in the host computer 2 may be one, three, or more.

The host unit 230 includes a slot. At least one wafer cassette 90 can be connected to the slot. FIG. 1 illustrates an example case in which three slots (slots #1 to #3) are included in the host unit 230. Note that the number of slots included in the host unit 230 may be two or less, or four or more.

The host unit 230 functions as a host apparatus configured to read and write data with respect to the semiconductor wafer 40 (more particularly, each nonvolatile memory device included in the semiconductor wafer 40) included in the wafer cassette 90 connected to the slot. Further, the host unit 230 is configured to communicate with the cassetter 4, the wafer transport device 8, and the wafer cassette transport device 9, via an interface. This interface conforms to, for example, a standard of Ethernet (registered trademark).

In the data center, a plurality of server racks are provided. The server racks are racks for accommodating computers and communication devices therein. The size and shape of the server racks are standardized, for example, by the Electronic Industries Association of America (EIA).

For example, a 19-inch rack has a width of 19 inches and a height for one unit of 1.75 inches. In data centers, for example, 19-inch rack with a height of 42 units (19-inch 42U rack) is often used.

In this embodiment, the host computer 2 includes a server rack such as a 19-inch rack.

The host unit 230 has a size that can be accommodated in the server rack. The host unit 230 has a height that is an integer multiple of the height of one unit, for example. More specifically, the host unit 230 may have a size that can be accommodated in the space of one unit of the server rack. The host unit 230 may have a size that can be accommodated in the space of two units of the server rack. The host unit 230 may have a size that can be accommodated in the space of three or more units of the server rack.

The host unit 230 includes a host case, a system board, and a power supply unit.

The host case includes at least one slot to which a wafer cassette 90 is capable of being connected. The system board is a printed circuit board on which various electronic components (a processor, a memory, a system controller, a communication interface controller, and the like) are mounted. The power supply unit is a power supply circuit that supplies power to the various electronic components mounted on the system board and the wafer cassette 90 connected to the slot.

The wafer stocker 3 is capable of storing a plurality of semiconductor wafers 40. Similarly to the case of the host computer 2, the case of the wafer stocker 3 may also be realized using a server rack such as a 19-inch rack.

FIG. 1 illustrates an example case in which two wafer stockers 3a and 3b are provided in the storage system 1. Note here that the number of wafer stockers 3 provided in the storage system 1 may be one, three, or more.

In consideration of the data retention characteristics of non-volatile memories such as NAND flash memories, it is preferable that the semiconductor wafers 40 be stored at low temperature below room temperature (for example, 15 to 25° C.). By storing the semiconductor wafer 40 at low temperature, the retention period of the electric charge stored in each memory cell of the NAND flash memory can be extended.

Accordingly, the wafer stocker 3 may include a temperature control device provided therein for cooling the semiconductor wafers 40. The temperature control device may be, for example, a cooling fan.

The cassetter 4 assembles, from a semiconductor wafer 40 and a cassette case 80, a wafer cassette 90 including the semiconductor wafer 40. The cassetter 4 also disassembles the wafer cassette 90 and executes an operation to remove the semiconductor wafer 40 from the wafer cassette 90. Similarly to the case of the host computer 2, the case of the cassetter 4 may also be realized using a server rack such as a 19-inch rack.

The wafer cassette stocker 5 is capable of storing a plurality of wafer cassettes 90. Similarly to the case of the host computer 2, the case of the wafer cassette stocker 5 may also be realized using a server rack such as of a 19-inch rack. The wafer cassette stocker 5 can be used to store not only a plurality of wafer cassettes 90, but also a plurality of empty cassette cases 80. The empty cassette cases 80 are cassette cases 80 that do not include any semiconductor wafers 40.

The wafer transport device 8 is configured to transport semiconductor wafers 40 between the wafer stocker 3 and the cassetter 4.

The wafer cassette transport device 9 is configured to transport wafer cassettes 90 among the cassetter 4, the wafer cassette stocker 5, and the host computer 2.

The case of the wafer stocker 3a includes a side plate SP1 and a side plate SP2 located on an opposite side to the side plate SP1 with respect to the X-axis direction. The side plate SP1 may include an opening a1 formed therein. The side plate SP2 may include an opening b1 formed therein. Each of the openings a1 and b1 has such a size that the semiconductor wafer 40 is able to pass through.

The case of the wafer stocker 3*b* includes a side plate SP11 and a side plate SP12 located on an opposite side to the side plate SP11 with respect to the X-axis direction. The side plate SP12 is opposes the side plate SP1 of the wafer stocker 3*a*. The side plate SP11 may include an opening a2 formed therein. The side plate SP12 may include an opening b2 formed therein. The opening b2 may be formed in a position opposing the opening a1. Each of the opening a2 and the opening b2 has such a size that the semiconductor wafer 40 is able to pass through.

The wafer transport device 8 may transport the semiconductor wafer 40 between the wafer stocker 3*a* and the wafer stocker 3*b* through the openings a1 and b2. In this case, the space between the opening a1 and the opening b2 serves as an internal transport path crossing between the wafer stocker 3*a* and the wafer stocker 3*b*. The space between the opening a1 and the opening b2 may be covered by a cover member to prevent dust and dirt from entering.

The case of the cassetter 4 includes a side plate SP21 and a side plate SP22 located on an opposite side to the side plate SP21 with respect to the X-axis direction. The side plate SP22 opposes the side plate SP11 of the wafer stocker 3*b*. The side plate SP21 may include an opening a3 formed therein. The side plate SP22 may include an opening b3 formed therein. The opening b3 may be formed in a position opposing the opening a2. Each of the opening a3 and opening b3 has such a size that the semiconductor wafer 40 is able to pass through.

The wafer transport device 8 may transport the semiconductor wafer 40 between the wafer stocker 3*b* and the cassetter 4 through the openings a2 and b3. The space between the opening a2 and the opening b3 serves as an internal transport path crossing between the wafer stocker 3*b* and the cassetter 4. The space between the opening a2 and the opening b3 may be covered by a cover member to prevent dust and dirt from entering.

The case of the wafer cassette stocker 5 includes a side plate SP31 and a side plate SP32 located on an opposite side to the side plate SP31 with respect to the X-axis direction. The side plate SP32 opposes the side plate SP21 of the cassetter 4. The side plate SP31 may include an opening a4 formed therein. The side plate SP32 may include an opening b4 formed therein. The opening b4 may be formed in a position opposing the opening a3. Each of the opening a4 and the opening b4 has such a size that the wafer cassette 90 is able to pass through.

The wafer cassette transport device 9 may transport the wafer cassette 90 between the cassetter 4 and the wafer cassette stocker 5 through the opening a3 and the opening b4. The space between the opening a3 and the opening b4 serves as an internal transport path crossing between the cassetter 4 and the wafer cassette stocker 5. The space between the opening a3 and the opening b4 may be covered by a cover member to prevent dust and dirt from entering.

The server rack of the host computer 2 includes a side plate SP41 and a side plate SP42 located on an opposite side to the side plate SP41 with respect to the X-axis direction. The side plate SP42 opposes the side plate SP31 of the wafer cassette stocker 5. The side plate SP42 may include an opening b5 formed therein. The opening b5 may be formed in a position opposing the opening a4. The opening b5 has such a size that the wafer cassette 90 is able to pass through.

The wafer cassette transport device 9 may transport the wafer cassette 90 between the wafer cassette stocker 5 and the host computer 2 through the openings a4 and b5. The space between the opening a4 and the opening b5 serves as an internal transport path crossing between the wafer cassette stocker 5 and the host computer 2. The space between the opening a4 and the opening b5 may be covered by a cover member to prevent dust and dirt from entering.

With the configuration of transporting the semiconductor wafer 40 through the internal transport path crossing between the wafer stocker 3 and the cassette stocker 4, and also transporting the wafer cassette 90 through the internal transport path crossing among the cassette stocker 4, the wafer cassette stocker 5, and the host computer 2, it is possible to move the required semiconductor wafer 40 or the required wafer cassette 90 quickly to the required location.

Thus, it is possible to reduce, for example, the time required to assemble the wafer cassette 90 to be accessed, including the semiconductor wafer 40 to be accessed, and the time required to transport the wafer cassette 90 to be accessed, to the slot in the host unit 230, and connect the wafer cassette 90 to the slot. Here, the semiconductor wafer 40 to be accessed is a semiconductor wafer 40 from or to which data is to be read or written by the host apparatus (the host unit 230). Further, the wafer cassette 90 to be accessed is a wafer cassette 90 that includes a semiconductor wafer 40 to be accessed.

Note that as the wafer transport device 8, such a transport device can be used as well that transports a semiconductor wafer 40 between the wafer stocker 3 and the cassetter 4 without using the internal transport path crossing between the wafer stocker 3 and the cassetter 4. As such a wafer transport device 8, for example, a transport robot (see FIG. 6) that moves on pathways in the floor of the data center can be used.

Similarly, as the wafer cassette transport device 9, such a transport device can be used as well that transports a wafer cassette 90 among the cassetter 4, the wafer cassette stocker 5, and the host computer 2, without using the internal transport path crossing among the cassetter 4, the wafer cassette stocker 5, and the host computer 2. As such a wafer cassette transport device 9 also, for example, a transport robot (see FIG. 6) that moves on the pathways in the floor of the data center can be used as well.

Next, a basic operation of the storage system 1 will now be described. The host unit 230 has a location management function and a transport control function. The location management function manages the locations where the plurality of semiconductor wafers 40 are respectively located. The transport control function controls the transport of the semiconductor wafers 40 and the wafer cassettes 90 by controlling the cassetter 4, the wafer transport device 8, and the wafer cassette transport device 9.

A wafer identifier is assigned to each of the plurality of semiconductor wafers 4. The host unit 230 may manage the correspondence between the wafer identifier and the location where the semiconductor wafer 40 identified by this wafer identifier is located.

The location where a semiconductor wafer 40 can be present is, for example, any one of a plurality of slots in the host unit 230, any one of a plurality of wafer cassette storage locations in the wafer cassette stocker 5, or any one of a plurality of wafer cassette storage locations in the wafer stocker 3.

The host unit 230 determines a semiconductor wafer 40 to be accessed, among the plurality of semiconductor wafers 40. The host unit 230 identifies the location associated with the wafer identifier of the semiconductor wafer 40 to be accessed, thereby making it possible to determining whether a wafer cassette 90 to be accessed is connected to any slot in the host unit 230 and whether the wafer cassette 90 to be accessed is stored in the wafer cassette stocker 5.

In the case where the wafer cassette 90 to be accessed is connected to any one of the slots of the host unit 230, the host unit 230 transmits a read request or write request to the wafer cassette 90 to be accessed. Thus, the host unit 230 executes read or write of data with respect to the semiconductor wafer 40 to be accessed.

In the case where the wafer cassette 90 to be accessed is not connected to any slot of the host unit 230 and is stored in the wafer cassette stocker 5, the host unit 230 causes the wafer cassette transport device 9 to transport the wafer cassette 90 to be accessed, from the wafer cassette stocker 5 to one of the slots of the host unit 230, and to connect the wafer cassette 90 to be accessed, to the one of the slots. In this case, the host unit 230 can transmit the following transport request to the wafer cassette transport device 9.

This transport request, for example, designates the location in the wafer cassette stocker 5 where the wafer cassette 90 to be accessed is stored (a wafer cassette storage location), as a movement source location, and also designates any one slot in the host unit 230 as a movement destination location. The wafer cassette transport device 9 transports the wafer cassette 90 to be accessed from the designated movement source location to the designated destination location.

In the case where the wafer cassette 90 to be accessed is not connected to any slot of the host unit 230 and is not stored in the wafer cassette stocker 5, the host unit 230 causes the wafer transport device 8 to transport the semiconductor wafer 40 to be accessed, from the wafer stocker 3 to the cassetter 4. In this case, the host unit 230 may transmit the following transport request to the wafer transport device 8.

This transport request designates the location in the wafer stocker 3 where the semiconductor wafer 40 to be accessed is present (wafer storage location), as a movement source location, and also designates the cassetter 4 as a movement destination location. The wafer transport device 8 transports the semiconductor wafer 40 to be accessed from the designated movement source location to the designated movement destination location.

Further, the host unit 230 causes the cassetter 4 to assemble the wafer cassette 90 to be accessed, from the transported semiconductor wafer 40 to be accessed and a cassette case 80. Then, the host unit 230 causes the wafer cassette transport device 9 to transport the assembled wafer cassette 90 to be accessed, from the cassetter 4 to one of the slots of the host unit 230, and to connect the assembled wafer cassette 90 to the one of the slots. In this case, the host unit 230 may transmit the following transport request to the wafer cassette transport device 9.

This transport request, for example, designates the cassetter 4 as a movement source location, and also designates any one of the slots in the host unit 230 as a movement destination location. The wafer cassette transport device 9 transports the wafer cassette 90 to be accessed from the designated movement source location to the designated movement destination location.

Thus, the host unit 230 can read or write data with respect to any semiconductor wafer 40 of the plurality of semiconductor wafers 40 by controlling the transport of the semiconductor wafer 40 to be accessed or the wafer cassette 90 to be accessed.

Further, the host unit 230 may have a function of managing a priority of each of the plurality of semiconductor wafers 40. The algorithm for determining the priority of each of the plurality of semiconductor wafers 40 is not limited to a particular algorithm, but the priority of each of the plurality of semiconductor wafers 40 can be determined based on various conditions.

For example, the priority of each of the semiconductor wafers 40 may be determined based on the access request to each of the semiconductor wafers 40. The priority of each of the semiconductor wafers 40 may be determined based on the frequency of accesses to each of the semiconductor wafers 40. The priority of each of the semiconductor wafers 40 may be determined based on the time elapsed from the last access time to each of the semiconductor wafers 40. The priority of each of the semiconductor wafers 40 may be determined based on the status indicating completion or incompletion of accessing process to each of the semiconductor wafers 40. The priority of each of the semiconductor wafers 40 may be determined based on the estimated remaining time until the accessing process to each of the semiconductor wafers 40 is completed. The priority of each of the semiconductor wafers 40 may be determined based on the application program to be executed. The priority of each of the semiconductor wafers 40 may be determined based on the prediction result of probability of occurrence of an access request to each of the semiconductor wafers 40.

Alternatively, by using a combination of any two or more of the following conditions: access request, access frequency, time elapsed since the last access time, completion or incompletion of accessing process, estimated remaining time to the completion of the accessing process, application program to be executed, and prediction result of access probability, the priority of each of the semiconductor wafers 40 may be determined.

The host unit 230 may control the locations where the semiconductor wafers 40 are respectively present, based on the priority of each of the semiconductor wafers 40, as well. For example, the host unit 230 may control the locations where the semiconductor wafers 40 are respectively present such that a wafer cassette 90 including a semiconductor wafer 40 having a priority of a first level is connected to a slot in the host unit 230, a wafer cassette 90 including a semiconductor wafer 40 having a priority of a second level is stored in the wafer cassette stocker 5, and a semiconductor wafer 40 having a priority of a third level is stored in the wafer stocker 3. Here, note that the priority of the second level is lower than the priority of the first level. Further, the priority of the third level is lower than the priority of the second level.

For example, when the number of slots included in the host unit 230 is two and the number of storage locations in the wafer cassette stocker 5 is two, the highest priority and the second highest priority correspond to the priority of the first level. Further, the third highest priority and the fourth highest priority correspond to the priority of the second level. A set of the fifth highest priority and each priority lower than the fifth highest priority correspond to the priority of the third level.

In this case, the host unit 230 may connect two wafer cassettes 90 corresponding to two semiconductor wafers 40 having the priority of the first level to two slots of the host unit 230, respectively, regardless of the access request to each individual semiconductor wafer 40. Further, the host unit 230 may store two wafer cassettes 90 corresponding to two semiconductor wafers 40 having the priority of the second level in the wafer cassette stocker 5, regardless of the access request to each individual semiconductor wafer 40. Furthermore, the host unit 230 may store a plurality of semiconductor wafers 40 having the priority of the third level in the wafer stocker 3, regardless of the access request to each individual semiconductor wafer 40.

Here, it is assumed that the priority of a certain semiconductor wafer 40 is raised from the priority of the third level to the priority of the second level.

In this case, the host unit 230 determines this semiconductor wafer 40 as a semiconductor wafer 40 to be assembled. The semiconductor wafer 40 to be assembled is a semiconductor wafer 40 to be assembled as a wafer cassette 90. The host unit 230 causes the wafer transport device 8 to transport the semiconductor wafer 40 to be assembled from the wafer stocker 3 to the cassetter 4. In this case, the host unit 230 may transmit the following transport request to the wafer transport device 8.

This transport request designates the location in the wafer stocker 3 where the semiconductor wafer 40 to be assembled is present (wafer storage location) as a movement source location, and designates the cassetter 4 as a movement destination location. The wafer transport device 8 transports the semiconductor wafer 40 present at the designated movement source location to the designated movement destination location.

Moreover, the host unit 230 causes the cassetter 4 to assemble a wafer cassette 90 from the transported semiconductor wafer 40 to be assembled and a cassette case 80.

Then, the host unit 230 causes the wafer cassette transport device 9 to transport the assembled wafer cassette 90 from the cassetter 4 to the wafer cassette stocker 5. In this case, the host unit 230 may transmit the following transport request to the wafer cassette transport device 9.

This transport request, for example, designates the cassetter 4 as a movement source location, and designates the location in the wafer cassette stocker 5 (wafer cassette storage location) as a movement destination location. The wafer cassette transport device 9 transports the wafer cassette 90 present at the designated movement source location to the designated movement destination location.

As a result, before an access request to a semiconductor wafer 40 having a relatively high priority is generated, it is possible to assemble a wafer cassette 90 including this semiconductor wafer 40 and store the wafer cassette 90 in the wafer cassette stocker 5.

When this semiconductor wafer 40 is actually determined to be a semiconductor wafer 40 to be accessed, since the wafer cassette 90 including this semiconductor wafer 40 is already stored in the wafer cassette stocker 5, the latency required until data can be read from or written to this semiconductor wafer 40 can be reduced.

Next, a configuration of the semiconductor wafer 40 will be described. FIG. 2 is a diagram illustrating an example of a configuration of the semiconductor wafer 40. The semiconductor wafer 40 is used as a storage medium in the storage system 1.

The semiconductor wafer 40 includes a plurality of non-volatile memory devices 70. The size of the semiconductor wafer 40 is not particularly limited, but may be of a 300-mm wafer. When the number of nonvolatile memory devices 70 included in one semiconductor wafer 40 is 1024 and the storage capacity per one nonvolatile memory device 70 is 32 GB, the storage capacity per one semiconductor wafer 40 is 32 TB. The non-volatile memory device 70 is rectangular in shape, for example, and a plurality of electrodes (pads) 41 electrically connectable to the outside are located in one of its sides.

A part of the storage area of at least one of the plurality of nonvolatile memory devices 70 included in the semiconductor wafer 40 is used as an identification information storage area 71. The identification information storage area 71 is used as a storage area for storing identification information and a check code. The identification information is issued by the host unit 230 to identify this semiconductor wafer 40. As the identification information, an identifier (wafer identifier) that is capable of uniquely identifying each semiconductor wafer 40 may be used. The check code is a code for verifying integrity of the identification information. Examples of the check code include a cyclic redundancy code (CRC), another type of parity different from CRC, and a hash value calculated from the identification information.

By storing a pair of the identification information and the check code in the identification information storage area 71, the integrity of the value read as the identification information from the identification information storage area 71 can be verified. Thus, it is possible to prevent a random value, which is stored in the identification information storage area 71 of new semiconductor wafers 40 immediately after shipment from the factory (that is, semiconductor wafers 40 in which a pair of the identification information and the check code is not stored), from being erroneously handled as the identification information.

In the semiconductor wafer 40, storage areas other than the identification information storage area 71 are used to store user data or management data. The management data includes, for example, wafer control information necessary for writing and reading data to and from the semiconductor wafer 40. Examples of the wafer control information include a logical-to-physical address translation table corresponding to the semiconductor wafer 40.

Figure 3:
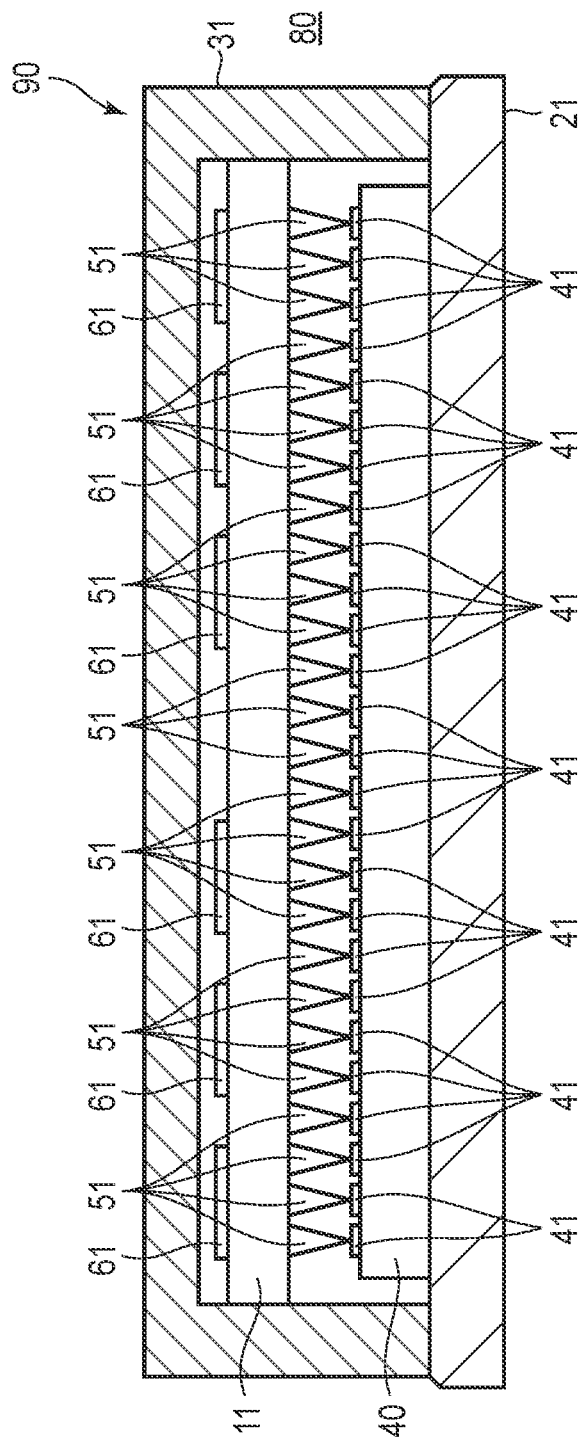
FIG. 3 is a diagram illustrating an example of a configuration of a wafer cassette according to the embodiment.

Next, a configuration of the wafer cassette 90 is described. FIG. 3 shows an example of a configuration of the wafer cassette 90. The wafer cassette 90 is used as a storage device in the storage system 1. The wafer cassette 90 includes a semiconductor wafer 40 and a cassette case 80.

The cassette case 80 includes a lower case 21 and an upper case 31. On the lower case 21, a semiconductor wafer 40 can be placed. The lower case 21 includes a wafer mounting region on which a semiconductor wafer 40 is to be placed. The lower case 21 and the upper case 31 can be joined to each other. The upper case 31 includes a probe card 11. Note that the probe card 11 may be independent from the upper case 31. In other words, the probe card 11 is not an essential component for the cassette case 80.

The probe card 11 includes a substrate having a lower surface and an upper surface on an opposite side to the lower surface. The lower surface opposes the semiconductor wafer 40 placed on the wafer mounting region in the lower case 21.

On the lower surface of the probe card 11, a plurality of probe pins 51 are disposed. The probe pins 51 are contactable with a plurality of respective pads 41 of the semiconductor wafer 40 placed on the wafer mounting region in the lower case 21. Each probe pin 51 supplies an electrical signal to the pad 41 of the semiconductor wafer 40 or receives an electrical signal from the pad 41. The probe pins 51 may as well be referred to as probes or probe needles. The total number of probe pins 51 located on the lower surface of the probe card 11 may be equal to the total number of pads 41 in the semiconductor wafer 40. In this case, the probe card 11 can collectively connect to the multiple pads 41 in the semiconductor wafer 40. With this configuration, the number of non-volatile memory devices 70 that can be accessed in parallel can be increased.

On the upper surface of the probe card 11, a controller 61 is disposed. The controller 61 is a memory controller configured to control a plurality of nonvolatile memory devices 70 in the semiconductor wafer 40. The controller 61 may be realized by a large scale integration (LSI) such as a system-on-a-chip (SoC). FIG. 3 illustrates an example of a configuration in which a plurality of controllers 61 are disposed on the upper surface of the probe card 11. The number of controllers 61 disposed on the upper surface of the probe card 11 may be one, two, or more.

The controller 61 may function as a flash translation layer (FTL) configured to execute data management of each of the plurality of non-volatile memory devices 70 in the semiconductor wafer 40. The data management executed by the FTL includes management of mapping information indicating the correspondence between each of logical addresses and each of physical addresses of the plurality of nonvolatile memory devices 70. A logical address is an address used by the host unit 230 to designate an address of a location in a logical address space of a semiconductor wafer 40 to be accessed. The physical address corresponding to a certain logical address points to a physical storage location in the nonvolatile memory device 70 where data corresponding to this logical address is written. In general, as the logical address, a logical block address (LBA) may be used.

Further, the cassette case 80 includes a nonvolatile memory. In this nonvolatile memory, an identifier to identify the cassette case 80 may be stored. This nonvolatile memory may be mounted in the controller 61.

Figure 4:
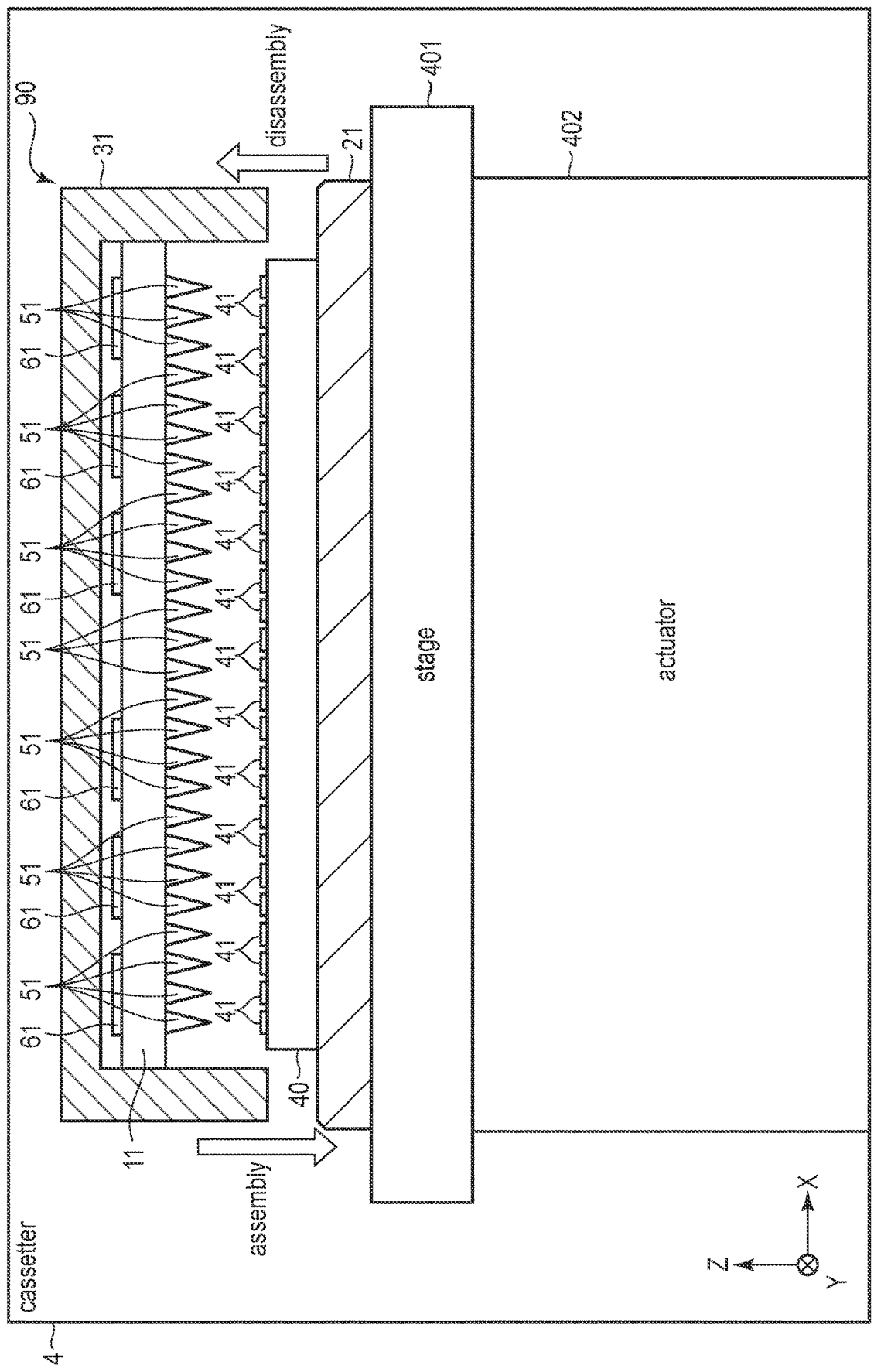
FIG. 4 is a diagram illustrating an example of a configuration of a cassetter according to the embodiment.

Next, a configuration of the cassetter 4 will be described. FIG. 4 is a diagram illustrating an example of a configuration of the cassetter 4. The cassetter 4 executes assembly and disassembly of the wafer cassettes 90.

The cassetter 4 assembles the wafer cassette 90 by mechanically joining the upper case 31 and the lower case 21 on which the semiconductor wafer 40 is placed to each other. When assembling the wafer cassette 90, the cassetter 4 performs an alignment to bring the plurality of probe pins 51 of the probe card 11 into contact with the plurality of pads 41 of the semiconductor wafer 40, respectively. Then, the cassetter 4 joins the lower case 21 and the upper case 31 to each other so that the plurality of probe pins 51 are in contact with the plurality of pads 41, respectively.

The cassetter 4 includes a stage 401 and an actuator 402. The stage 401 has a mechanism to hold the lower case 21. The cassetter 4 places a semiconductor wafer 40, which is transported from the wafer stocker 3 to the cassetter 4 by the wafer transport system 8, onto the lower case 21 placed on the stage 401.

The actuator 402 moves the upper case 31 or the stage 401 along the Z-axis direction to bring the plurality of pads 41 of the semiconductor wafer 40 and the plurality of probe pins 51 of the probe card 11 into contact with each other. At this time, the lower case 21 and the upper case 31 are joined to each other. Thus, the semiconductor wafer 40 is accommodated in the cassette case 80. When the plurality of pads 41 of the semiconductor wafer 40 and the plurality of probe pins 51 of the probe card 11 are brought into contact with each other, respectively, the controller 61 and the semiconductor wafer 40 (more particularly, the plurality of nonvolatile memory devices 70) are electrically connected to each other.

When disassembling the wafer cassette 90, the actuator 402 moves the upper case 31 or the stage 401 along the Z-axis direction, in the opposite direction from that of the assembly, so as to separate the upper case 31 and the lower case 21 from each other.

Next, the configuration of the host computer 2 will be described. FIG. 5 is a diagram illustrating an example of a configuration of the host computer 2 included in the storage system 1.

FIG. 5 illustrates an example case in which two host units 230a and 230b are accommodated in a server rack for the host computer 2. Each of the host units 230a and 230b functions as a host apparatus. Each of the host units 230a and 230b includes one or more slots, for example, three slots (slots #1 to #3). A wafer cassette 90 can be detachably inserted into each of the slots #1 to #3.

Figure 6:
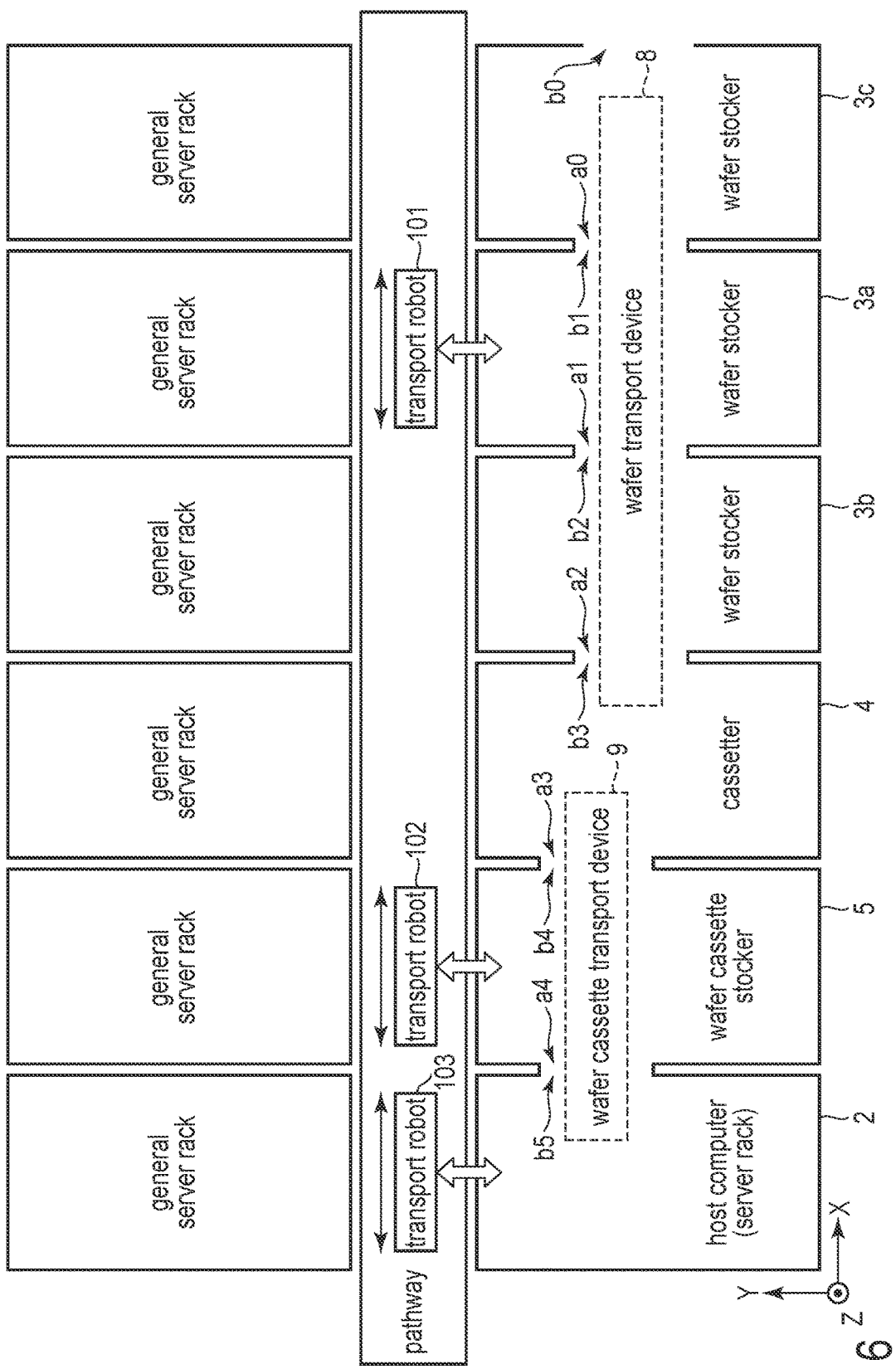
FIG. 6 is a plan view illustrating an example of arrangement of wafer stockers, a cassetter, a wafer cassette stocker, a host computer, a wafer transport device, and a wafer cassette transport device, according to the embodiment.

Next, a configuration of the entire storage system 1 will be described. FIG. 6 is a plan view illustrating an example of an arrangement of the wafer stockers 3a to 3c, the cassetter 4, the wafer cassette stocker 5, the host computer 2, the wafer transport device 8, and the wafer cassette transport device 9, in the storage system 1.

On the floor (X-Y plane) in the data center, a plurality of server racks are arranged so that the front surface side of each of the server racks (for example, the front door of each server rack) opposes the pathway. In FIG. 6, server racks which accommodate various types of computers other than those of the storage system 1 are shown as general server racks.

The wafer stocker 3c has a configuration similar to that of the wafer stockers 3a and 3b described with reference to FIG. 1.

Each of the wafer stockers 3a to 3c, the cassetter 4, the wafer cassette stocker 5, and the host computer 2 may also be arranged so that the front surface side of each of the server racks (for example, the front door of each server rack) opposes the pathway.

A transport robot 101 is a mobile transport robot that is capable of moving on pathways. The transport robot 101 can function as a wafer transport device which transports semiconductor wafers 40 between the wafer stockers 3a to 3c and the cassetter 4. The transport robot 101 includes an arm that is capable of loading and unloading the semiconductor wafer 40 into and from each server rack. The transport robot 101 operates to add a semiconductor wafer 40 to each of the wafer stockers 3a to 3c and the cassetter 4 through the front side thereof. Further, the transport robot 101 operates to take out a semiconductor wafer 40 from each of the wafer stockers 3a to 3c and the cassetter 4 through the front side thereof.

The transport robot 101 may be used in place of, or in addition to the wafer transport device 8 that transports a semiconductor wafer 40 through the internal transport path (that is, a pair of openings b3 and a2, a pair of openings b2 and a1, and a pair of openings b1 and a0) crossing among the wafer stockers 3a to 3c and the cassetter 4.

Each of transport robots 102 and 103 is a mobile transport robot which is capable of moving on the pathways. Each of the transport robots 102 and 103 can function as a wafer cassette transport device that transports wafer cassettes 90 among the host computer 2, the wafer cassette stocker 5, and the cassetter 4. Each of the transport robots 102 and 103 includes an arm that is capable of loading and unloading the wafer cassette 90 onto and from each server rack. Each of the transport robots 102 and 103 operates to add a wafer cassette 90 to each of the host computer 2, the wafer cassette stocker 5, and the cassetter 4, through the front sides thereof. Each of the transport robots 102 and 103 further operates to take out a wafer cassette 90 from each of the host computer 2, the wafer cassette stocker 5, and the cassetter 4, through the front sides thereof.

Each of the transport robots 102 and 103 may be used in place of, or in addition to the wafer cassette transport device 9 that transports semiconductor wafers 40 through internal transport paths (that is, a pair of openings b5 and a4 and a pair of openings b4 and a3) crossing among the host computer 2, the wafer cassette stocker 5, and the cassetter 4.

Figure 7:
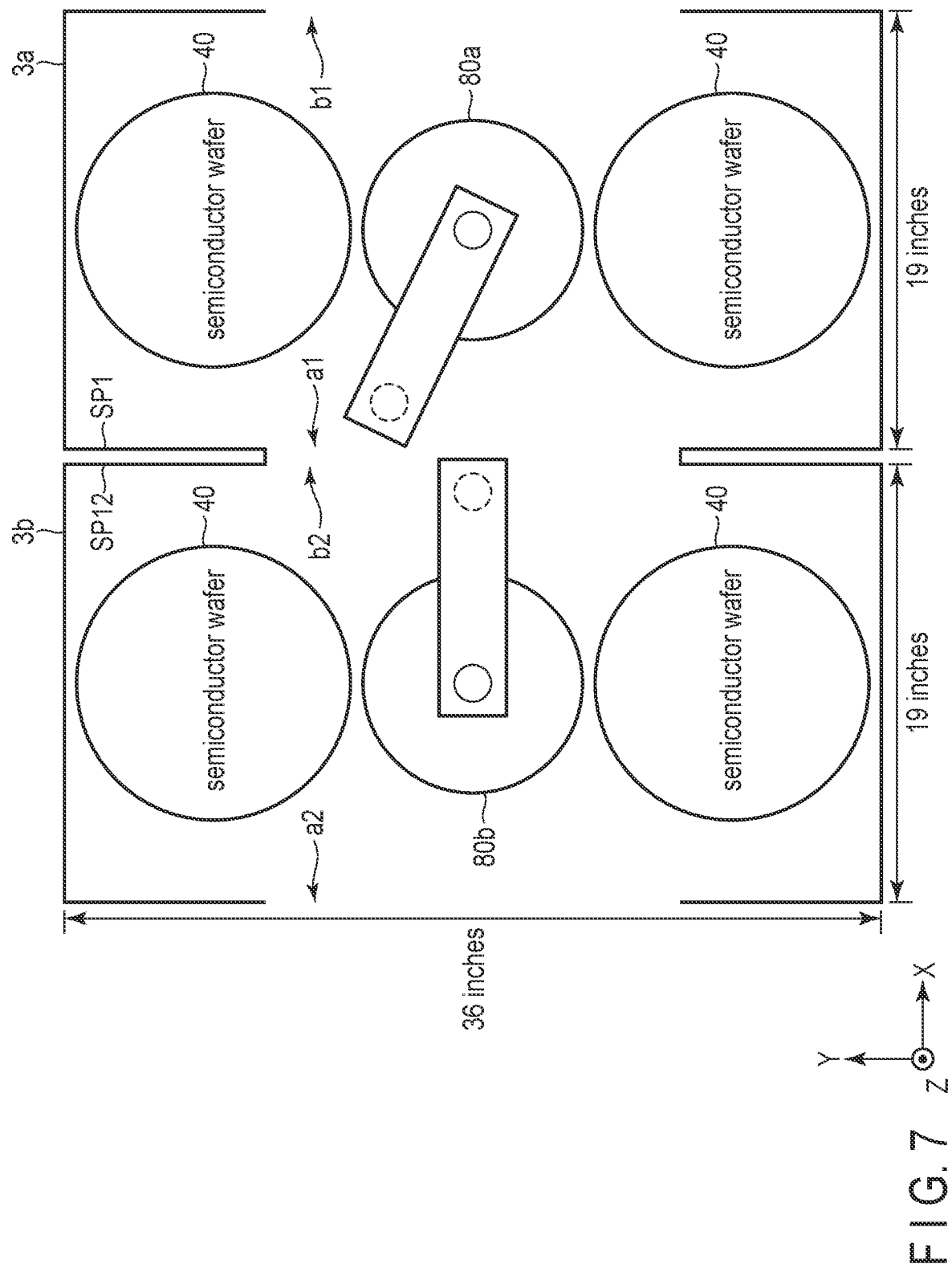
FIG. 7 is a plan view illustrating an example of a configuration of the wafer stocker according to the embodiment.

FIG. 7 is a plan view illustrating an example of a configuration of the wafer stocker 3.

The case of the wafer stocker 3 is realized by using a deep 19-inch rack having a depth of 36 inches (914.4 mm), for example. In the configuration example shown in FIG. 7, a robot arm 80 is placed in a center position between the front side of the wafer stocker 3 and the rear side of the wafer stocker 3 in order to be able to efficiently utilize the 36-inch depth. Both sides of the robot arm 80, that is, a space between the robot arm 80 and the front side of the wafer stocker 3, and a space between the robot arm 80 and the rear side of the wafer stocker 3, are used as storage locations for multiple semiconductor wafers 40, each being a 300-mm wafer.

The robot arms 80a and 80b disposed in the wafer stockers 3a and 3b, respectively, serve as the wafer transport device 8. The semiconductor wafer 40 is passed between the robot arm 80a and the robot arm 80b through the opening a1 and the opening b2.

Figure 8:
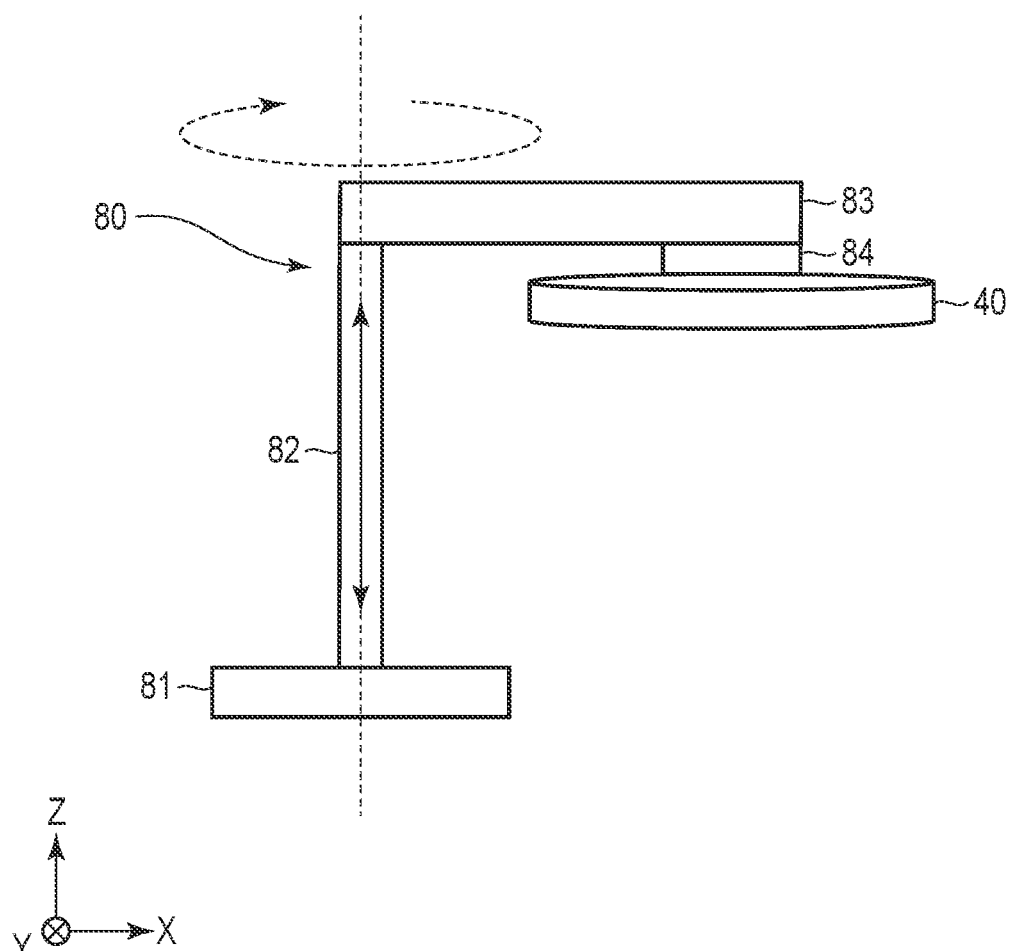
FIG. 8 is a plan view illustrating an example of a configuration of a robot arm used as the wafer transport device according to the embodiment.

FIG. 8 is a diagram illustrating an example of a configuration of the robot arm 80 used as the wafer transport device 8.

Although the configuration of the robot arm 80 is not particularly limited, FIG. 8 illustrates a configuration that includes a base 81, a pillar 82, an arm 83, and a gripping portion 84.

The pillar 82 includes one end supported by the base 81. The pillar 82 is extendable and retractable along the Z-axis direction. The arm 83 is attached to the other end of the pillar 82. The arm 83 is configured to rotate around the pillar 82. The gripping portion 84 is attached to a distal end portion of the arm 83. The gripping portion 84 is, for example, a suction head or a robot hand.

Similarly to the case of the wafer transport device 8, the wafer cassette transport device 9 may also be realized using robot arms that are respectively disposed in the host computer 2, the wafer cassette stocker 5, and the cassetter 4.

Figure 9A:
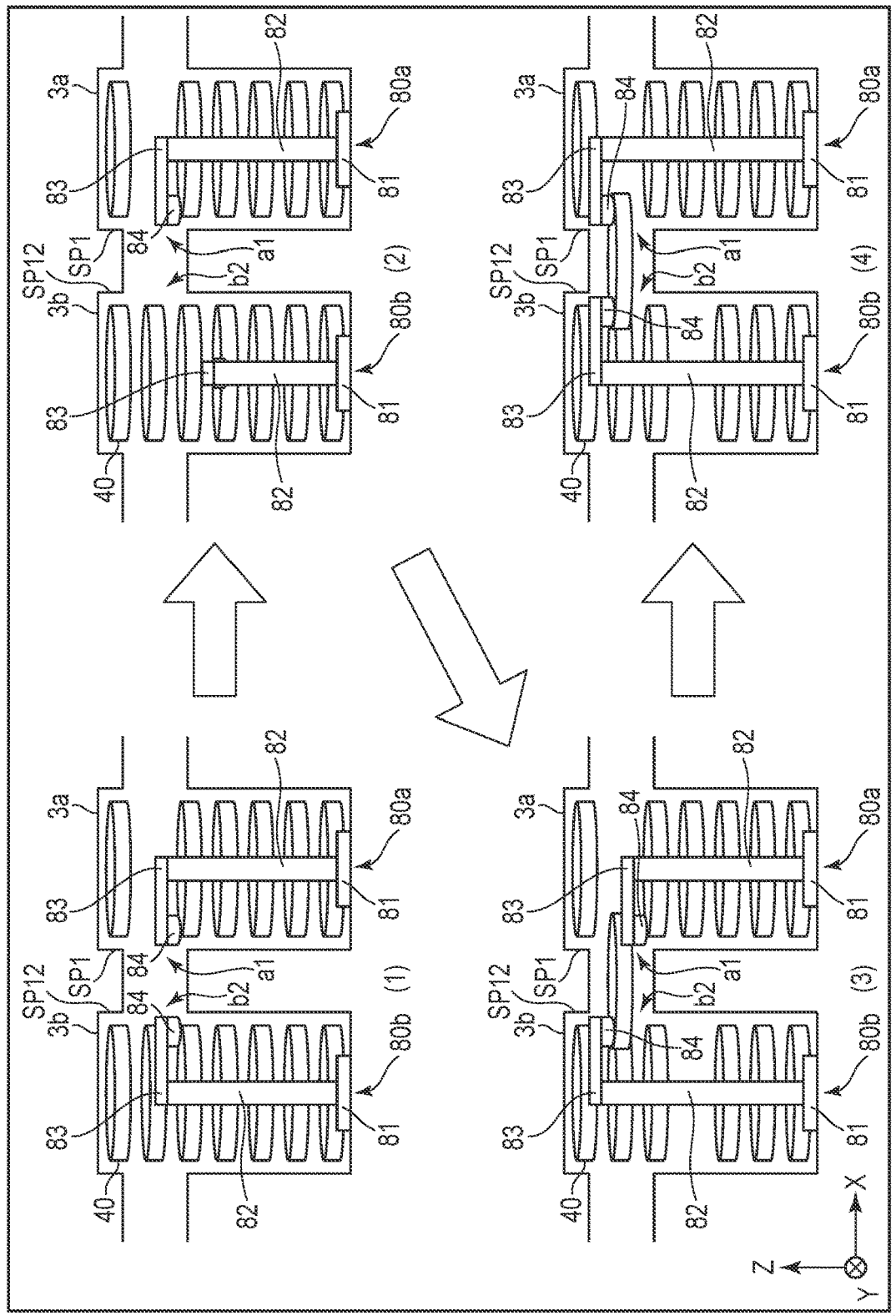
FIG. 9A is a diagram illustrating a part of operation of transporting a semiconductor wafer from a first wafer stocker to a second wafer stocker according to the embodiment.

Next, the operation of transporting a semiconductor wafer 40 will be described. FIG. 9A is a diagram illustrating a part of the operation of transporting the semiconductor wafer 40 from the wafer stocker 3b to the wafer stocker 3a through the opening b2 of the side plate SP12 of the wafer stocker 3b and the opening a1 of the side plate SP1 of the wafer stocker 3a.

(1) The arm 83 of the robot arm 80b placed in the wafer stocker 3b and the arm 83 of the robot arm 80a placed in the wafer stocker 3a are at their initial positions.

(2) When the storage location where the semiconductor wafer 40 to be transported is stored is present at a lower position than the initial position of the arm 83 of the robot arm 80b, the pillar 82 of the robot arm 80b is retracted to lower the arm 83 to the storage location of the semiconductor wafer 40 to be transported. Then, the pillar 82 of the robot arm 80b is rotated to move the arm 83 above the semiconductor wafer 40 to be transported.

(3) The arm 83 of the robot arm 80b grips the semiconductor wafer 40 to be transported with the gripping portion 84. The pillar 82 raises the arm 83 to the position of the internal transport path including the opening b2 and the opening a1. The arm 83 transports the semiconductor wafer 40 to be transported to the internal transport path.

(4) The arm 83 of the robot arm 80a is moved above the semiconductor wafer 40 to be transported and then grips the semiconductor wafer 40 to be transported with the gripping portion 84.

Figure 9B:
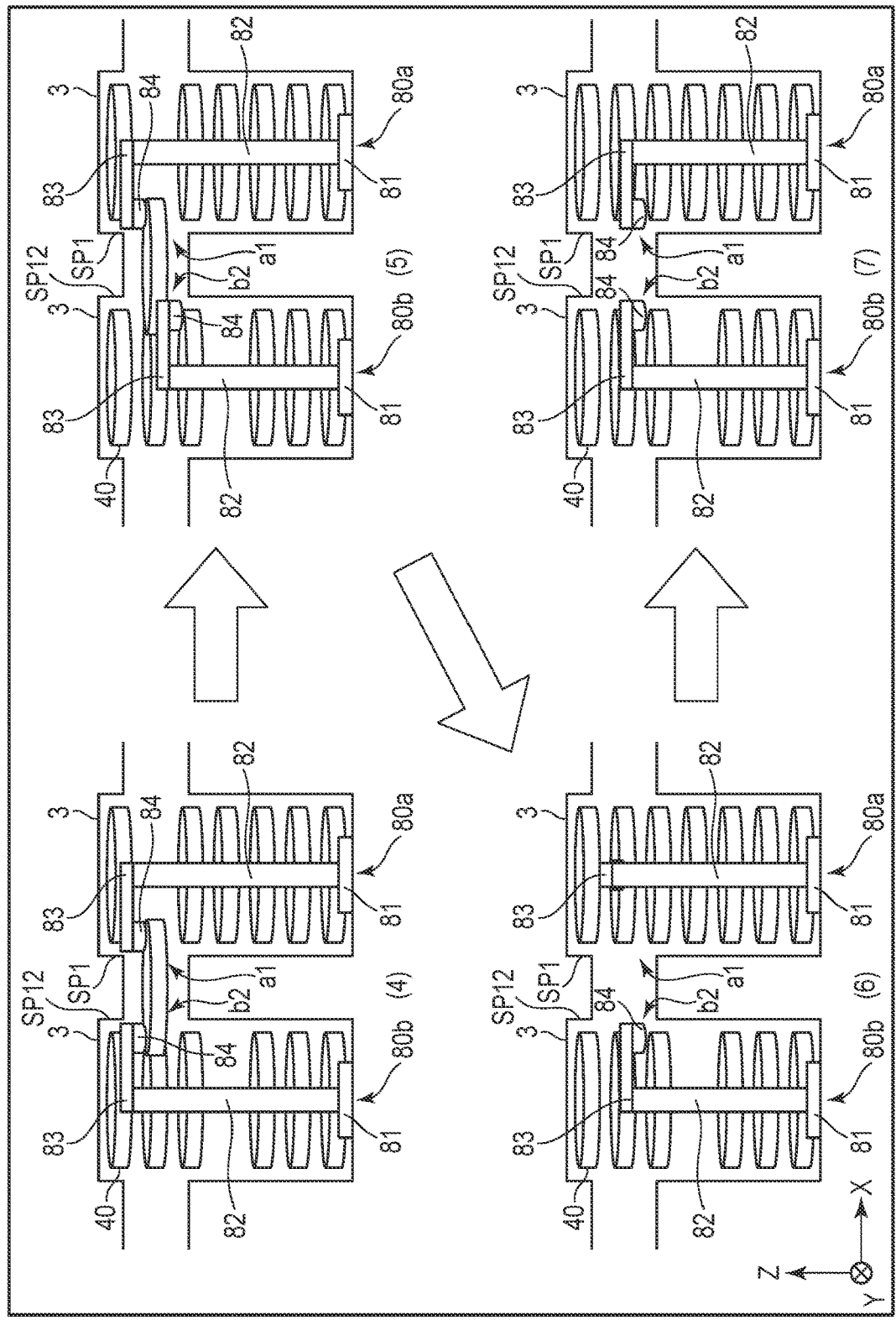
FIG. 9B is a diagram illustrating the rest of the operation of transporting the semiconductor wafer from the first wafer stocker to the second wafer stocker according to the embodiment.

FIG. 9B is a diagram illustrating the rest of the operation of transporting the semiconductor wafers 40 from the wafer stocker 3b to the wafer stocker 3a.

(5) The arm 83 of the robot arm 80b releases the semiconductor wafer 40 to be transported and then returns to its initial position.

(6) The arm 83 of the robot arm 80a transports the semiconductor wafer 40 to be transported to the destination storage location.

(7) The arm 83 of the robot arm 80a releases the semiconductor wafer 40 to be transported and returns to the initial position.

FIG. 10 is a plan view illustrating an example of arrangement of multiple robot arms used as the wafer transport device 8 and the wafer cassette transport device 9 illustrated in FIG. 6.

In the arrangement example shown in FIG. 10, the robot arms 8a to 8c are arranged in the center positions of the wafer stockers 3a to 3c, respectively. Similarly, robot arms 9a and 9b are arranged in the center positions of the cassetter 4 and the wafer cassette stocker 5, respectively.

The robot arms 8a to 8c and the robot arm 9a function as the wafer transport device 8. On the other hand, the robot arms 9a and 9b function as the wafer cassette transport device 9, which transports a wafer cassette 90 between the cassetter 4 and the wafer cassette stocker 5 through the opening a3 and the opening b4.

The transport of the wafer cassette 90 between the wafer cassette stocker 5 and the host computer 2 can be executed by the transport robot 102 or 103 as well. For example, the transport robot 102 or 103 removes a wafer cassette 90 from the wafer cassette stocker 5 through the front side of the wafer cassette stocker 5, and the transport robot 102 or 103 then moves to the front side of the host computer 2. The transport robot 102 or 103 then connects the wafer cassette 90 to a slot in the host unit 230 through the front side of the host computer 2. Alternatively, the transport robot 102 or 103 removes a wafer cassette 90 from a slot in the host unit 230 through the front side of the host computer 2, and the transport robot 102 or 103 then moves to the front side of the wafer cassette stocker 5 or the cassetter 4. The transport robot 102 or 103 loads the wafer cassette 90 which is removed from the slot in the host unit 230, into the wafer cassette stocker 5 or the cassetter 4 through the front side of the wafer cassette stocker 5 or the cassetter 4.

Figure 11:
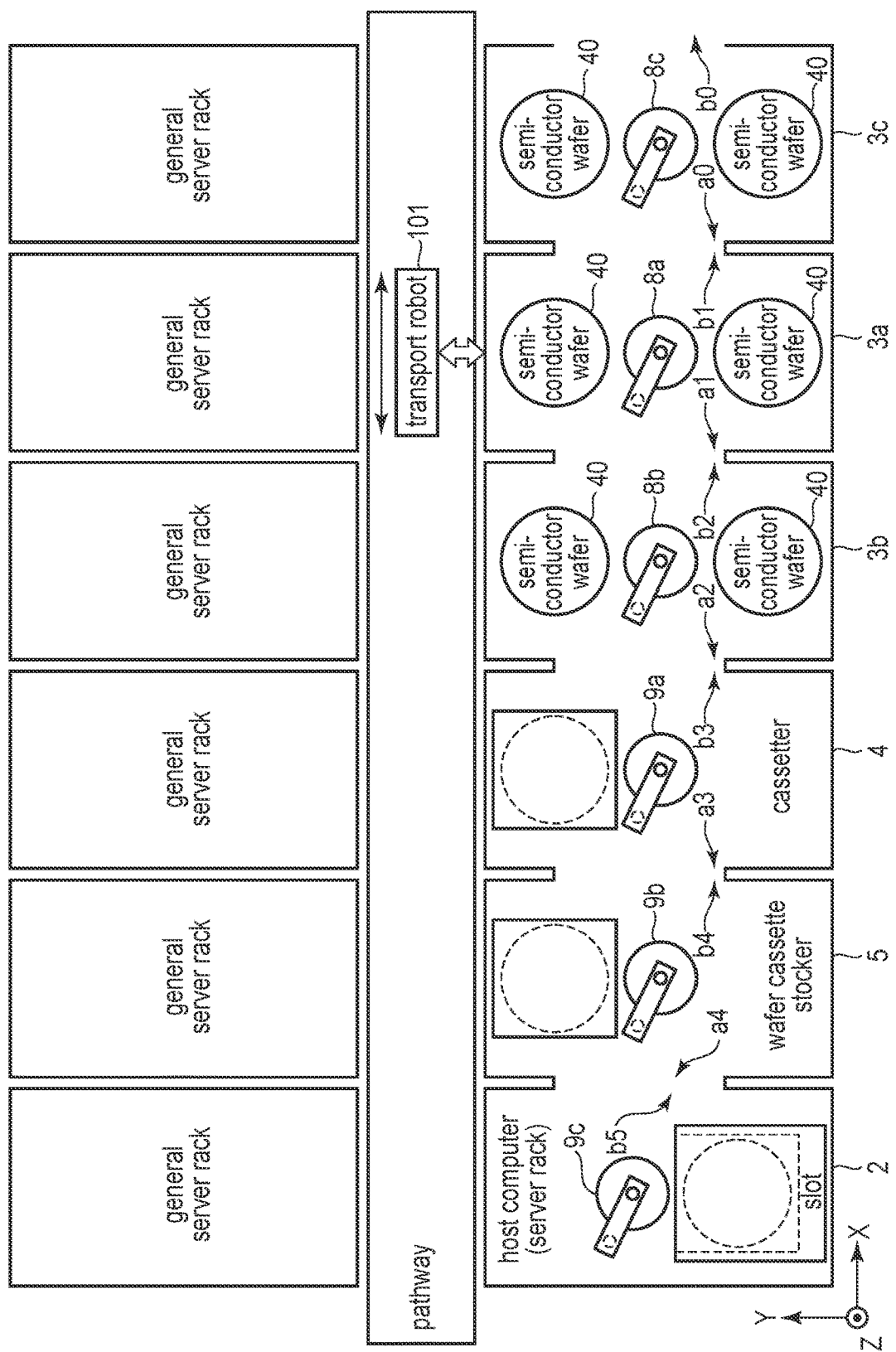
FIG. 11 is a plan view illustrating another example of the arrangement of the wafer transport device and a plurality of robot arms used as the wafer cassette transport device, according to the embodiment.

FIG. 11 is a plan view illustrating another example of the arrangement of multiple robot arms used as the wafer transport device 8 and the wafer cassette transport device 9 of FIG. 6.

In the arrangement example shown in FIG. 11, the robot arms 8a to 8c are arranged in the center positions of the wafer stockers 3a to 3c, respectively. Similarly, robot arms 9a to 9c are arranged in the center positions of the cassetter 4, the wafer cassette stocker 5, and the host computer 2, respectively.

The robot arms 8a to 8c and the robot arm 9a function as the wafer transport device 8 illustrated in FIG. 6. On the other hand, the robot arms 9a to 9c function as the wafer cassette transport device 9 illustrated in FIG. 6.

Let us assume here the case, for example, where a wafer cassette 90 has been assembled in the cassetter 4. In this case, the wafer cassette 90 is passed from the robot arm 9a to the robot arm 9b. Further, the wafer cassette 90 is passed from the robot arm 9b to the robot arm 9c. The robot arm 9c connects the wafer cassette 90 to a slot in the host unit 230.

Further, the robot arm 9c removes a wafer cassette 90 from a slot of the host unit 230 and passes the removed wafer cassette 90 to the robot arm 9b. The robot arm 9b transports this wafer cassette 90 to a storage location in the wafer cassette stocker 5 or passes this wafer cassette 90 to the robot arm 9a.

FIG. 12 is a diagram illustrating an example of a configuration of the wafer cassette 90.

The wafer cassette 90 includes a plurality of plug terminals 22 provided on the rear surface of the thin box-shaped cassette case 80. Each of the plug terminals 22 is a host interface for communicating with the host unit 230. Each plug terminal 22 is, for example, a PCIe male terminal conforming to the PCI Express™ (PCIe™) standard or a male terminal for Ethernet.

FIG. 13 is a diagram illustrating an example of a configuration of the host unit 230.

The left part of FIG. 13 shows the host unit 230 as viewed from its front side. The middle part of FIG. 13 shows the host unit 230 as viewed from its side surface side. The right part of FIG. 13 shows the host unit 230 as viewed from its upper surface side.

The host unit 230 includes three slots #1 to #3. Each of the slots #1 to #3 includes a cavity that can accommodate a wafer cassette 90. The left part of FIG. 13 shows the case where a wafer cassette 90 is accommodated in each of the slots #1 to #3.

In the host unit 230, a plurality of receptacle terminals 232 are provided for each slot. Each of the receptacle terminals 232 is, for example, a PCIe female terminal or a female terminal for Ethernet. Further, in the host unit 230, the above-described system board, which is also referred to as a host board, and the power supply unit are provided as components 231. A processor, a memory, a system controller, a communication interface controller, and the like are provided on the system board.

When a wafer cassette 90 is connected to a certain slot in the host unit 230, the plug terminals 22 of the wafer cassette 90 are respectively connected to the receptacle terminals 232 provided at the far side in this slot. Each of the receptacle terminals 232 is electrically connected to the system board.

From the rear surface of the host unit 230, a power cable connected to the power supply unit and a network cable connected to the system board, and the like are led out to the outside.

Figure 14:
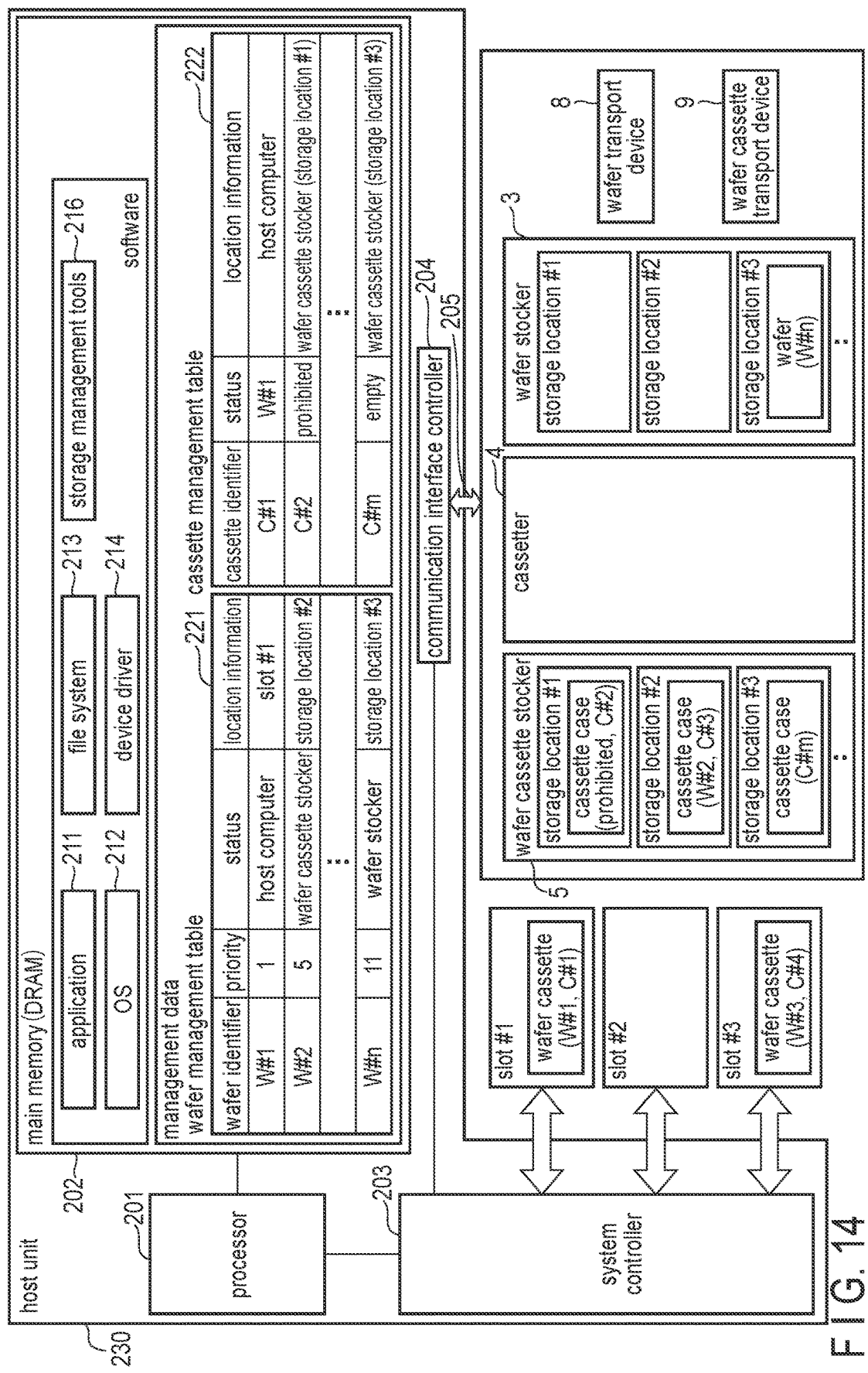
FIG. 14 is a block diagram illustrating an example of a configuration of the host apparatus according to the embodiment.

FIG. 14 is a block diagram illustrating an example of a configuration of the host unit 230.

The host unit 230 includes a processor 201, a main memory 202, a system controller 203, a communication interface controller 204, and the like. The processor 201, the main memory 202, the system controller 203, and the communication interface controller 204 are mounted on the system board of the host unit 230.

The main memory 202 is, for example, a dynamic random access memory (DRAM).

The communication interface controller 204 performs a communication with the cassetter 4, the wafer transport device 8, and the wafer cassette transport device 9, via a communication interface 205. As the communication interface 205, for example, an interface conforming to the Ethernet standard may be used. In this case, the communication interface controller 204 may be realized, for example, by a network interface controller (NIC).

The processor 201 executes various programs (software) loaded on the main memory 202. These programs may include, for example, an application program 211, an operating system (OS) 212, a file system 213, a device driver 214 for controlling the wafer cassette 90, a storage management tool 216, and the like. The storage management tool 216 is a program for managing each of the semiconductor wafers 40, each of the cassette cases 80, and each of the wafer cassettes 90, and for controlling the transport of each of the semiconductor wafers 40 and each of the wafer cassettes 90.

In the following description, the explanation that these programs execute a certain process means that the host unit 230 (more specifically, the processor 210) performs the process by executing these programs.

The host unit 230 (more specifically, the processor 210) is capable of managing a wafer management table 221 under the control of the storage management tool 216. The wafer management table 221 is management data for a plurality of semiconductor wafers 40 in the wafer stocker 3.

Further, the host unit 230 is capable of managing a cassette management table 222 under the control of the storage management tool 216. The cassette management table 222 is management data for a plurality of cassette cases 80 or a plurality of wafer cassettes 90 in the wafer cassette stocker 5.

The wafer management table 221 and the cassette management table 222 may be stored in the main memory 202. At least a part of the information which is managed by the wafer management table 221 corresponding to a certain semiconductor wafer 40, may be stored in the storage area of this semiconductor wafer 40.

The host unit 230 is configured to assign a unique identifier to each of the semiconductor wafers 40. The host unit 230 uses the wafer management table 221 to manage the identifier of each semiconductor wafer 40, the priority of each semiconductor wafer 40, the status of each semiconductor wafer 40, and the location information of each semiconductor wafer 40. FIG. 14 shows an example in which the host unit 230 identifies each of the plurality of semiconductor wafers 40 used in the storage system 1 using each of the wafer identifiers W #1, W #2, . . . , W #n.

The host unit 230 stores the priority of each of the plurality of semiconductor wafers 40 in the wafer management table 221. The host unit 230 then instructs the wafer transport device 8 and the wafer cassette transport device 9 to transport the semiconductor wafer 40, the cassette case 80, and the wafer cassette 90, on the basis of the priorities managed in the wafer management table 221.

The host unit 230 stores, in the wafer management table 221, information indicating whether each of the semiconductor wafers 40 is present at the host computer 2, the wafer cassette stocker 5, or the wafer stocker 3, as the status of each semiconductor wafer 40.

When a certain semiconductor wafer 40 is present in the host computer 2, the host unit 230 can recognize that the wafer cassette 90 including this semiconductor wafer 40 is connected to a slot in the host unit 230.

Alternatively, when a certain semiconductor wafer 40 is present in the wafer cassette stocker 5, the host unit 230 can recognize that a wafer cassette 90 including this semiconductor wafer 40 is stored in the wafer cassette stocker 5. In other words, the host unit 230 can recognize that this semiconductor wafer 40 is already assembled as a wafer cassette 90.

Alternatively, when a certain semiconductor wafer 40 is present in the wafer stocker 3, the host unit 230 can recognize that this semiconductor wafer 40 is stored in the wafer stocker 3. In other words, the host unit 230 can recognize that this semiconductor wafer 40 has not yet been assembled as a wafer cassette 90.

The host unit 230 stores location information of the semiconductor wafer 40 in the wafer management table 221 as information indicating the location where a respective one of the semiconductor wafers 40 is connected or stored.

When a certain semiconductor wafer 40 is present in the host computer 2, the host unit 230 stores, in the wafer management table 221, the slot number indicating the slot of the host unit 230, to which a wafer cassette 90 including this semiconductor wafer 40 is connected, as the location information of this semiconductor wafer 40.

Alternatively, when a certain semiconductor wafer 40 is present in the wafer cassette stocker 5, the host unit 230 stores, in the wafer management table 221, the storage location number indicating the location in the wafer cassette stocker 5 where a wafer cassette 90 including this semiconductor wafer 40 is stored, as the location information of this semiconductor wafer 40.

Alternatively, when a semiconductor wafer 40 is present in the wafer stocker 3, the host unit 230 stores, in the wafer management table 221, the storage location number indicating the location in the wafer stocker 3, where this semiconductor wafer 40 is stored, as the location information of this semiconductor wafer 40.

The host unit 230 is configured to assign a unique identifier to each of the cassette cases 80. The host unit 230 uses the cassette management table 222 to manage the identifier of each cassette case 80, the status of each cassette case 80, and location information as to where each cassette case 80 is located. FIG. 14 shows an example in which the host unit 230 identifies each of the cassette cases 80 used in the storage system 1 using each of the cassette identifiers C #1, C #2, . . . , C #m.

The host unit 230 stores, in the cassette management table 222, information of the status of each of the cassette cases 80, which indicates whether it is empty, or already assembled into a wafer cassettes 90, or set to be prohibited for use.

When a certain cassette case 80 is stored in the wafer cassette stocker 5 without including any semiconductor wafer 40, the host unit 230 stores, in the cassette management table 222, information indicating that this cassette case 80 is an empty cassette case, as information indicating the status of this cassette case 80.

Alternatively, when a certain cassette case 80 has already been assembled as a wafer cassette 90 together with a certain semiconductor wafer 40, the host unit 230 stores, in the cassette management table 222, the wafer identifier of the semiconductor wafer 40 included in this cassette case 80 (wafer cassette 90), as information indicating the status of this cassette case 80.

Alternatively, when a certain cassette case 80 is set to be prohibited for use, the host unit 230 stores, in the cassette management table 222, information indicating that this cassette case 80 is in a state of being prohibited for use, as information indicating the status of this cassette case 80.

The host unit 230 stores, in the cassette management table 222, location information indicating the location where a respective one of the cassette cases 80 is connected or stored. FIG. 14 shows an example in which the host unit 230 stores information indicating any one of the structural elements of the storage system 1 in the cassette management table 222 as the location information.

When a certain cassette case 80 is present in the host computer 2, the host unit 230 may store, in the cassette management table 222, the slot number indicating a slot of the host unit 230, to which the wafer cassette 90 including this cassette case 80 is connected, as the location information of this cassette case 80.

When a certain cassette case 80 assembled as a wafer cassette 90 is present in the wafer cassette stocker 5, the host unit 230 may store, in the cassette management table 222, the storage location number indicating the storage location in the wafer cassette stocker 5, where this wafer cassette 90 is stored, as the location information of this cassette case 80.

When a certain empty cassette case 80 is present in the wafer cassette stocker 5, the host unit 230 may store, in the cassette management table 222, the storage location number indicating the storage location in the wafer cassette stocker 5, where this empty cassette case 80 is stored, as the location information of this cassette case 80.

In the example shown in FIG. 14, a semiconductor wafer 40 having the wafer identifier W #1 has the highest priority (priority=1). The semiconductor wafer 40 having the wafer identifier W #1 is in the state in which it is connected to the slot #1 of the host unit 230. A semiconductor wafer 40 having the wafer identifier W #2 has the fifth highest priority (priority=5). The semiconductor wafer 40 having the wafer identifier W #2 is in the state of the wafer cassette 90 in which it is accommodated with the cassette case 80 and is stored at the storage location #2 in the wafer cassette stocker 5. A semiconductor wafer 40 having the wafer identifier W #n has the eleventh highest priority (priority=11). The semiconductor wafer 40 having the wafer identifier W #n is stored at the storage location #3 in the wafer stocker 3.

Further, a cassette case 80 having the cassette identifier C #1 is in the state in which it is already assembled as a wafer cassette 90 including the semiconductor wafer 40 having the wafer identifier W #1 and is connected to the slot #1 of the host unit 230. A cassette case 80 having the cassette identifier C #2 is in a state in which it is set to be prohibited for use and is stored at the storage location #1 in the wafer cassette stocker 5. A cassette case 80 having the cassette identifier C #m is in the state of an empty cassette case 80 which does not include any semiconductor wafer 40, and is stored at the storage location #3 in the wafer cassette stocker 5.

Next, the process for transporting a wafer cassette 90 to be accessed, executed in the storage system 1 according to the embodiment, will be described.

In the following descriptions, for the sake of simplicity, an explanation of updating of information in the cassette management table 222 by the host unit 230 is omitted. For this reason, the explanation will be given without specifying the cassette identifier assigned to each cassette case 80. In addition, the semiconductor wafers 40 having the wafer identifiers A to E, respectively, will be referred to as wafer A to E, respectively.

Figure 15A:
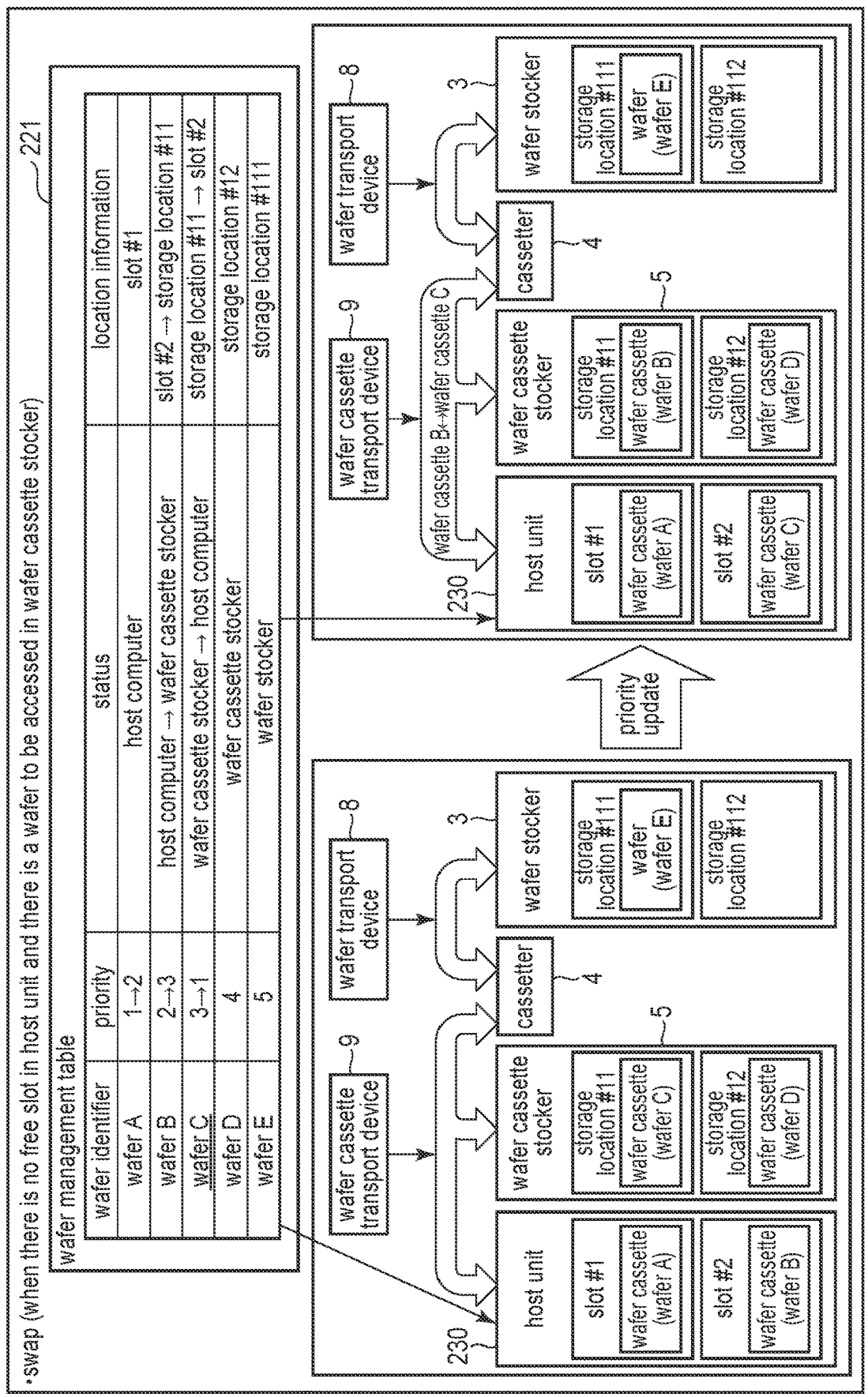
FIG. 15A is a diagram illustrating an operation based on a change in the priority of a semiconductor wafer to be executed in the storage system according to the embodiment.

FIG. 15A is a diagram illustrating a swap operation executed in the storage system 1 according to the embodiment. In the swap operation, the wafer cassette 90 connected to a slot of the host unit 230 is replaced with another wafer cassette 90 in the wafer cassette stocker 5. FIG. 15A shows the case on an assumption that the number of slots in the host unit 230 is two.

When there are no free (available) slots in the host unit 230 and a wafer cassette 90 including a semiconductor wafer 40 to be accessed is stored in the wafer cassette stocker 5, the host unit 230 executes the swap operation by controlling the wafer cassette transport device 9.

In the state before the swap operation is started, the wafer A has the highest priority (priority=1st) and the wafer cassette 90 including the wafer A is connected to the slot #1 of the host unit 230. The wafer B has the second highest priority (priority=2nd) and the wafer cassette 90 including the wafer B is connected to the slot #2 of the host unit 230. The wafer C has the third highest priority (priority=3rd) and the wafer cassette 90 including the wafer C is stored at the storage location #11 in the wafer cassette stocker 5. The wafer D has the fourth highest priority (priority=4th) and the wafer cassette 90 including the wafer D is stored at the storage location #12 in the wafer cassette stocker 5. The wafer E has the fifth highest priority (priority=5th) and is stored at the storage location #111 in the wafer stocker 3.

The host unit 230 determines a semiconductor wafer 40 to be accessed, among the plurality of semiconductor wafers 40 included in the storage system 1. Here, such a case is assumed that the wafer C is determined as the semiconductor wafer 40 to be accessed. The host unit 230 can dynamically change the priority of each of the semiconductor wafers 40 based on, for example, the access request, access frequency, elapsed time since the last access time, completion or non-completion of accessing process, estimated remaining time to complete accessing process, application program to be executed, prediction result of access probability, and the like. For example, if an access request for the wafer C occurs, the priority of the wafer C may be raised. Further, the priority of each of the semiconductor wafers 40 connected as the wafer cassette 90 to a slot in the host unit 230 may be lowered according to the completion of the accessing process for each of these semiconductor wafers 40, or according to the time elapsed since the last access time for each of these semiconductor wafers 40.

In this manner, the priority of each of the semiconductor wafers 40 managed in the storage system 1 is changed by the host unit 230. FIG. 15A shows the case on an assumption that the priority of the wafer C is changed from 3rd to 1st, the priority of the wafer A is changed from 1st to 2nd and the priority of the wafer B is changed from 2nd to 3rd.

Since there are no available slots in the host unit 230, the host unit 230 determines, among wafer cassettes 90 connected to the slots of the host unit 230 (here, the wafer cassette 90 including the wafer A and the wafer cassette 90 including the wafer B), a wafer cassette 90 including a semiconductor wafer 40 having the lowest priority as a wafer cassette 90 to be swapped. In this case, the wafer cassette 90 including the wafer B is determined as the wafer cassette 90 to be swapped.

The host unit 230 instructs the wafer cassette transport device 9 to transport the wafer cassette 90 including the wafer B (wafer cassette (wafer B)) from the slot #2 of the host unit 230 to the wafer cassette stocker 5, and to transport the wafer cassette 90 including the wafer C (wafer cassette (wafer C)) from the wafer cassette stocker 5 to the host computer 2 and to connect it to the slot #2 of the host unit 230.

With this operation, the wafer cassette (wafer B) is taken out from the slot #2 of the host unit 230 and stored at the storage location #11 in the wafer cassette stocker 5, for example. The wafer cassette (wafer C) is connected to the slot #2 of the host unit 230. Thereafter, the host unit 230 updates the wafer management table 221 such that the priority, status, and location information of each semiconductor wafer 40 indicate the latest contents.

By the process described with reference to FIG. 15A, the swap operation is executed to replace the wafer cassette (wafer B) having been connected to the slot #2 of the host unit 230 with the wafer cassette (wafer C) having been stored in the wafer cassette stocker 5.

Figure 15B:
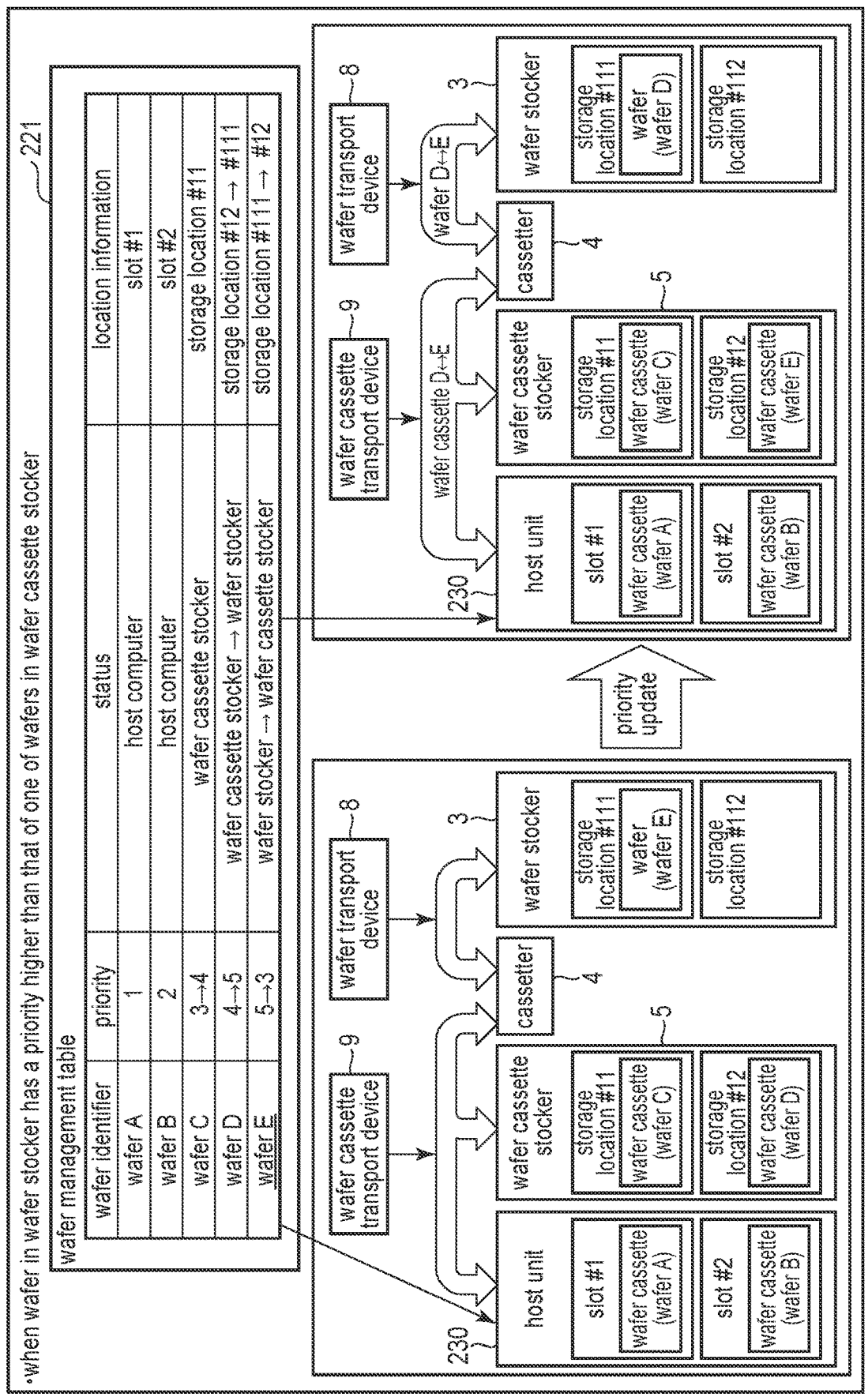
FIG. 15B is a diagram illustrating another operation based on a change in the priority of a semiconductor wafer to be executed in the storage system according to the embodiment.

FIG. 15B is a diagram illustrating an operation executed in the storage system 1 according to the embodiment when the priority of a semiconductor wafer 40 stored in the wafer stocker 3 becomes higher than the priority of a semiconductor wafer 40 included in any one of the wafer cassettes 90 stored in the wafer cassette stocker 5.

In the example shown in FIG. 15B, the wafer A has the highest priority (priority=1st) and the wafer cassette 90 including the wafer A is connected to the slot #1 of the host unit 230. The wafer B has the second highest priority (priority=2nd) and the wafer cassette 90 including the wafer B is connected to the slot #2 of the host unit 230. The wafer C has the third highest priority (priority=3rd) and the wafer cassette 90 including the wafer C is stored at the storage location #11 in the wafer cassette stocker 5. The wafer D has the fourth highest priority (priority=4th), and the wafer cassette 90 including the wafer D is stored at the storage location #12 in the wafer cassette stocker 5. The wafer E has the fifth highest priority (priority=5th) and is stored at the storage location #111 in the wafer stocker 3.

Here, such a case is assumed that the priority of each of the semiconductor wafers 40 is changed by the host unit 230, and as a result, the priority of the wafer E present in the wafer stocker 3 is changed from 5th to 3rd, the priority of the wafer C present in the wafer cassette stocker 5 is changed from 3rd to 4th, and the priority of the wafer D present in the wafer cassette stocker 5 is changed from the 4th to 5th.

The host unit 230 selects the wafer cassette 90 including the semiconductor wafer 40 having the lowest priority from those of the wafer cassettes 90 stored in the wafer cassette stocker 5. Here, the wafer cassette 90 including the wafer D (wafer cassette (wafer D)) is selected. Then, the host unit 230 instructs the wafer cassette transport device 9 to transport the wafer cassette (wafer D) from the wafer cassette stocker 5 to the cassetter 4.

Further, the host unit 230 instructs the wafer transport device 8 to transport the wafer E, whose priority has been raised from 5th to 3rd, from the wafer stocker 3 to the cassetter 4. In this manner, the wafer cassette (wafer D) and the wafer E are transported to the cassetter 4.

Then, the host unit 230 instructs the cassetter 4 to disassemble the transported wafer cassette (wafer D) to the wafer D and an empty cassette case 80. The host unit 230 further instructs the cassetter 4 to assemble a wafer cassette 90 including the wafer E (wafer cassette (wafer E)) from an empty cassette case 80 and the wafer E. The cassetter 4 assembles the wafer cassette (wafer E) from the empty cassette case 80 and the wafer E. The empty cassette case 80 used to assemble the wafer cassette (wafer E) may be the empty cassette case 80 obtained by disassembling the wafer cassette (wafer D).

The host unit 230 instructs the wafer cassette transport device 9 to transport the assembled wafer cassette (wafer E) from the cassetter 4 to the storage location #12 in the wafer cassette stocker 5. Then, the host unit 230 instructs the wafer transport device 8 to transport the wafer D removed from the wafer cassette (wafer D) by disassembling the wafer cassette (wafer D) from the cassetter 4 to the storage location #111 in the wafer stocker 3.

Thus, the wafer cassette (wafer E) is stored at the storage location #12 in the wafer cassette stocker 5 and the wafer D is stored at the storage location #111 in the wafer stocker 3.

After that, the host unit 230 updates the wafer management table 221 such that the priority, status, and location information of each of the semiconductor wafers 40 indicates the latest contents.

In the process described with reference to FIG. 15B, in accordance with the updated priority ranking of each semiconductor wafer 40, the wafer E having been stored at the storage location #111 in the wafer stocker 3 is transported to the cassetter 4 and the wafer cassette 90 including the wafer E is assembled.

Next, the process of transporting a wafer cassette 90 to be accessed to a slot in the host unit 230 will be described. FIGS. 16A to 16F illustrate the case where the host unit 230 of the host computer 2 has four slots and the wafer cassette stocker 5 has four storage locations.

Figure 16A:
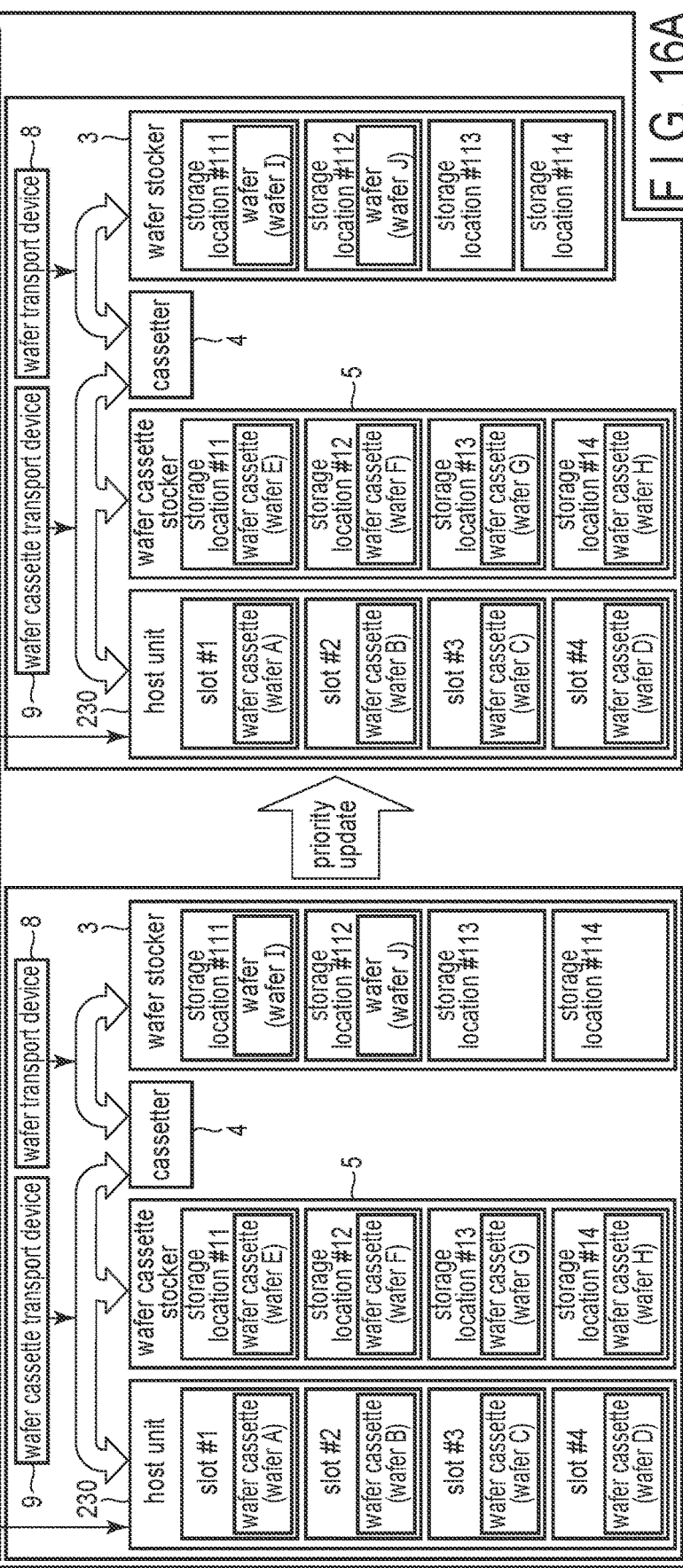
FIG. 16A is a diagram illustrating an operation executed in the storage system according to the embodiment when a wafer cassette to be accessed is already connected to a slot of the host apparatus.

FIG. 16A is a diagram illustrating an operation executed in the storage system 1 according to the embodiment when a wafer cassette 90 to be accessed is already connected to a slot of the host unit 230.

For example, four wafer cassettes 90 including four wafers A to D having priorities from 1st to 4th, respectively, are connected to slots #1 to #4, respectively, of the host unit 230. Moreover, four wafer cassettes 90 including four wafers E to H having priorities of 5th to 8th, respectively, are stored at storage locations #11 to #14, respectively, in the wafer cassette stocker 5. Furthermore, two wafers I to J having priorities of the 9th to 10th, are stored at storage locations #111 to #112, respectively, in the wafer stocker 3.

Here, let us assume now the case where the host unit 230 has determined the wafer D as a semiconductor wafer 40 to be accessed. As described above, when an access request to the wafer D occurs, the priority of the wafer D may be raised. The priority of each of the semiconductor wafers 40 (in this case, the wafers A to C) included in other wafer cassettes 90 connected to slots of the host unit 230 may be lowered, for example, in accordance to the completion of the accessing process to that semiconductor wafer 40, or in accordance with the time elapsed since the last access time to that semiconductor wafer 40. In FIG. 16A, such a case is assumed that the priority of the wafer D is changed from 4th to 1st, the priority of the wafer A is changed from 1st to 2nd, the priority of the wafer B is changed from 2nd to 3rd, and the priority of the wafer C is changed from 3rd to 4th.

The host unit 230 refers to the wafer management table 221 and recognizes that the wafer cassette 90 (wafer cassette (wafer D)), which includes the wafer D that is to be accessed, is already connected to the slot #4 of the host unit 230. The host unit 230 transmits a read command or a write command to the wafer cassette (wafer D) connected to the slot #4, thereby executing reading or writing of data with respect to the wafer D.

Figure 16B:
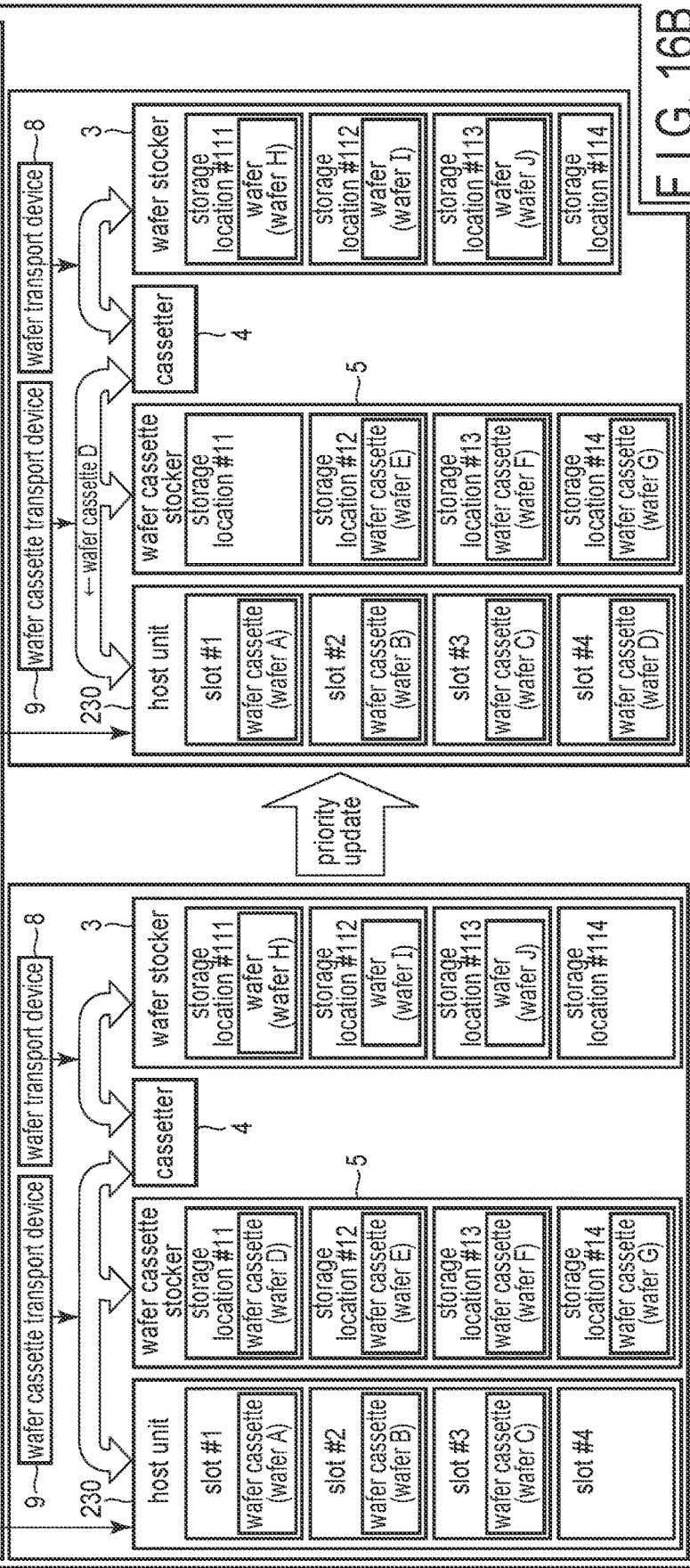
FIG. 16B is a diagram illustrating an operation executed in the storage system according to the embodiment when a wafer cassette to be accessed is stored in a wafer cassette stocker.

FIG. 16B is a diagram illustrating an operation executed in the storage system 1 according to the embodiment when there is a free slot in the host unit 230 and a wafer cassette 90 to be accessed is stored in the wafer cassette stocker 5.

Three wafer cassettes 90 including three wafers A to C having priorities of 1st to 3rd, respectively, are connected to the slots #1 to #3, respectively, of the host unit 230. The slot #4 is a free slot to which none of the wafer cassettes 90 is connected. Further, four wafer cassettes 90 including four wafers D to G having the priorities of 4th to 7th, respectively, are stored at storage locations #11 to #14, respectively, in the wafer cassette stocker 5. In addition, three wafers H to J having the priorities of 8th to 10th are stored in storage locations #111 to #113, respectively, in the wafer stocker 3.

Let us assume here the case where the host unit 230 has determined the wafer D as a semiconductor wafer 40 to be accessed. The priority of each of the semiconductor wafers 40 may be changed by the host unit 230. In FIG. 16B, it is assumed that the priority of the wafer D is changed from 4th to 1st, the priority of the wafer A is changed from 1st to 2nd, the priority of the wafer B is changed from 2nd to 3rd, and the priority of the wafer C is changed from 3rd to 4th.

The host unit 230 refers to the wafer management table 221 and recognizes that the wafer cassette 90 (wafer cassette (wafer D)), which includes the wafer D that is to be accessed, is stored at the storage location #11 in the wafer cassette stocker 5. In addition, the host unit 230 recognizes that the slot #4 of the host unit 230 is a free slot to which none of the wafer cassettes 90 is connected. The host unit 230 instructs the wafer cassette transport device 9 to transport the wafer cassette (wafer D) from the storage location #11 in the wafer cassette stocker 5 to the slot #4 of the host unit 230. Thus, the wafer cassette transport device 9 transports the wafer cassette (wafer D) from the wafer cassette stocker 5 to the slot #4 of the host unit 230 and connects the wafer cassette stocker 5 (wafer D) to the slot #4. As a result, the host unit 230 can execute reading or writing of data with respect to the wafer D, which is a wafer to be accessed.

Figure 16C:
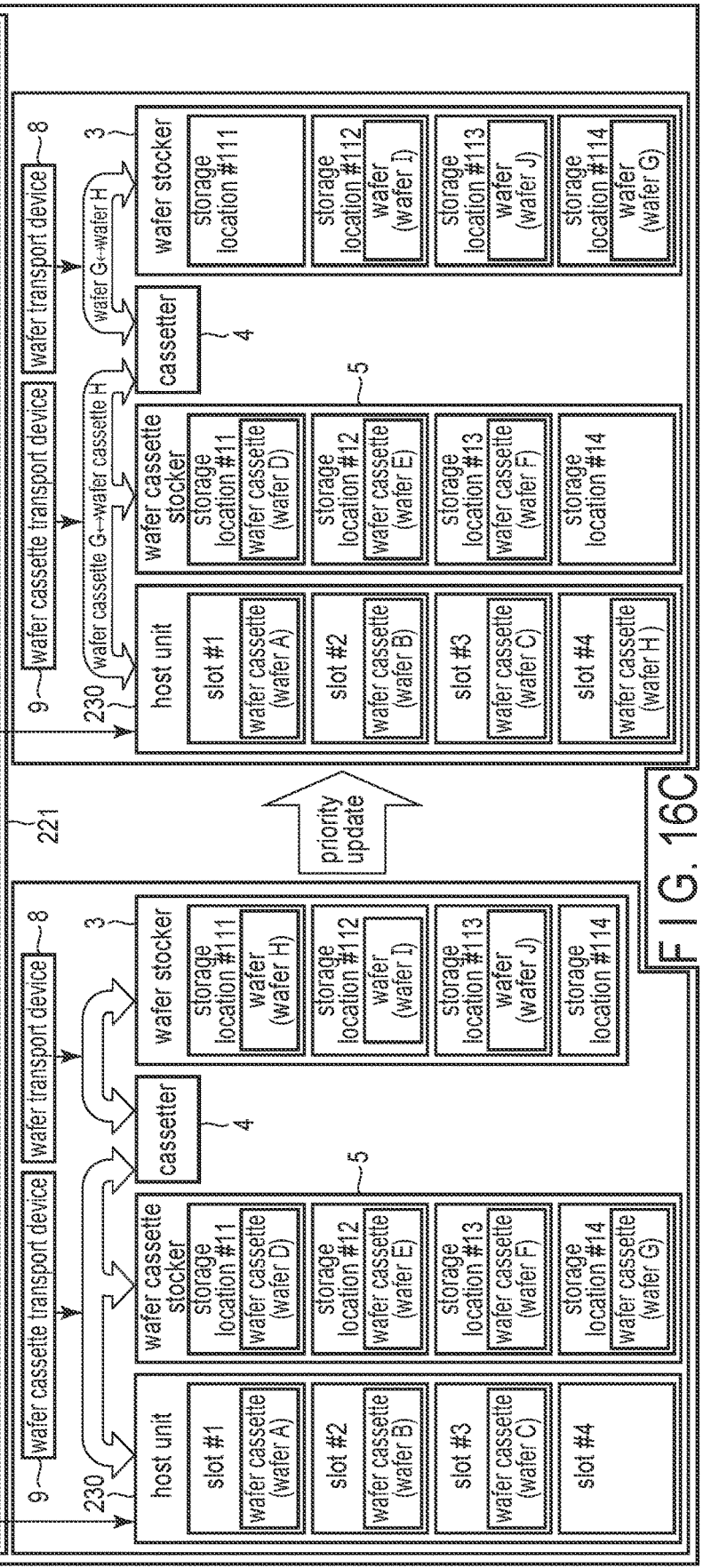
FIG. 16C is a diagram illustrating an operation executed in the storage system according to the embodiment when a wafer cassette to be accessed is not stored in the wafer cassette stocker.

FIG. 16C is a diagram illustrating an operation executed in the storage system 1 according to the embodiment when there is a free slot in the host unit 230 and there is no empty cassette case 80 in the wafer cassette stocker 5, and a wafer cassette 90 to be accessed is not stored in the wafer cassette stocker 5.

Three wafer cassettes 90 including three wafers A to C having the priorities of 1st to 3rd are connected to the slots #1 to #3, respectively, of the host unit 230. The slot #4 is a free slot to which none of the wafer cassettes 90 is connected. Further, four wafer cassettes 90 including four wafers D to G having the priorities of 4th to 7th, respectively, are stored at storage locations #11 to #14, respectively, in the wafer cassette stocker 5. Moreover, three wafers H to J having the priorities of 8th to 10th are stored at storage locations #111 to #113, respectively, in the wafer stocker 3.

Here, let us assume that the wafer H is determined by the host unit 230 as a semiconductor wafer 40 to be accessed. The priority of each of the semiconductor wafers 40 may be changed by the host unit 230. In FIG. 16C, it is assumed that the priority of the wafer H to be accessed is changed from 8th to 1st, and the priorities of wafers A, B, . . . , G are changed to 2nd, 3rd, . . . , 8th, respectively.

The host unit 230 refers to the wafer management table 221 and recognizes that the wafer H, which is to be accessed, is stored at the storage location #111 in the wafer stocker 3. In addition, the host unit 230 recognizes that the slot #4 of the host unit 230 is a free slot to which none of the wafer cassettes 90 is connected. Further, the host unit 230 refers to the cassette management table 222 and recognizes that there is no empty cassette case 80 stored in the wafer cassette stocker 5.

The host unit 230 instructs the wafer transport device 8 to transport the wafer H from the storage location #111 in the wafer stocker 3 to the cassetter 4.

Then, the host unit 230 selects a wafer cassette 90 including the semiconductor wafer 40 having the lowest priority from those of the wafer cassettes 90 stored in the wafer cassette stocker 5. Here, the wafer cassette 90 including the wafer G (wafer cassette (wafer G)) is selected. The host computer 2 instructs the wafer cassette transport device 9 to transport the wafer cassette (wafer G) from the wafer cassette stocker 5 to the cassetter 4. Thus, the wafer cassette (wafer G) and the wafer H are transported to the cassetter 4.

Next, the host unit 230 instructs the cassetter 4 to disassemble the wafer cassette (wafer G) to the wafer G and an empty cassette case 80. Then, the host unit 230 instructs the cassetter 4 to assemble a wafer cassette 90 (wafer cassette (wafer H)) including the wafer H, from the empty cassette case 80 obtained by disassembling the wafer cassette (wafer G) and the wafer H transported to the cassetter 4. The cassetter 4 assembles the wafer cassette (wafer H) from the empty cassette case 80 obtained by disassembling the wafer cassette (wafer G) and the wafer H transported to the cassetter 4.

Further, the host unit 230 instructs the wafer transport device 8 to transport the wafer G removed from the wafer cassette (wafer G) by disassembling the wafer cassette (wafer G), from the cassetter 4 to the storage location #114 in the wafer stocker 3. Further, the host unit 230 instructs the wafer cassette transport device 9 to transport the thus assembled wafer cassette (wafer H) from the cassetter 4 to the slot #4 in the host unit 230. As a result, the wafer G is stored at the storage location #114 in the wafer stocker 3 and the wafer cassette (wafer H) is connected to the slot #4 of the host unit 230.

After that, the host unit 230 updates the wafer management table 221 such that the priority, status, and location information of each of the semiconductor wafers 40 indicate the latest contents.

Figure 16D:
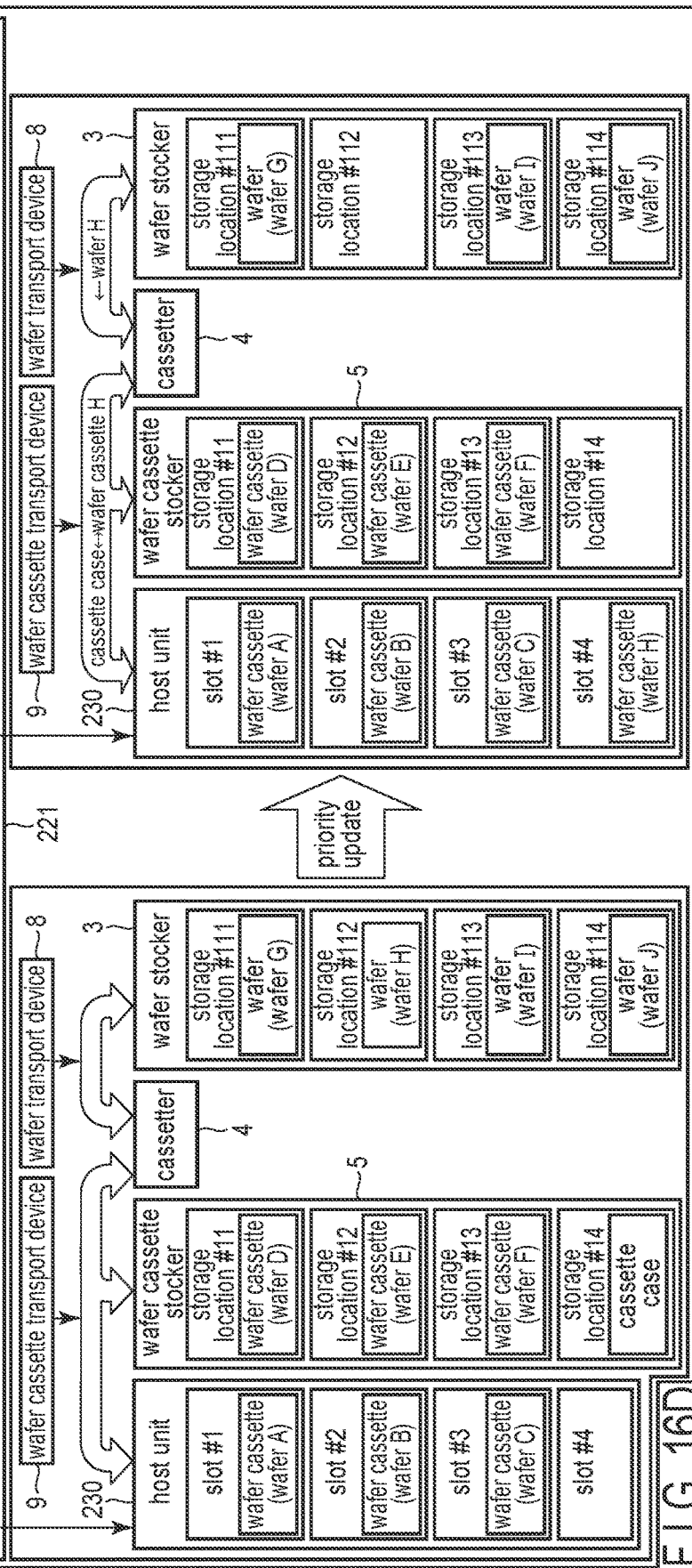
FIG. 16D is a diagram illustrating another operation executed in the storage system according to the embodiment when a wafer cassette to be accessed is not stored in the wafer cassette stocker.

FIG. 16D is a diagram illustrating an operation executed in the storage system 1 according to the embodiment when there is a free slot in the host unit 230, there is an empty cassette case 80 in the wafer cassette stocker 5, and a wafer cassette 90 to be accessed is not stored in the wafer cassette stocker 5.

Three wafer cassettes 90 including three wafers A to C having the priorities of 1st to 3rd, respectively, are connected to the slots #1 to #3, respectively, of the host unit 230. The slot #4 is a free slot to which none of the wafer cassettes 90 is connected. Three wafer cassettes 90 including three wafers D to F having the priorities of 4th to 6th, respectively, are stored at storage locations #11 to #13, respectively, in the wafer cassette stocker 5. An empty cassette case 80 is stored at storage location #14 in the wafer cassette stocker 5. Further, four wafers G to J having the priorities of 7th to 10th are stored at storage locations #111 to #114, respectively, in the wafer stocker 3.

Here, let us assume that the wafer H is determined by the host unit 230 as a semiconductor wafer 40 to be accessed. The priority of each of the semiconductor wafers 40 may be changed by the host unit 230. In FIG. 16D, it is assumed that the priority of the wafer H is changed from 8th to 1st, and the priorities of the wafers A, B, . . . , G are changed to 2nd, 3rd, . . . , 8th, respectively.

The host unit 230 refers to the wafer management table 221 and recognizes that the wafer H, which is to be accessed, is stored at the storage location #112 in the wafer stocker 3. In addition, the host unit 230 recognizes that the slot #4 of the host unit 230 is a free slot to which none of the wafer cassettes 90 is connected. Further, the host unit 230 refers to the cassette management table 222 and recognizes that an empty cassette case 80 is stored at the storage location #14 in the wafer cassette stocker 5.

The host unit 230 instructs the wafer transport device 8 to transport the wafer H from the storage location #112 in the wafer stocker 3 to the cassetter 4.

Then, the host unit 230 instructs the wafer cassette transport device 9 to transport the empty cassette case 80 stored at the storage location #14 in the wafer cassette stocker 5, from the wafer cassette stocker 5 to the cassetter 4. As a result, the empty cassette case 80 and the wafer H are transported to the cassetter 4.

The host unit 230 instructs the cassetter 4 to assemble a wafer cassette 90 (wafer cassette (wafer H)) including the wafer H, from this empty cassette case 80 and the wafer H. The cassetter 4 assembles the wafer cassette (wafer H) from this empty cassette case 80 and the wafer H.

The host unit 230 instructs the wafer cassette transport device 9 to transport the assembled wafer cassette (wafer H) from the cassetter 4 to the slot #4 of the host unit 230 and to connect the assembled wafer cassette (wafer H) to the slot #4. Thus, the wafer cassette (wafer H) is transported to the slot #4 of the host unit 230 and is connected to the slot #4.

After that, the host unit 230 updates the wafer management table 221 such that the priority, status, and location information of each of the semiconductor wafers 40 indicate the latest contents.

Figure 16E:
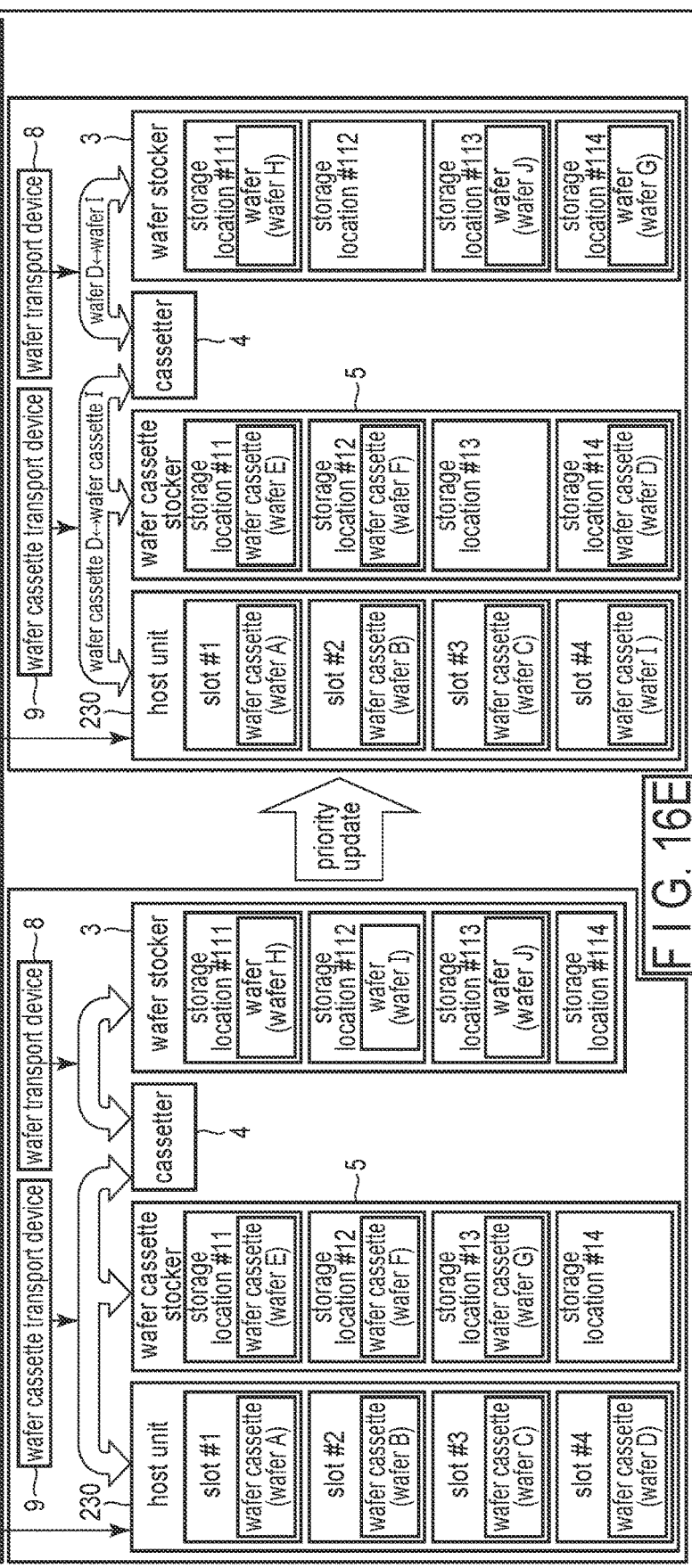
FIG. 16E is a diagram illustrating still another operation executed in the storage system according to the embodiment when a wafer cassette to be accessed is not stored in the wafer cassette stocker.

FIG. 16E is a diagram illustrating an operation executed in the storage system 1 according to the embodiment when there are no free slots in the host unit 230, there is a free storage location in the wafer cassette stocker 5, and a wafer cassette 90 to be accessed is not stored in the wafer cassette stocker 5.

Four wafer cassettes 90 including four wafers A to D having priorities of 1st to 4th are connected to slots #1 to #4, respectively, of the host unit 230. Further, three wafer cassettes 90 including three wafers E to G having priorities of 5th to 7th are stored at storage locations #11 to #13, respectively, in the wafer cassette stocker 5. The storage location #14 in the wafer cassette stocker 5 is a free storage location where none of the wafer cassette 90 or the empty cassette case 80 is stored. Further, three wafers H to J having priorities of 8th to 10th are stored at storage locations #111 to #113, respectively, in the wafer stocker 3.

Let us assume here that the wafer I is determined by the host unit 230 as a semiconductor wafer 40 to be accessed. The priority of each of the semiconductor wafers 40 may be changed by the host unit 230. In FIG. 16E, it is assumed that the priority of the wafer I is changed from 9th to 1st, and the priorities of the wafers A, B, . . . , H are changed to 2nd, 3rd, . . . , 9th, respectively.

The host unit 230 refers to the wafer management table 221 and recognizes that the wafer I, which is to be accessed, is stored at the storage location #112 in the wafer stocker 3. In addition, the host unit 230 recognizes that there is no free slot in the host unit 230. Further, the host unit 230 refers to the cassette management table 222 and recognizes that there is a free storage location #14 in the wafer cassette stocker 5.

Here, the host unit 230 determines whether or not a wafer cassette 90 including a semiconductor wafer 40 having a priority lower than that of the wafer I, which is to be accessed, is connected to the host unit 230.

When there is no free slot in the host unit 230, there is a free storage location in the wafer cassette stocker 5, and the wafer cassette 90 including the semiconductor wafer 40 having the priority lower than that of the wafer I is connected to the host unit 230, the host unit 230 determines a wafer cassette 90 including a semiconductor wafer 40 having the lowest priority among the wafer cassettes 90 connected to the host unit 230 (here, wafer cassette (wafer D) including the wafer D), as a wafer cassette 90 to be swapped.

Then, the host unit 230 instructs the wafer cassette transport device 9 to transport the wafer cassette (wafer D) from the slot #4 of the host unit 230 to the storage location #14 in the wafer cassette stocker 5.

As described above, the wafer cassette (wafer D) is removed from the slot #4 of the host unit 230 and moved to the storage location #14 in the wafer cassette stocker 5. Thus, the slot #4 of the host unit 230 becomes a free slot. Therefore, the storage system 1 at this time is in the state where there is a free slot in the host unit 230, there is no empty cassette case 80 in the wafer cassette stocker 5, and the semiconductor wafers 40 to be accessed is in the wafer stocker 3. This is the same condition as that illustrated in FIG. 16C.

In the following, the host unit 230 can connect the wafer cassette 90 including the semiconductor wafer I to be accessed to the slot #4 of the host unit 230 by performing the same operation as that described with reference to FIG. 16C.

More specifically, the host unit 230 first instructs the wafer transport device 8 to transport the wafer I from the storage location #112 in the wafer stocker 3 to the cassetter 4.

Since the wafer cassette 90 including the semiconductor wafer 40 having the priority lower than that of the wafer I is stored in the wafer cassette stocker 5, the host unit 230 selects the wafer cassette 90 including the semiconductor wafer 40 having the lowest priority among the wafer cassettes 90 stored in the wafer cassette stocker 5. Here, the wafer cassette 90 including the wafer G (wafer cassette (wafer G)) is selected.

The host unit 230 instructs the wafer cassette transport device 9 to transport the wafer cassette (wafer G) from the storage location #13 in the wafer cassette stocker 5 to the cassetter 4. Thus, the wafer cassette (wafer G) and the wafer I are transported to the cassetter 4.

Next, the host unit 230 instructs the cassetter 4 to disassemble the wafer cassette (wafer G) into the wafer G and an empty cassette case 80. Then, the host unit 230 instructs the cassetter 4 to assemble a wafer cassette 90 including the wafer I (wafer cassette (wafer I)), from the empty cassette case 80 obtained by disassembling the wafer cassette (wafer G) and the wafer I. The cassetter 4 assembles the wafer cassette (wafer I) from the empty cassette case 80 obtained by disassembling the wafer cassette (wafer G) and the wafer I.

The host unit 230 instructs the wafer transport device 8 to transport the wafer G removed from the disassembled wafer cassette (wafer G), from the cassetter 4 to the free storage location #114 in the wafer stocker 3. Further, the host unit 230 instructs the wafer cassette transport device 9 to transport the assembled wafer cassette (wafer I) from the cassetter 4 to the slot #4 of the host unit 230 and to connect the assembled wafer cassette (wafer I) to the slot #4. As a result, the wafer cassette (wafer I) is connected to the slot #4 of the host unit 230. Further, the wafer G removed from the disassembled wafer cassette (wafer G) is stored at the storage location #114 in the wafer stocker 3.

After that, the host unit 230 updates the wafer management table 221 such that the priority, status, and location information of each of the semiconductor wafers 40 indicate the latest contents.

Figure 16F:
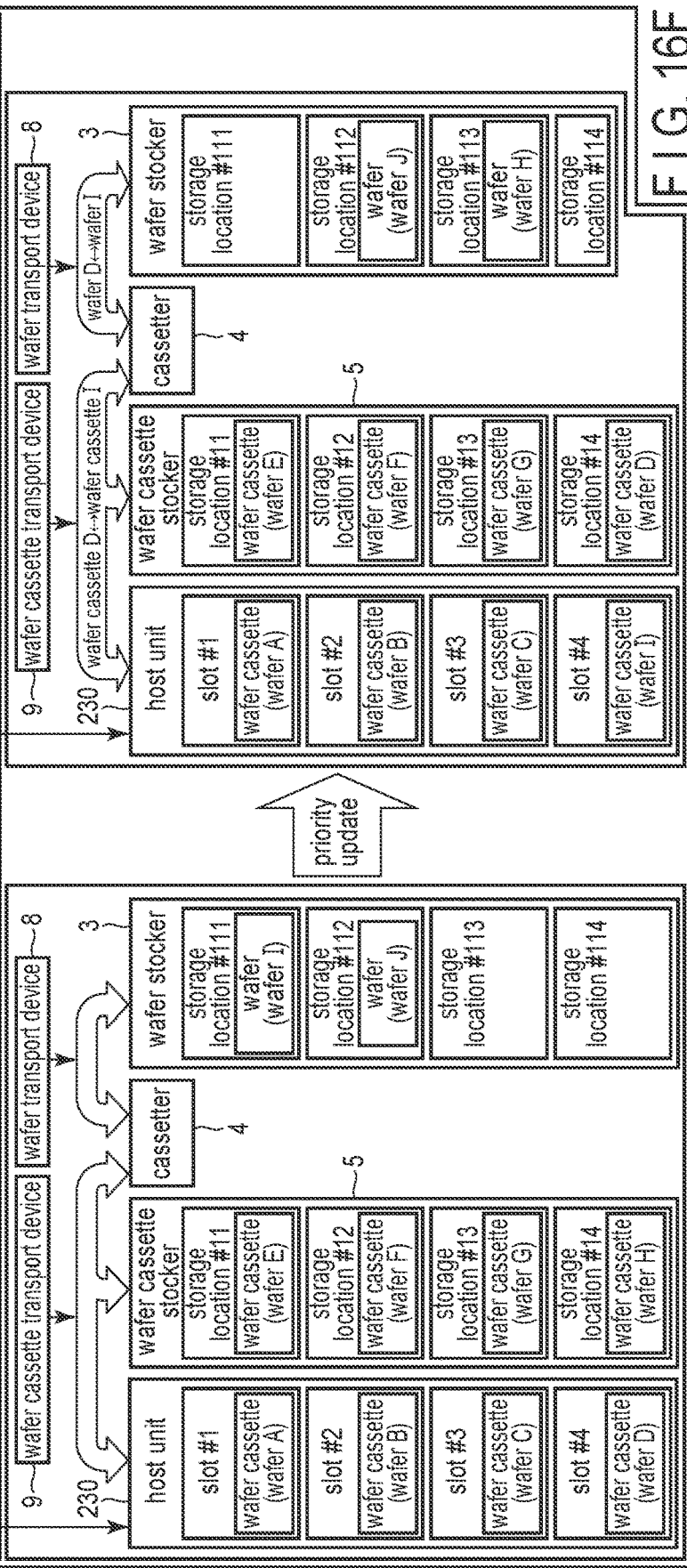
FIG. 16F is a diagram illustrating still another operation executed in the storage system according to the embodiment when a wafer cassette to be accessed is not stored in the wafer cassette stocker.

FIG. 16F is a diagram illustrating an operation to be executed in the storage system 1 according to the embodiment when there is no free slot in the host unit 230, there is no free storage location in the wafer cassette stocker 5, and a wafer cassette 90 including a semiconductor wafer 40 to be accessed is not stored in the wafer cassette stocker 5.

Four wafer cassettes 90 including four wafers A to D having priorities of 1st to 4th are connected to slots #1 to #4, respectively, of the host unit 230. Further, four wafer cassettes 90 including four wafers E to H having priorities of 5th to 8th are stored at storage locations #11 to #14, respectively, in the wafer cassette stocker 5. Furthermore, two wafers I to J having priorities of 9th to 10th are stored at storage locations #111 to #112, respectively, in the wafer stocker 3.

Let us assume here that the wafer I is determined by the host unit 230 as a semiconductor wafer 40 to be accessed. The priority of each of the semiconductor wafers 40 may be changed by the host unit 230. In FIG. 16F, it is assumed that the priority of the wafer I is changed from 9th to 1st, and the priority of the wafers A, B, . . . , H are changed to 2nd, 3rd, . . . , 9th, respectively.

The host unit 230 refers to the wafer management table 221 and recognizes that the wafer I, which is to be accessed, is stored at the storage location #111 in the wafer stocker 3. In addition, the host unit 230 recognizes that there is no free slot in the host unit 230. Further, the host unit 230 refers to the cassette management table 222 and recognizes that there is no free storage location in the wafer cassette stocker 5.

Here, the host unit 230 determines whether or not a wafer cassette 90 including a semiconductor wafer 40 having a priority lower than that of the wafer I, which is to be accessed, is connected to the host unit 230.

When there is no free slot in the host unit 230, there is no free storage location in the wafer cassette stocker 5, and the wafer cassette 90 including the semiconductor wafer 40 having the priority lower than that of the wafer I is connected to the host unit 230, the host unit 230 determines a wafer cassette 90 including a semiconductor wafer 40 having the lowest priority among the wafer cassettes 90 connected to the host unit 230 (here, wafer cassette (wafer D) including the wafer D), as a wafer cassette 90 to be swapped.

The wafer cassette stocker 5 stores a wafer cassettes 90 including a semiconductor wafers 40 having a priority lower than that of the wafer I and lower than that of the wafer D included in the wafer cassette 90 to be swapped. Therefore, the host unit 230 determines the wafer cassette 90 including the semiconductor wafer 40 having the lowest priority among the wafer cassettes 90 stored in the wafer cassette stocker 5 (here, wafer cassette (wafer H) including the wafer H), as a wafer cassette 90 to be disassembled.

Then, the host unit 230 instructs the wafer transport device 8 to transport the wafer I, which is to be accessed, from the storage location #111 in the wafer stocker 3 to the cassetter 4. Further, the host unit 230 instructs the wafer cassette transport device 9 to transport the wafer cassette (wafer H), which is to be disassembled, from the storage location #14 in the wafer cassette stocker 5 to the cassetter 4. Thus, the wafer cassette (wafer H) and the wafer I are transported to the cassetter 4. Further, since the wafer cassette (wafer H) is removed from the storage location #14 in the wafer cassette stocker 5, the storage location #14 in the wafer cassette stocker 5 becomes a free storage location.

Next, the host unit 230 instructs the cassetter 4 to disassemble the wafer cassette (wafer H) into the wafer H and an empty cassette case 80. Further, the host unit 230 instructs the cassetter 4 to assemble a wafer cassette 90 including the wafer I (wafer cassette (wafer I)), from the empty cassette case 80 obtained by disassembling the wafer cassette (wafer H) and the wafer I.

The cassetter 4 disassembles the wafer cassette (wafer H). Then, the cassetter 4 assembles the wafer cassette (wafer I) from the empty cassette case 80 obtained by disassembling the wafer cassette (wafer H) and the wafer I.

The host unit 230 instructs the wafer transport device 8 to transport the wafer H removed from the disassembled wafer cassette (wafer H), from the cassetter 4 to the free storage location #113 in the wafer stocker 3. As a result, the wafer H removed from the disassembled wafer cassette (wafer H) is stored at the storage location #113 in the wafer stocker 3.

Further, the host unit 230 instructs the wafer cassette transport device 9 to transport the wafer cassette (wafer D) from the slot #4 of the host unit 230 to the storage location #14 in the wafer cassette stocker 5. The wafer cassette (wafer D) may be transported at any timing after the storage location #14 in the wafer cassette stocker 5 becomes a free storage location.

Thus, the wafer cassette (wafer D) is removed from the slot #4 of the host unit 230 and moved to the storage location #14 in the wafer cassette stocker 5. As a result, the slot #4 of the host unit 230 becomes a free slot.

Then, the host unit 230 instructs the wafer cassette transport device 9 to transport the assembled wafer cassette (wafer I) from the cassetter 4 to the slot #4 of the host unit 230 and to connect the assembled wafer cassette (wafer I) to the slot #4. As a result, the wafer cassette (wafer I) is transported to the slot #4 of the host unit 230 and is connected to the slot #4.

In this manner, a wafer cassette including a semiconductor wafer 40 having a priority which is lower than that of the wafer I, which is to be accessed, and which is lowest among the wafer cassettes 90 located in any one of the host unit 230 and the wafer cassette stocker 5 (here, wafer cassette (wafer H) including the wafer H) is disassembled. As a result, the wafer cassette (wafer D) to be swapped is moved, without being disassembled, to the storage location #14 in the wafer cassette stocker 5 where the wafer cassette (wafer H) has been stored.

Then, the host unit 230 updates the wafer management table 221 such that the priority, status, and location information of each of the semiconductor wafers 40 indicate the latest contents.

Figure 17:
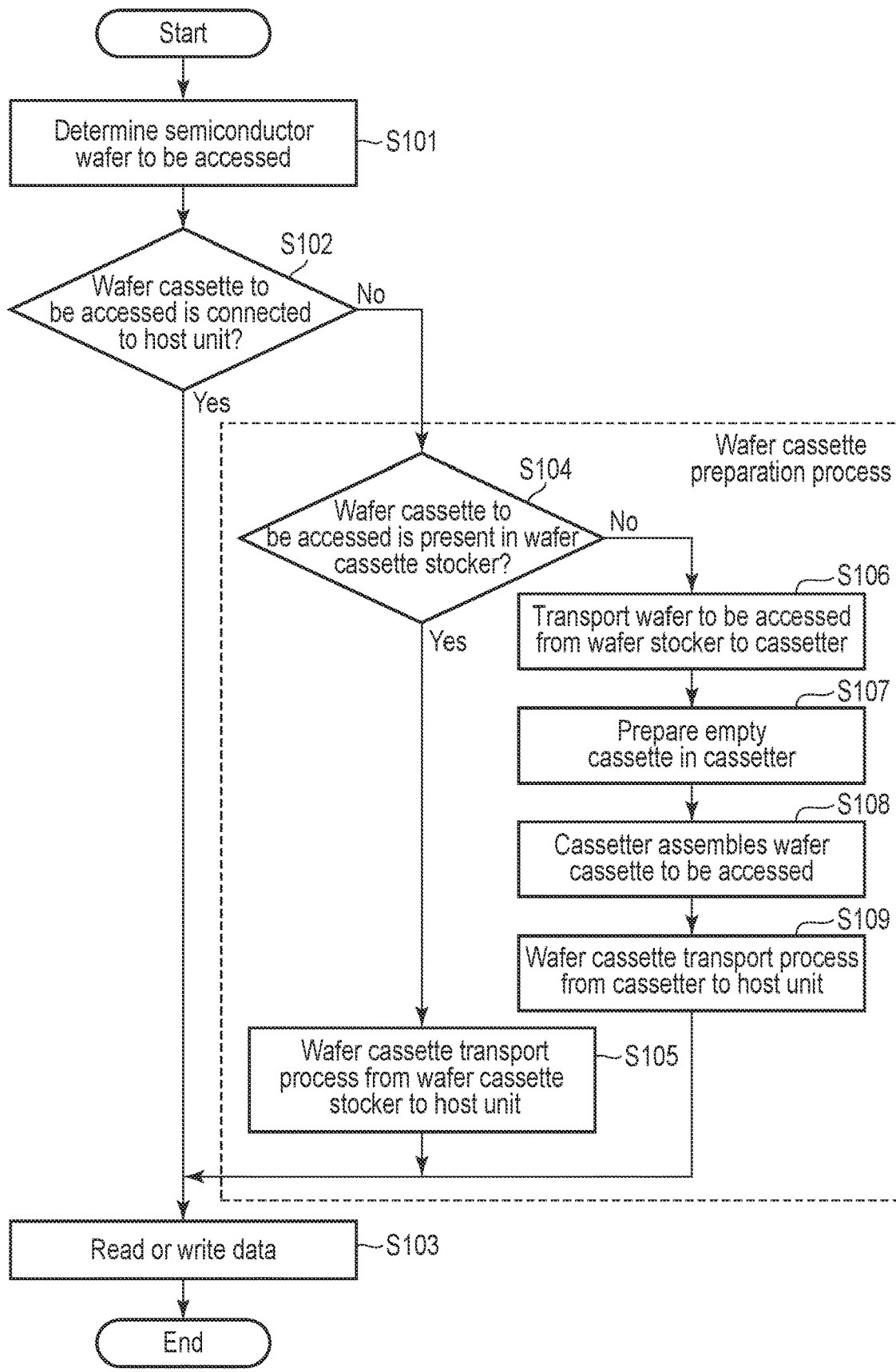
FIG. 17 is a flowchart illustrating a procedure of reading or writing of data executed by the host apparatus in the storage system according to the embodiment.

FIG. 17 is a flowchart illustrating the procedure of a data reading or writing process controlled by the host unit 230 in the storage system 1 according to the embodiment.

First, the host unit 230 determines a semiconductor wafer 40 to be accessed (step S101). Based on a data read or write request received from the application program 211, the OS 212 or file system 213 determines a semiconductor wafer 40 to be accessed, among the plurality of semiconductor wafers 40 managed in the storage system 1.

The host unit 230 determines whether or not a wafer cassette 90 including the semiconductor wafer 40 to be accessed is connected to one of the slots of the host unit 230 (step S102).

When the wafer cassette 90 including the semiconductor wafer 40 to be accessed is connected to any one of the slots of the host unit 230 (Yes in step S102), the host unit 230 executes reading or writing data from or to the semiconductor wafer 40 to be accessed (step S103).

When the wafer cassette 90 including the semiconductor wafer 40 to be accessed is not connected to any slot of the host unit 230 (No in step S102), the host unit 230 executes a wafer cassette preparation process for connecting the wafer cassette 90 including the semiconductor wafer 40 to be accessed, to a slot of the host unit 230.

In the wafer cassette preparation process, the host unit 230 determines whether or not the wafer cassette 90 including the semiconductor wafer 40 to be accessed is stored in the wafer cassette stocker 5 (step S104). In step S104, the host unit 230 can determine whether or not the wafer cassette 90 including the semiconductor wafer 40 to be accessed is stored in the wafer cassette stocker 5 by referring to the wafer management table 221.

When the wafer cassette 90 including the semiconductor wafer 40 to be accessed is stored in the wafer cassette stocker 5 (Yes in step S104), the host unit 230 instructs the wafer cassette transport device 9 to transport the wafer cassette 90 including the semiconductor wafer 40 to be accessed, from the wafer cassette stocker 5 to a slot of the host unit 230, and to connect the wafer cassette 90 to the slot (step S105).

After that, the host unit 230 executes reading or writing of data with respect to the semiconductor wafer 40 to be accessed (step S103).

When the wafer cassette 90 including the semiconductor wafer 40 to be accessed is not stored in the wafer cassette stocker 5 (No in step S104), the host unit 230 identifies a storage location in the wafer stocker 3, where the semiconductor wafer 40 to be accessed is stored. Then, the host unit 230 instructs the wafer transport device 8 to transport the semiconductor wafer 40 to be accessed, from the identified storage location in the wafer stocker 3 to the cassetter 4 (step S106).

Then, the host unit 230 prepares an empty cassette case 80 in the cassetter 4 (step S107). In step S107, the host unit 230 may instruct the wafer cassette transport device 9 to transport the empty cassette case 80 from the wafer cassette stocker 5 to the cassetter 4. When there is no empty cassette case 80 stored in the wafer cassette stocker 5, the host unit 230 may instruct the wafer cassette transport device 9 to transport a wafer cassette 90 including a semiconductor wafer 40 having a priority lower than that of the semiconductor wafer 40 to be accessed, from the wafer cassette stocker 5 (or a slot in the host unit 230) to the cassetter 4, and may also instruct the cassetter 4 to disassemble this wafer cassette 90.

The host unit 230 instructs the cassetter 4 to assemble a wafer cassette 90 including the semiconductor wafer 40 to be accessed, from the semiconductor wafer 40 to be accessed transported in step S106 and the empty cassette case 80 prepared in step S107 (step S108).

The host unit 230 instructs the wafer cassette transport device 9 to transport the wafer cassette 90 including the semiconductor wafer 40 to be accessed, which has been assembled in step S108, from the cassetter 4 to a slot in the host unit 230, and to connect the wafer cassette 90 including the semiconductor wafer 40 to be accessed, to the slot (step S109).

After that, the host unit 230 executes reading or writing of data from or to the semiconductor wafer 40 to be accessed (step S103).

Next, with reference to FIGS. 18 to 23, the procedures of the data reading or writing process described with reference to FIG. 17 will be explained in detail.

Figure 18:
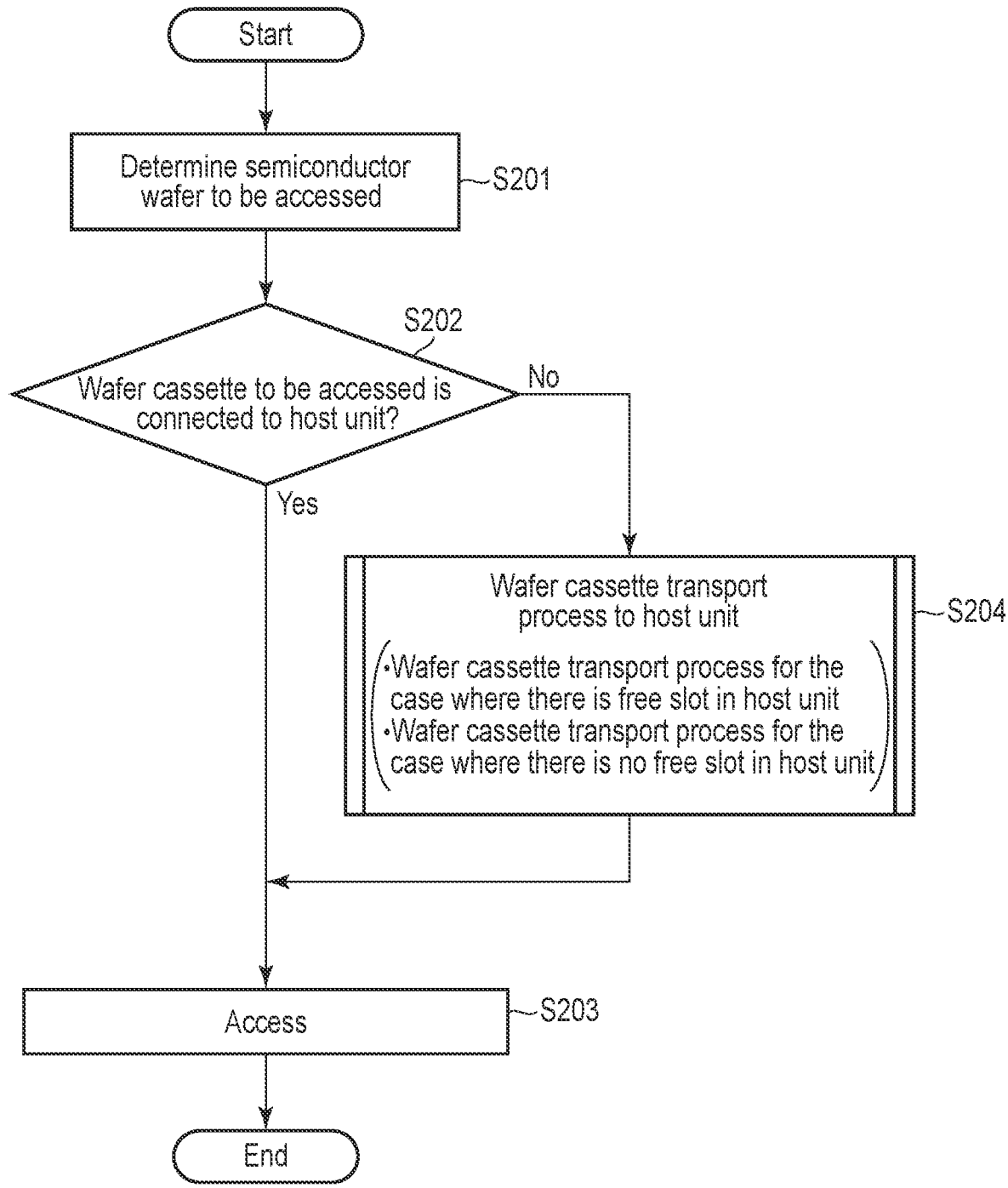
FIG. 18 is a flowchart illustrating a procedure of an accessing process executed by the host apparatus in the embodiment.

FIG. 18 is a flowchart illustrating the procedure of the accessing process controlled by the host unit 230 in the storage system 1.

First, the host unit 230 determines a semiconductor wafer 40 to be accessed (step S201). The OS 212 or the file system 213 determines the semiconductor wafer 40 to be accessed, based on a data read or write request received from the application program 211.

The host unit 230 determines whether or not a wafer cassette 90 including the semiconductor wafer 40 to be accessed is connected to one of the slots of the host unit 230 (step S202). The host unit 230 can determine whether the semiconductor wafer 40 to be accessed is connected to one of the slots of the host unit 230 by referring to the wafer management table 221.

When the wafer cassette 90 including the semiconductor wafer 40 to be accessed is connected to one of the slots of the host unit 230 (Yes in step S202), the host unit 230 executes reading or writing of data from or to the semiconductor wafer 40 to be accessed (step S203).

When the wafer cassette 90 including the semiconductor wafer 40 to be accessed is not connected to any slot of the host unit 230 (No in step S202), the host unit 230 executes a wafer cassette transporting process to the host unit 230 (step S204). In the wafer cassette transporting process, the host unit 230 executes a wafer cassette transporting process for the case where there is a free slot in the host unit 230, or a wafer cassette transporting process for the case where there is no free slot in the host unit 230. By the wafer cassette transporting process of step S204, the host unit 230 can connect the wafer cassette 90 including the semiconductor wafer 40 to be accessed, to a slot of the host unit 230.

After that, the host unit 230 executes reading or writing of data from or to the semiconductor wafer 40 to be accessed (step S203).

Figure 19:
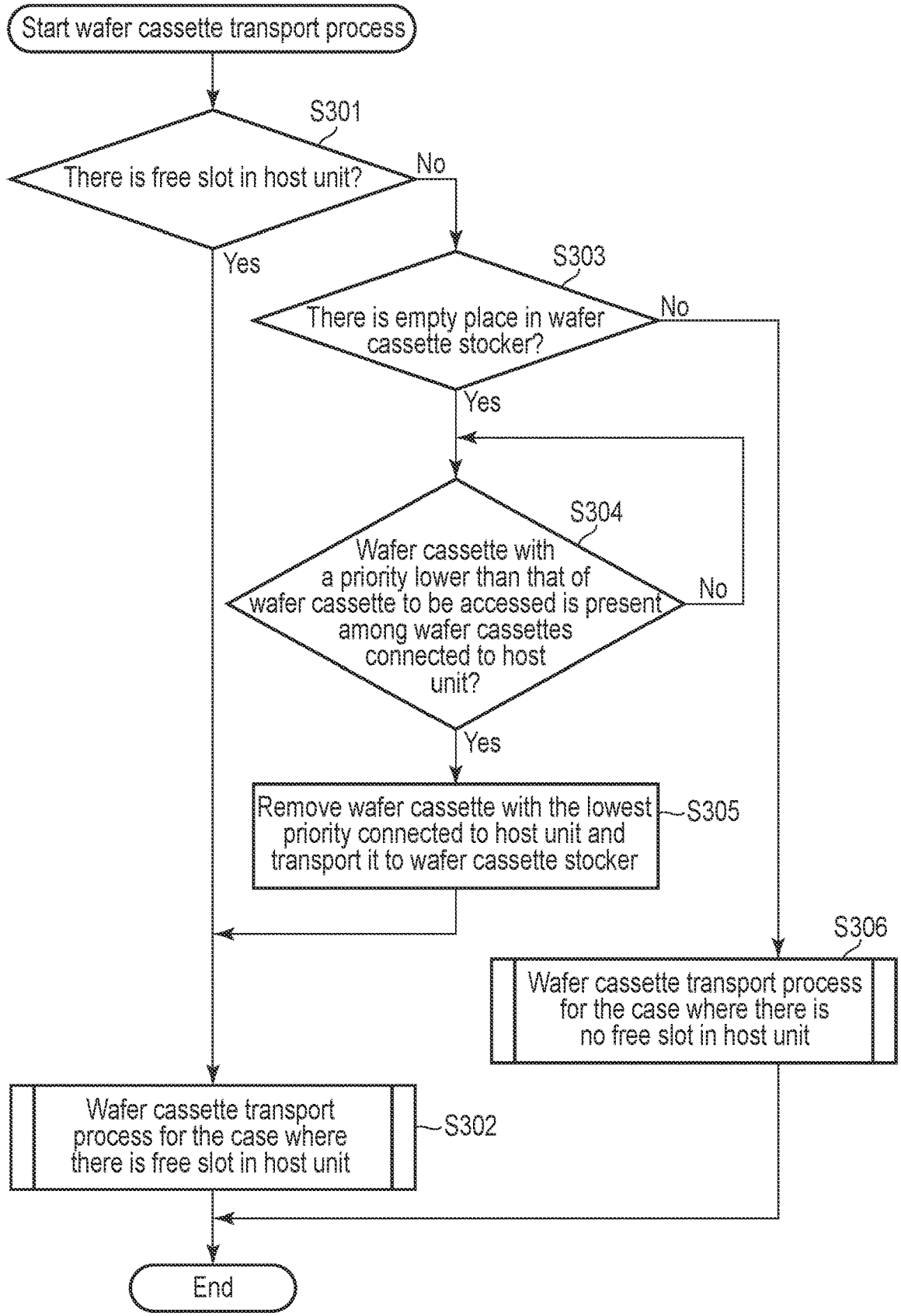
FIG. 19 is a flowchart illustrating a procedure of a wafer cassette transporting process executed by the host apparatus according to the embodiment.

FIG. 19 is a flowchart illustrating the wafer cassette transporting process executed by the host unit 230 in the storage system 1 of the embodiment.

When the wafer cassette transporting process is started, the host unit 230 determines whether or not there is a free slot in the host unit 230 (step S301).

When it is confirmed that there is a free slot in the host unit 230 (Yes in step S301), the host unit 230 executes a wafer cassette transporting process for the case where there is a free slot in the host unit 230 (step S302). The details of the wafer cassette transporting process for the case where there is a free slot in the host unit 230 will be described later with reference to FIG. 20.

When there is no free slot in the host unit 230 (No in step S301), the host unit 230 determines whether or not there is a free storage location in the wafer cassette stocker 5 (step S303). The free storage location in the wafer cassette stocker 5 is a storage location where neither an empty cassette case 80 nor a wafer cassette 90 is stored.

When there is a free storage location in the wafer cassette stocker 5 (Yes in step S303), the host unit 230 determines whether or not a wafer cassette 90 including a semiconductor wafer 40 having a priority lower than that of the semiconductor wafer 40 to be accessed is present among the wafer cassettes 90 connected to the slots of the host unit 230 (step S304).

When the wafer cassette 90 including the semiconductor wafers 40 having a priority lower than that of the semiconductor wafers 40 to be accessed is not present among the wafer cassettes 90 connected to the slots of the host unit 230 (No in step S304), the host unit 230 waits until the priority of each semiconductor wafer 40 is changed and thus the a wafer cassette 90 including the semiconductor wafer 40 having a priority lower than that of the semiconductor wafer 40 to be accessed is present among the wafer cassettes 90 connected to the slots of the host unit 230 (step S304).

When a wafer cassette 90 including a semiconductor wafer 40 having a priority lower than that of the semiconductor wafer 40 to be accessed is present among the wafer cassettes 90 connected to the slots of the host unit 230 (Yes in step S304), the host unit 230 selects a wafer cassette 90 including a semiconductor wafer 40 having the lowest priority from among the wafer cassettes 90 connected to the slots of the host unit 230, as a wafer cassette 90 to be swapped.

Then, the host unit 230 instructs the wafer cassette transport device 9 to transport the selected wafer cassette 90 to be swapped, from a slot of the host unit 230 to the wafer cassette stocker 5 (step S305). In step S305, the wafer cassette transport device 9 removes the wafer cassette 90 to be swapped from the slot of the host unit 230 and transports it to the wafer cassette stocker 5.

Thus, there is a free slot created in the host unit 230, and therefore the host unit 230 executes the wafer cassette transporting process for the case where there is a free slot in the host unit 230 (step S302).

When there is no free storage location in the wafer cassette stocker 5 (No in step S303), the host unit 230 executes the wafer cassette transporting process for the case where there is no free slot in the host unit 230 (step S306). The wafer cassette transporting process for the case where there is no free slot in the host unit 230 will be described later in detail with reference to FIG. 21.

Next, the details of the wafer cassette transporting processing for the case where there is a free slot in the host unit 230 will be described.

Figure 20:
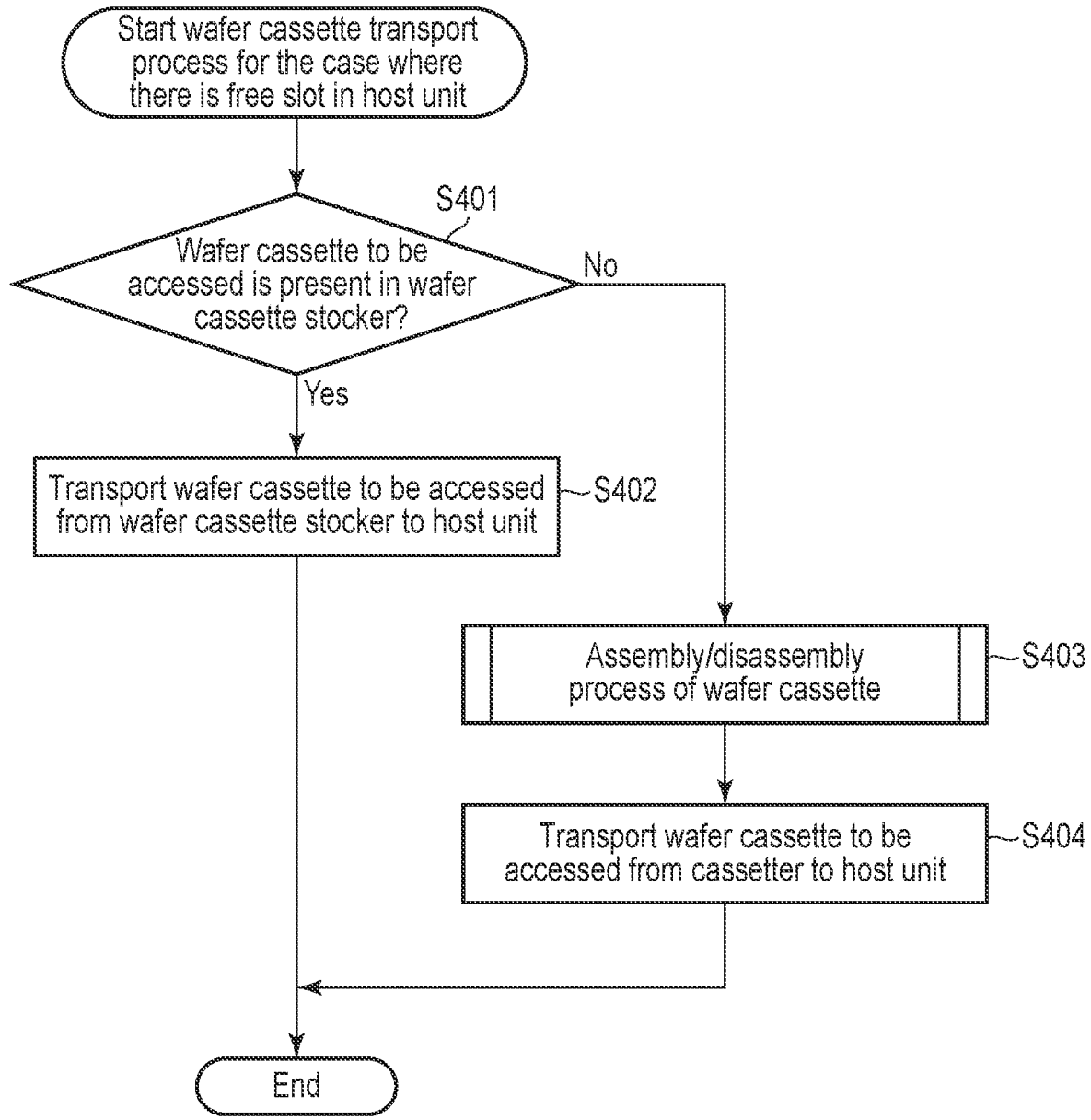
FIG. 20 is a flowchart illustrating a procedure of a wafer cassette transporting process for the case where there is a free slot in the host apparatus, executed by the host apparatus according to the embodiment.

FIG. 20 is a flowchart illustrating the procedure of the wafer cassette transporting process for the case where there is a free slot in the host unit 230, executed by the host unit 230 in the storage system 1.

First, the host unit 230 determines whether or not a wafer cassette 90 to be accessed is stored in the wafer cassette stocker 5 (step S401). The host unit 230 can determine whether or not the wafer cassette 90 to be accessed is stored in the wafer cassette stocker 5 by referring to the wafer management table 221.

When the wafer cassette 90 to be accessed is stored in the wafer cassette stocker 5 (Yes in step S401), the host unit 230 instructs the wafer cassette transport device 9 to transport the wafer cassette 90 to be accessed, from the wafer cassette stocker 5 to a free slot in the host unit 230, and to connect the wafer cassette 90 to be accessed, to the free slot (step S402). In step S402, the wafer cassette transport device 9 transports the wafer cassette 90 to be accessed, from the wafer cassette stocker 5 to the host computer 2, and then connects the wafer cassette 90 to be accessed, to the free slot in the host unit 230.

When the wafer cassette 90 to be accessed is not stored in the wafer cassette stocker 5 (No in step S401), the host unit 230 instructs the cassetter 4 to execute an assembly or disassembly process of a wafer cassette 90 (step S403). The assembly or disassembly process of the wafer cassette 90 executed in step S403 will be described later in detail with reference to FIG. 22.

The host unit 230 instructs the wafer cassette transport device 9 to transport the wafer cassette 90 to be accessed, which has been assembled in step S404, from the cassetter 4 to a free slot in the host unit 230, and to connect the wafer cassette 90 to the free slot (step S404). In step S404, the wafer cassette transport device 9 transports the assembled wafer cassette 90 to be accessed, from the cassetter 4 to the host computer 2, and connects it to the free slot in the host unit 230.

Next, the details of the wafer cassette transporting process for the case where there is no free slot in the host unit 230 will be described.

Figure 21:
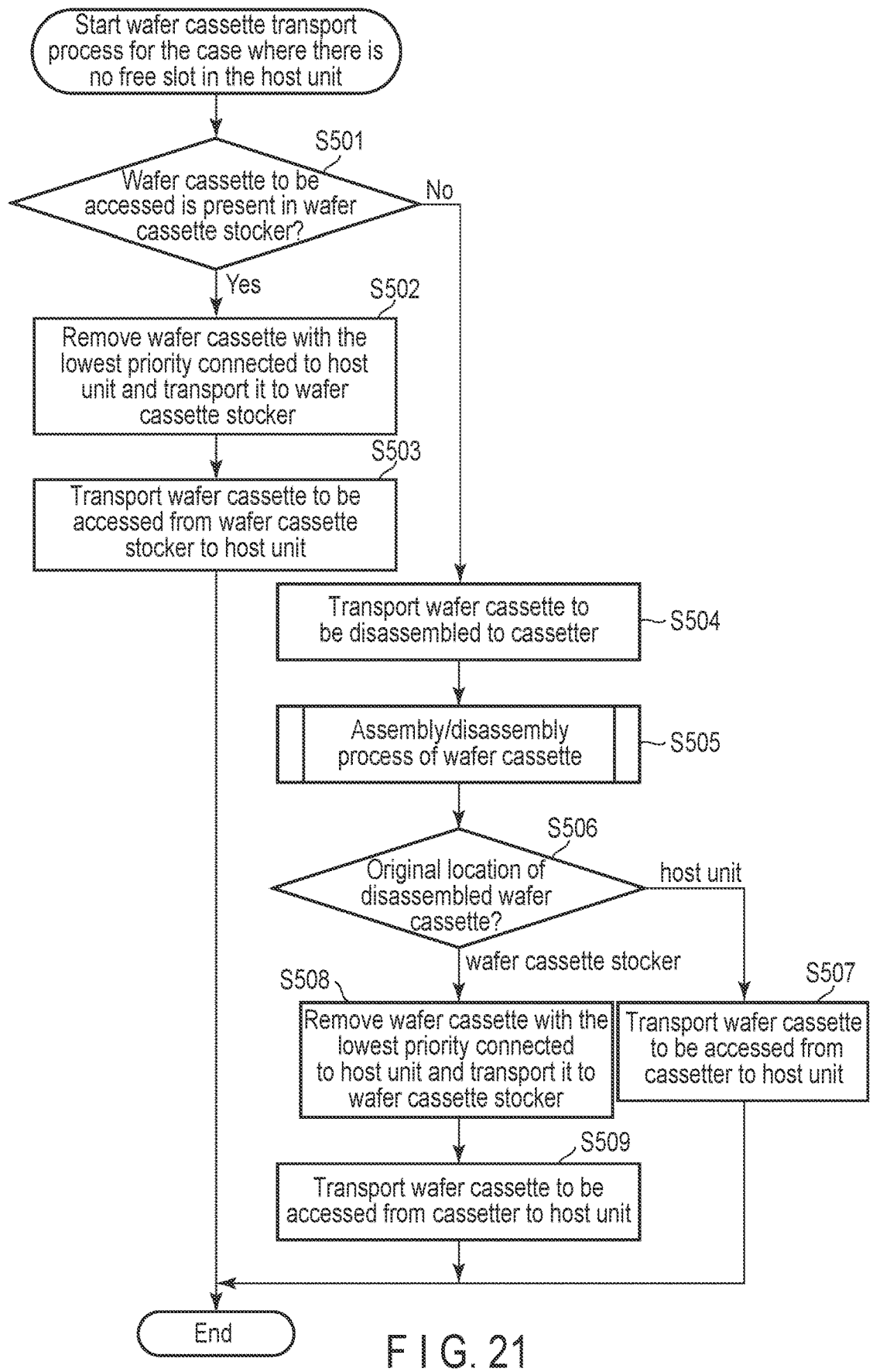
FIG. 21 is a flowchart illustrating a procedure of a wafer cassette transporting process for the case where there is no free slot in the host apparatus, executed by the host apparatus according to the embodiment.

FIG. 21 is a flowchart illustrating the procedure of the wafer cassette transporting process for the case where there is no free slot in the host unit 230, executed by the host unit 230 in the storage system 1 according to the embodiment. Here, such a case is assumed that there is no free slot in the host unit 230 and no free storage location in the wafer cassette stocker 5, as described with reference to FIG. 16F.

First, the host unit 230 determines whether or not a wafer cassette 90 including a semiconductor wafer 40 to be accessed is stored in the wafer cassette stocker 5 (step S501). The host unit 230 can determine whether or not the wafer cassette 90 including the semiconductor wafer 40 to be accessed is stored in the wafer cassette stocker 5 by referring to the wafer management table 221.

When the wafer cassette 90 to be accessed is stored in the wafer cassette stocker 5 (Yes in step S501), the host unit 230 selects, as the wafer cassette 90 to be swapped, a wafer cassette 90 including a semiconductor wafer having a priority which is lower than that of the semiconductor wafer 40 to be accessed and which is lowest among the wafer cassettes 90 that are connected to the slots of the host unit 230.

Then, the host unit 230 instructs the wafer cassette transport device 9 to transport the wafer cassette 90 to be swapped, from a slot of the host unit 230 to the wafer cassette stocker 5 (step S502).

Further, the host unit 230 instructs the wafer cassette transport device 9 to transport the wafer cassette 90 including the semiconductor wafer 40 to be accessed, from the wafer cassette stocker 5 to the slot of the host unit 230, to which the wafer cassette 90 to be swapped has been connected (Step S503).

In steps S502 and S503, the wafer cassette transport device 9 removes the wafer cassette 90 to be swapped, from the slot of the host unit 230. The slot of the host unit 230 from which the wafer cassette 90 to be swapped has been removed becomes a free slot. The wafer cassette transport device 9 transports the thus removed wafer cassette 90 to the wafer cassette stocker 5. Then, the wafer cassette transport device 9 transports the wafer cassette 90 including the semiconductor wafer 40 to be accessed, from the wafer cassette stocker 5 to the host computer 2, and connects the wafer cassette 90 to be accessed, to the slot (free slot) of the host unit 230, from which the wafer cassette 90 to be swapped has been removed.

The host unit 230 may transport the wafer cassette 90 to be accessed, to a slot of the host unit 230 without requiring a place to temporarily evacuate the wafer cassette 90, by instructing the wafer cassette transport device 9 to execute, simultaneously, the operation of step S502 described above and the operation of step S503 described above (swap operation).

When the wafer cassette 90 to be accessed is not stored in the wafer cassette stocker 5 (No in step S501), the host unit 230 selects a wafer cassette 90 including a semiconductor wafer 40 having a priority which is lower than that of the semiconductor wafer 40 to be accessed and which is lowest among the wafer cassettes 90 present in either one of the host unit 230 and the wafer cassette stocker 5, as a wafer cassette 90 to be disassembled. When a wafer cassette 90 connected to one of the slots of the host unit 230 is selected as the wafer cassette 90 to be disassembled, this wafer cassette 90 to be disassembled becomes a wafer cassette 90 to be swapped with the wafer cassette 90 to be accessed.

Then, the host unit 230 instructs the wafer cassette transport device 9 to transport the wafer cassette 90 to be disassembled, from a slot of the host unit 230 or a storage location in the wafer cassette stocker 5, to the cassetter 4 (step S504). In step S504, the wafer cassette transport device 9 removes the wafer cassette 90 to be disassembled from the slot of the host unit 230 or the storage location in the wafer cassette stocker 5. The slot of the host unit 230 or the storage location in the wafer cassette stocker 5, from which the wafer cassette 90 to be disassembled has been removed, becomes a free slot or a free storage location. The wafer cassette transport device 9 transports the removed wafer cassette 90 to the cassetter 4.

The host unit 230 instructs the cassetter 4 to execute the assembly or disassembly process of the wafer cassette 90 (step S505). The assembly or disassembly process of the wafer cassette 90 to be executed at this time will be described in detail later with reference to FIG. 23.

The host unit 230 determines whether an original location where the disassembled wafer cassette 90 has been present is a slot of the host unit 230 or a storage location in the wafer cassette stocker 5 (step S506).

When the original location where the wafer cassette 90 to be disassembled has been present is a slot in the host unit 230, that is, when the wafer cassette 90 to be disassembled has been removed from a slot in the host unit 230 ("host unit" in step S506), the host unit 230 instructs the wafer cassette transport device 9 to transport the wafer cassette 90 to be accessed, from the cassetter 4 to the slot of the host unit 230 from which the wafer cassette 90 to be disassembled has been removed (step S507). In step S507, the wafer cassette transport device 9 transports the wafer cassette 90 to be accessed, from the cassetter 4 to the host computer 2, and connects the wafer cassette 90 to be accessed, to the slot (free slot) of the host unit 230 from which the wafer cassette 90 to be disassembled has been removed.

When the original location where the disassembled wafer cassette 90 has been present is a storage location in the wafer cassette stocker 5, that is, when the wafer cassette 90 to be disassembled has been removed from a storage location in the wafer cassette stocker 5 ("wafer cassette stocker" in step S506), the host unit 230 selects a wafer cassette 90 including a semiconductor wafer 40 having a priority which is lower than that of the semiconductor wafer 40 to be accessed and which is lowest among the wafer cassettes 90 connected to the slots of the host unit 230, as the wafer cassette 90 to be swapped.

Then, the host unit 230 instructs the wafer cassette transport device 9 to transport the wafer cassette 90 to be swapped, from the slot of the host unit 230 to the storage location (free storage location) in the wafer cassette stocker 5, from which the wafer cassette 90 to be disassembled has been removed (Step S508). The wafer cassette transport device 9 removes the wafer cassette 90 to be swapped, from the slot in the host unit 230. The slot of the host unit 230 from which the wafer cassette 90 to be swapped has been removed becomes a free slot. The wafer cassette transport device 9 transports the removed wafer cassette 90 to the free storage location in the wafer cassette stocker 5. As a result, the wafer cassette 90 to be swapped is stored at the free storage location in the wafer cassette stocker 5.

The host unit 230 instructs the wafer cassette transport device 9 to transport the wafer cassette 90 to be accessed, from the cassetter 4 to the slot in the host unit 230 from which the wafer cassette 90 to be swapped has been removed (step S509). In step S509, the wafer cassette transport device 9 transports the wafer cassette 90 to be accessed, from the cassetter 4 to the host computer 2, and connects the wafer cassette 90 to be accessed, to the slot (free slot) of the host unit 230 from which the wafer cassette 90 to be swapped has been removed.

Next, the assembly or disassembly process for the wafer cassette 90, executed in step S403 of FIG. 20 will be described in detail.

Figure 22:
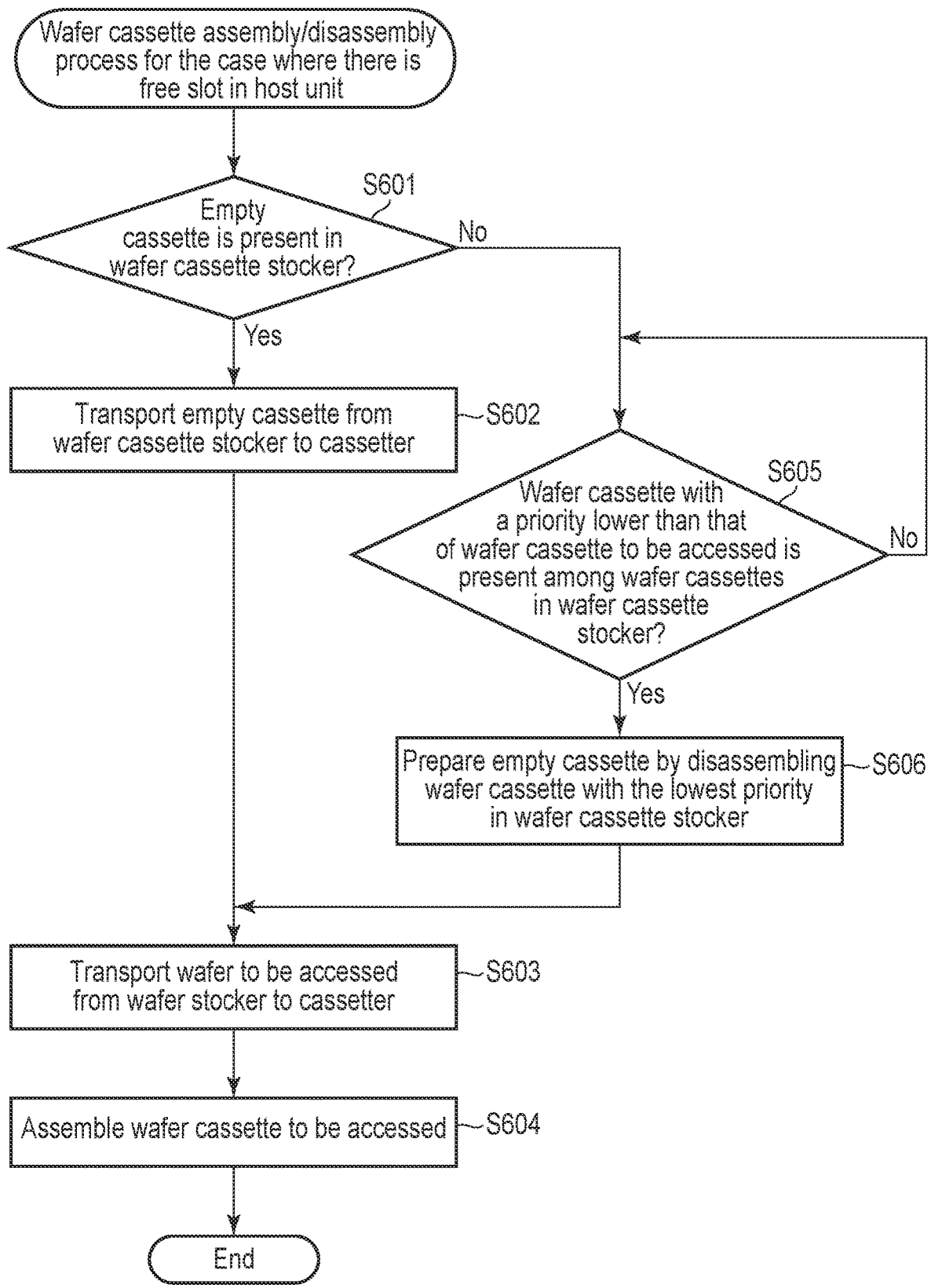
FIG. 22 is a flowchart illustrating a procedure of a wafer cassette assembling or disassembly process executed by the host apparatus when there is a free slot in the host apparatus, according to the embodiment.

FIG. 22 is a flowchart illustrating the procedure of the wafer cassette assembly or disassembly process for the case where there is a free slot in the host unit 230, executed by the host unit 230 in the storage system 1 in the embodiment.

First, the host unit 230 determines whether or not an empty cassette case 80 is stored in the wafer cassette stocker 5 (step S601). The host unit 230 can determine whether or not an empty cassette case 80 is stored in the wafer cassette stocker 5 by referring to the cassette management table 222.

When there is an empty cassette case 80 in the wafer cassette stocker 5 (Yes in step S601), the host unit 230 instructs the wafer cassette transport device 9 to transport the empty cassette case 80 from the wafer cassette stocker 5 to the cassetter 4 (step S602). In step S602, the wafer cassette transport device 9 transports the empty cassette case 80 from the wafer cassette stocker 5 to the cassetter 4.

The host unit 230 instructs the wafer transport device 8 to transport the semiconductor wafer 40 to be accessed, from the wafer stocker 3 to the cassetter 4 (step S603). In step S603, the wafer transport device 8 transports the semiconductor wafer 40 to be accessed, from the wafer stocker 3 to the cassetter 4.

The host unit 230 instructs the cassetter 4 to execute the assembly process of a wafer cassette 90 including the semiconductor wafer 40 to be accessed (step S604). In step S604, the cassetter 4 assembles the wafer cassette 90 including the semiconductor wafer 40 to be accessed, from the empty cassette case 80 transported in step S602 and the semiconductor wafer 40 to be accessed transported in step S603.

When there is no empty cassette case 80 in the wafer cassette stocker 5 (No in step S601), the host unit 230 determines whether or not a wafer cassette 90 including a semiconductor wafer 40 having a priority lower than that of the semiconductor wafer 40 to be accessed is present among the wafer cassettes 90 stored in the wafer cassette stocker 5 (step S605).

When the wafer cassette 90 including the semiconductor wafer 40 having a priority lower than that of the semiconductor wafers 40 to be accessed is not present among the wafer cassettes 90 stored in the wafer cassette stocker 5 (No in step S605), the host unit 230 waits until the priority of each of the semiconductor wafers 40 is changed and then a wafer cassette 90 including a semiconductor wafer 40 having a priority lower than that of the semiconductor wafer 40 to be accessed is present among the wafer cassettes 90 stored in the wafer cassette stocker 5 (step S605).

When a wafer cassette 90 including a semiconductor wafer 40 having a priority lower than that of the semiconductor wafer 40 to be accessed is present among the wafer cassettes 90 stored in the wafer cassette stocker 5 (Yes in step S605), the host unit 230 selects a wafer cassette 90 including a semiconductor wafer 40 having the lowest priority from among the wafer cassettes 90 stored in the wafer cassette stocker 5, as a wafer cassette 90 to be disassembled.

Then, the host unit 230 instructs the wafer cassette transport device 9 to transport the selected wafer cassette 90 to be disassembled, from the wafer cassette stocker 5 to the cassetter 4, and also instructs the cassetter 4 to disassemble the transported wafer cassette 90 (step S606). In step S606, the wafer cassette transport device 9 transports the wafer cassette 90 to be disassembled, from the wafer cassette stocker 5 to the cassetter 4. The cassetter 4 disassembles the wafer cassette 90 to be disassembled, which has been transported to the cassetter 4. In this manner, the host unit 230 can prepare an empty cassette case 80. Further, at this time, the host unit 230 may instruct the wafer transport device 8 to transport the semiconductor wafer 40 included in the disassembled wafer cassette 90 to a free storage location in the wafer stocker 3.

After that, the host unit 230 instructs the wafer transport device 8 to transport the semiconductor wafer 40 to be accessed, from the wafer stocker 3 to the cassetter 4 (step S603). In step S603, the wafer transport device 8 transports the semiconductor wafer 40 to be accessed, from the wafer stocker 3 to the cassetter 4.

The host unit 230 instructs the cassetter 4 to execute the assembly process of the wafer cassette 90 including the semiconductor wafer 40 to be accessed (step S604). Here, the cassetter 4 assembles the wafer cassette 90 including the semiconductor wafer 40 to be accessed, from the empty cassette case 80 prepared in step S606 and the semiconductor wafer 40 to be accessed transported in step S603.

Next, details of the assembly or disassembly process for assembling the wafer cassette 90 to be accessed, executed in step S505 of FIG. 21 will be described.

Figure 23:
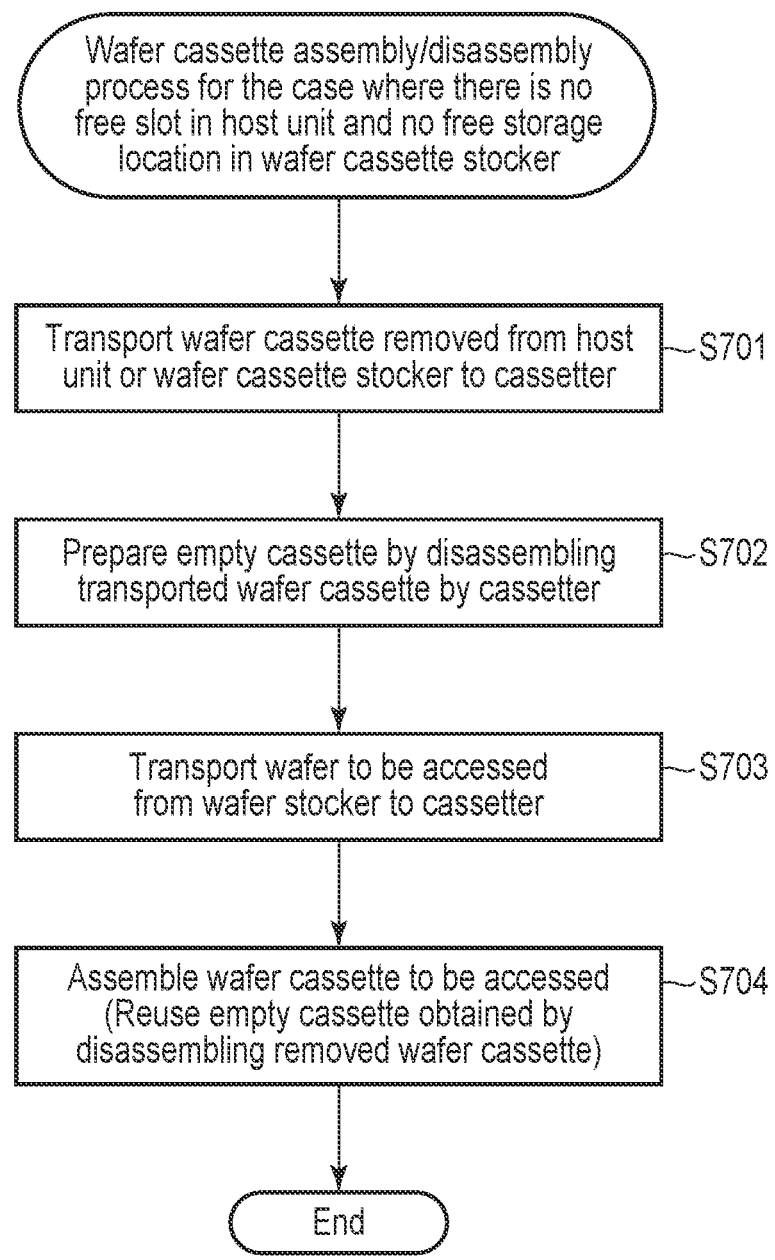
FIG. 23 is a flowchart illustrating a procedure of the wafer cassette assembling or disassembly process executed by the host apparatus when there is no free slot in the host apparatus, according to the embodiment.

FIG. 23 is a flowchart illustrating the procedure of the assembly or disassembly process of the wafer cassette 90 for the case where there is no free slot in the host unit 230 and no free storage location in the wafer cassette stocker 5, which is executed by the host unit 230 in the storage system 1 according to the embodiment.

First, the host unit 230 instructs the wafer cassette transport device 9 to transport a wafer cassette 90 removed from a slot in the host unit 230 or a storage location in the wafer cassette stocker 5, to the cassetter 4 (step S701).

The host unit 230 instructs the cassetter 4 to disassemble the wafer cassette 90 transported in step S701 and to prepare an empty cassette case 80 (step S702).

The host unit 230 instructs the wafer transport device 8 to transport the semiconductor wafer 40 to be accessed, from the wafer stocker 3 to the cassetter 4 (step S703). Thus, in the cassetter 4, an empty cassette case 80 included in the wafer cassette 90 which has been disassembled in step S702, and the semiconductor wafer 40 to be accessed are prepared.

The host unit 230 instructs the cassetter 4 to assemble the wafer cassette 90 including the semiconductor wafer 40 to be accessed, from the empty cassette case 80 prepared in step S702 and the semiconductor wafer 40 to be accessed transported in step S703 (step S704). In step S704, the cassetter 4 assembles the wafer cassette 90 including the semiconductor wafer 40 to be accessed, from the empty cassette case 80 and the semiconductor wafer 40 to be accessed. As a result, the cassette case 80 used for the wafer cassette 90 removed from a slot of the host unit 230 or from a storage location in the wafer cassette stocker 5 is reused for assembly of the wafer cassette 90 to be accessed.

At this time, the host unit 230 may instruct the wafer transport device 8 to transport the semiconductor wafer 40 included in the wafer cassette 90 which has been disassembled in step S702, from the cassetter 4 to the wafer stocker 3.

Next, the process for the case where an error occurs when a wafer cassette 90 is connected to a slot of the host unit 230 will be described.

Figure 24:
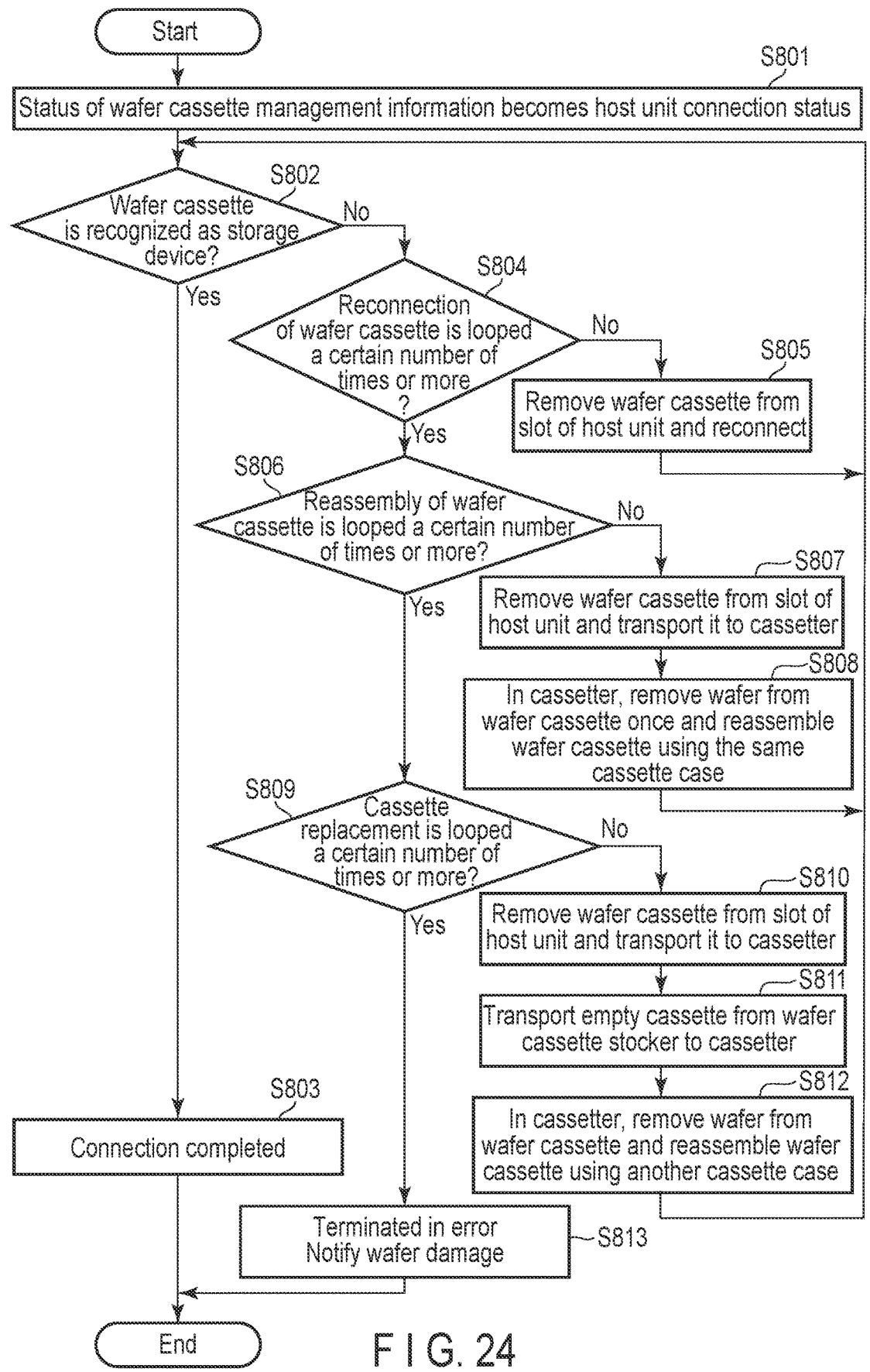
FIG. 24 is a flowchart illustrating a procedure of a wafer cassette connection error handling process executed by the host apparatus according to the embodiment.

FIG. 24 is a flowchart illustrating the procedure of the process of handling a connection error of the wafer cassette 90, executed by the host unit 230 in the storage system 1 of the embodiment.

When the status of a certain semiconductor wafer 40 managed in the wafer management table 221 is changed to a status indicating that this semiconductor wafer 40 is connected to a slot of the host unit 230 (step S801), the host unit 230 determines whether or not the wafer cassette 90 including this semiconductor wafer 40 is recognized as a storage device (step S802). The semiconductor wafer 40 whose status has been changed to indicate that it is connected to a slot of the host unit 230 may be a semiconductor wafer 40 determined to be accessed by the host unit 230 according to an access request from the application program 211. Further, such a semiconductor wafer 40 may be a semiconductor wafer 40 whose priority has been raised to the first level priority which is a priority to be connected to the host unit 230, regardless of the access request. The host unit 230 may change a priority of each of such semiconductor wafers 40 using, for example, a cache algorithm. Hereinafter, these semiconductor wafers 40 are collectively referred to as a semiconductor wafer 40 to be connected.

In step S802, it may be determined as to whether or not each of all controllers 61 included in a wafer cassette 90 including a semiconductor wafer 40 to be connected has been recognized as a storage device.

When a wafer cassette 90 to be connected, which includes the semiconductor wafer 40 to be connected, is recognized as a storage device (Yes in step S802), the host unit 230 completes the process of connecting the wafer cassette 90 to be connected to a slot of the host unit 230 (step S803).

When the wafer cassette 90 to be connected, which includes the semiconductor wafer 40 to be connected, is not recognized as a storage device (No in step S802), the host unit 230 determines whether or not a process of reconnecting the wafer cassette 90 to be connected, to the slot of the host unit 230, has been repeated a predetermined number of times or more (Step S804).

When the process of the reconnection has not been repeated the predetermined number of times or more (No in step S804), the host unit 230 instructs the wafer cassette transport device 9 to remove the wafer cassette 90 to be connected, from the slot of the host unit 230, and to reconnect it to the slot of the host unit 230 (step S805). In step S805, the wafer cassette transport device 9 executes an operation of removing the wafer cassette 90 to be connected, from the slot of the host unit 230, and an operation of reconnecting the removed wafer cassette 90 to be connected, to the slot of the host unit 230.

Then, the host unit 230 determines whether or not the wafer cassette 90 to be connected, which is reconnected to the slot of the host unit 230, is recognized as a storage device (step S802). In this manner, the host unit 230 can deal with a connection error caused by a poor connection between a slot of the host unit 230 and the wafer cassette 90 to be connected.

When the process of reconnecting the wafer cassette 90 to be connected, to the slot of the host unit 230, is repeated the predetermined number of times or more, without the wafer cassette 90 to be connected, which is reconnected to the slot of the host unit 230, being recognized as a storage device, (Yes in step S804), the host unit 230 determines whether or not a process of reassembling the wafer cassette 90 to be connected, using the same cassette case 80, has been repeated a predetermined number of times or more (Step S806).

When the process of reassembling the wafer cassette 90 to be connected, using the same cassette case 80, has not been repeated the predetermined number of times or more (No in step S806), the host unit 230 instructs the wafer cassette transport device 9 to transport the wafer cassette 90 to be connected, from the slot in the host unit 230 to the cassetter 4 (step S807). In step S807, the wafer cassette transport device 9 removes the wafer cassette 90 to be connected, from the slot of the host unit 230, and transports the removed wafer cassette 90 to the cassetter 4.

The host unit 230 instructs the cassetter 4 to execute both a process of disassembling the wafer cassette 90 to be connected that has been transported to the cassetter 4 and a process of reassembling the wafer cassette 90 to be connected, which includes the semiconductor wafer 40 to be connected, using the cassette case 80 of the disassembled wafer cassette 90 (step S808).

In step S808, the cassetter 4 disassembles the wafer cassette 90 to be connected that has been transported to the cassetter 4, and removes the semiconductor wafer 40 to be connected, from this wafer cassette 90. Then, the cassetter 4 accommodates once again the semiconductor wafer 40 to be connected, in the cassette case 80 obtained by disassembling the wafer cassette 90 to be connected. In this manner, the wafer cassette 90 to be connected, which includes the semiconductor wafer 40 to be connected, is reassembled from the cassette case 80 obtained by disassembling the wafer cassette 90 to be connected and the semiconductor wafer 40 to be connected. Further, in step S808, the host unit 230 instructs the wafer cassette transport device 9 to transport the wafer cassette 90 to be connected, which has been reassembled, from the cassetter 4 to a slot of the host unit 230 and to connect the wafer cassette 90 to be connected, to the slot of the host unit 230. As a result, the wafer cassette 90 to be connected, which has been reassembled, is again connected to the slot of the host unit 230.

Then, the host unit 230 determines whether or not the wafer cassette 90 to be connected, which is connected again to the slot of the host unit 230, has been recognized as a storage device (step S802). When the wafer cassette 90 to be connected is recognized as a storage device (Yes in step S802), the host unit 230 completes the process of connecting the wafer cassette 90 to be connected, to the slot of the host unit 230 (step S803).

In this manner, it is possible to deal with connection errors caused by misalignment between the probe pins 51 included in the wafer cassette 90 to be connected and the pads 41 of the semiconductor wafer 40 to be connected.

When the process of reassembling the wafer cassette 90 to be connected using the same cassette case 80 is repeated the predetermined number of times or more, without the wafer cassette 90 to be connected, which is reconnected to the slot of the host unit 230, being recognized as a storage device (Yes in step S806), the host unit 230 determines whether or not the replacement of the cassette case 80 included in the wafer cassette 90 to be connected has been repeated a predetermined number of times or more (Step S809).

When the replacement of the cassette case 80 included in the wafer cassette 90 to be connected has not been repeated more than the predetermined number of times (No in step S809), the host unit 230 instructs the wafer cassette transport device 9 to transport the wafer cassette 90 to be connected, from the slot of the host unit 230 to the cassetter 4 (step S810). In step S810, the wafer cassette transport device 9 removes the wafer cassette 90 to be connected, from the slot of the host unit 230, and transports the removed wafer cassette 90 to the cassetter 4.

The host unit 230 instructs the wafer cassette transport device 9 to transport an empty cassette case 80 from the wafer cassette stocker 5 to the cassetter 4 (step S811). In step S811, the wafer cassette transport device 9 transports an empty cassette case 80 from the wafer cassette stocker 5 to the cassetter 4.

The host unit 230 instructs the cassetter 4 to execute both of the process of disassembling the wafer cassette 90 to be connected, which has been transported in step S810, and the process of assembling a new wafer cassette 90 to be connected, from the empty cassette case 80 transported in step S811 and the semiconductor wafer 40 to be connected, which was included in the disassembled wafer cassette 90 (step S812). In step S812, the cassetter 4 disassembles the wafer cassette 90 to be connected, which has been transported to the cassetter 4, and removes the semiconductor wafer 40 to be connected, from the wafer cassette 90 to be connected. Then, the cassetter 4 accommodates the semiconductor wafer 40 to be connected, in a cassette case 80 different from the original cassette case 80 obtained by disassembling the wafer cassette 90 to be connected, that is, in a different empty cassette case 80 transported in step S811. Thus, a new wafer cassette 90 to be connected is assembled. Further, in step S812, the host unit 230 instructs the wafer cassette transport device 9 to transport the assembled new wafer cassette 90 from the cassetter 4 to the slot of the host unit 230 and to connect the assembled new wafer cassette 90 to the slot. As a result, the new wafer cassette 90 to be connected, which has been assembled using a cassette case 80 different from the original cassette case 80, is connected again to the slot of the host unit 230.

Then, the host unit 230 determines whether or not the new wafer cassette 90 to be connected, which is reconnected to the slot of the host unit 230, has been recognized as a storage device (step S802). Thus, it is possible to deal with connection errors caused by damage to the original cassette case 80, from which the semiconductor wafer 40 to be connected was removed.

The process for the original cassette case 80 will be described later with reference to FIG. 25.

When the replacement of the cassette case 80 is repeated the predetermined number of times or more, without the new wafer cassette 90 to be connected, which is reconnected to the slot of the host unit 230, being recognized as a storage device (Yes in step S809), the host unit 230 determines that the semiconductor wafer 40 to be connected may be damaged, and terminates the process (step S813). The host unit 230 may notify, for example, an administrator of the data center that the semiconductor wafer 40 may be damaged.

FIG. 25 is a flowchart illustrating the procedure of the process for the cassette case 80 prohibited for use, which is executed by the host unit 230 in the storage system 1 of the embodiment.

Here, the processing of the original cassette case 80 from which the semiconductor wafer 40 to be connected was removed as illustrated in step S812 of FIG. 24, will be described. Note that the original cassette case 80 may as well be referred to as the original cassette.

In step S812 of FIG. 24, when the wafer cassette 90 to be connected is disassembled, the host unit 230 instructs the wafer cassette transport device 9 to transport the original cassette case 80 from the cassetter 4 to the wafer cassette stocker 5, and the host unit 230 updates the cassette management table 222 such that the original cassette case 80 is temporarily set to be prohibited for use (step S901).

The host unit 230 determines whether or not the new wafer cassette 90 to be connected, which includes the semiconductor wafer 40 to be connected, has been recognized as a storage device in step S802 of FIG. 24 (step S902).

When the new wafer cassette 90 to be connected, which includes the semiconductor wafer 40 to be connected, is recognized as a storage device (Yes in step S902), the host unit 230 maintains the setting of prohibition for use of the original cassette case 80 and determines that the original cassette case 80 may have been damaged (Step S903). In other words, the host unit 230 determines that cause of the connection error which has occurred in the wafer cassette 90 assembled from the semiconductor wafer 40 to be connected and the original cassette case 80 is damage of the original cassette case 80. Here, the host unit 230 may notify, for example, the administrator of the data center that the original cassette case 80 may have been damaged.

When the new wafer cassette 90 to be connected, which includes the semiconductor wafer 40 to be connected, is not recognized as a storage device (No in step S902), the host unit 230 withdraws the setting of the prohibition for use of the original cassette case 80 because the semiconductor wafer 40 to be connected may have been damaged (Step S905).

Next, the configuration for enabling the host unit 230 to efficiently access the wafer cassette 90 will be described.

First, a configuration for adjusting temperature of the semiconductor wafer 40 included in the wafer cassette 90 will be described. Note that it is desirable that the reading and writing of data from and to the nonvolatile memory device 70 in the semiconductor wafer 40 be performed while the temperature of the semiconductor wafer 40 is within a predetermined temperature range of room temperature or higher.

More particularly, when the temperature of the nonvolatile memory device 70, such as a NAND flash memory, is within the predetermined temperature range of room temperature or higher, for example, the levels in which electrons are trapped in the charge storage layer of a memory cell in the nonvolatile memory device 70 become deeper. As a result, the data write and data read operations can be stably executed.

On the other hand, as described with reference to FIG. 1, it is preferable to store each of the semiconductor wafers 40 in a relatively low temperature environment in the wafer stocker 3. Therefore, the temperature of the semiconductor wafer 40 included in the wafer cassette 90 immediately after assembly may be relatively low.

FIG. 26 is a diagram illustrating a configuration for raising the temperature of a semiconductor wafer 40 included in a wafer cassette 90 used in the storage system 1.

The upper part of FIG. 26 shows an example of the configuration in which the temperature of the semiconductor wafer 40 placed on the lower case 21 of the wafer cassette 90 (that is, the cassette case 80) is raised by a heater 32 provided in the lower case 21.

The heater 32 provided in the lower case 21 raises the temperature of the semiconductor wafer 40 by heating the semiconductor wafer 40 placed on the lower case 21. The heater 32 may be, for example, a heating wire. The heater 32 is driven by electric power supplied from the host unit 230 via the plug terminal 22 when the wafer cassette 90 is connected to a slot of the host unit 230.

According to this configuration, the temperature of the semiconductor wafer 40 in the wafer cassette 90 connected to the slot of the host unit 230 can be raised, thereby making it possible to realize stable data write and data read operations on this semiconductor wafer 40.

The lower part of FIG. 26 shows an example of a configuration in which the temperature of the semiconductor wafer 40 placed on the lower case 21 of the wafer cassette 90 (that is, the cassette case 80) is raised by a heater 234 provided in the host unit 230 (more specifically, the host case of the host unit 230).

The heater 234 provided in the host unit 230 raises the temperature of the semiconductor wafer 40 by heating the semiconductor wafer 40 placed on the lower case 21. The heater 234 may be, for example, a heating wire. The heat generated by the heater 234 is transferred to the semiconductor wafer 40 through the lower case 21, thereby raising the temperature of the semiconductor wafer 40.

Next, a configuration for shortening the latency required until data can actually be read from and written to a semiconductor wafer 40 to be accessed, will be described.

When a wafer cassette 90 to be accessed, which includes a semiconductor wafer 40 to be accessed, is not connected to a slot of the host unit 230 and the wafer cassette 90 to be accessed is not stored in the wafer cassette stocker 5, it is necessary to assemble a wafer cassette 90 to be accessed, which includes the semiconductor wafer 40 to be accessed, in the cassetter 4. Here, in order to shorten the latency, it is required to quickly assemble the wafer cassette 90.

Figure 27:
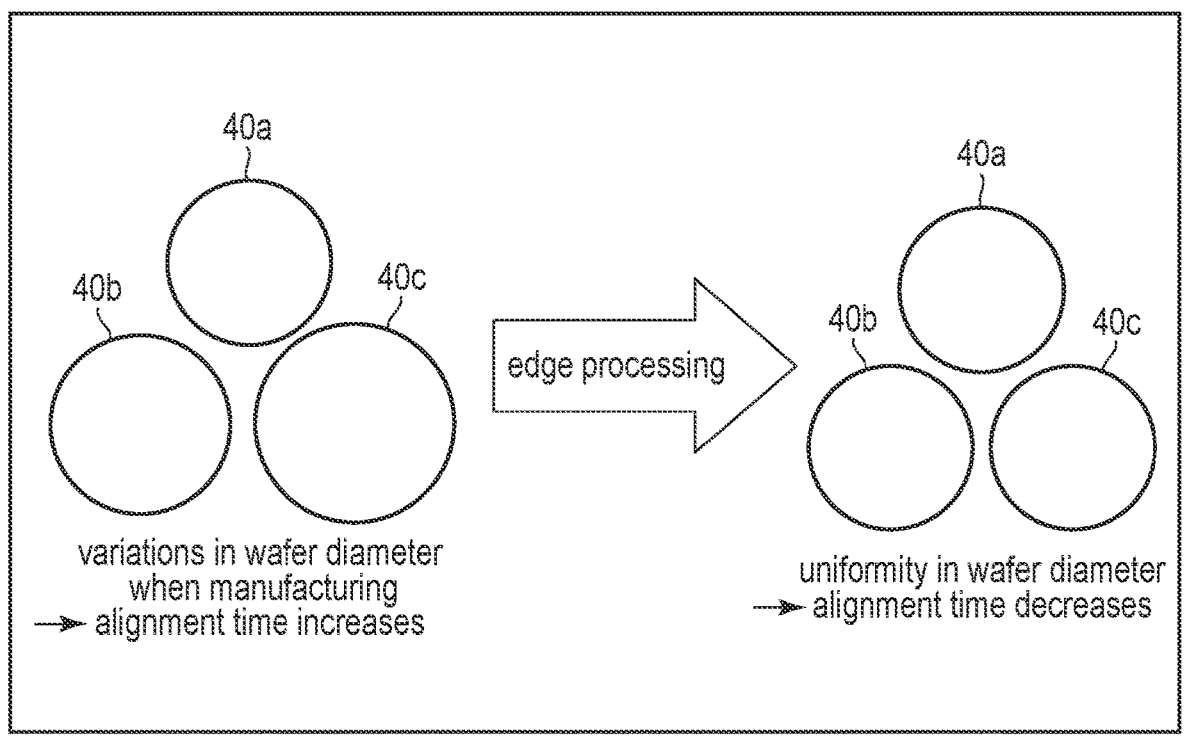
FIG. 27 is a diagram illustrating edge processing for semiconductor wafers according to the embodiment.

FIG. 27 is a diagram illustrating edge processing for semiconductor wafers 40.

As shown in the left part of FIG. 27, when the semiconductor wafers 40*a* to 40*c* stored in the wafer stocker 3 vary in diameter from one another due to variations in manufacturing, the operation of alignment between the plurality of probe pins 51 and the plurality of pads 41 of the semiconductor wafer 40 may require a lot of time in some cases.

In this embodiment, edge processing is performed to uniformize the diameters of the semiconductor wafers 40*a* to 40*c* to a specific length. In the edge processing, a process of shaving the outer circumference of the semiconductor wafer 40 is performed. In the wafer stocker 3, the semiconductor wafers 40*a* to 40*c* that have been subjected to the edge processing are stored. In this manner, it becomes possible to easily place the semiconductor wafers 40 in the center of the wafer mounting region of the lower case 21, which enables the cassetter 4 to execute the alignment operation quickly. As a result, the time required to assemble the wafer cassette 90 to be accessed can be reduced and the latency can be shortened.

Figure 28:
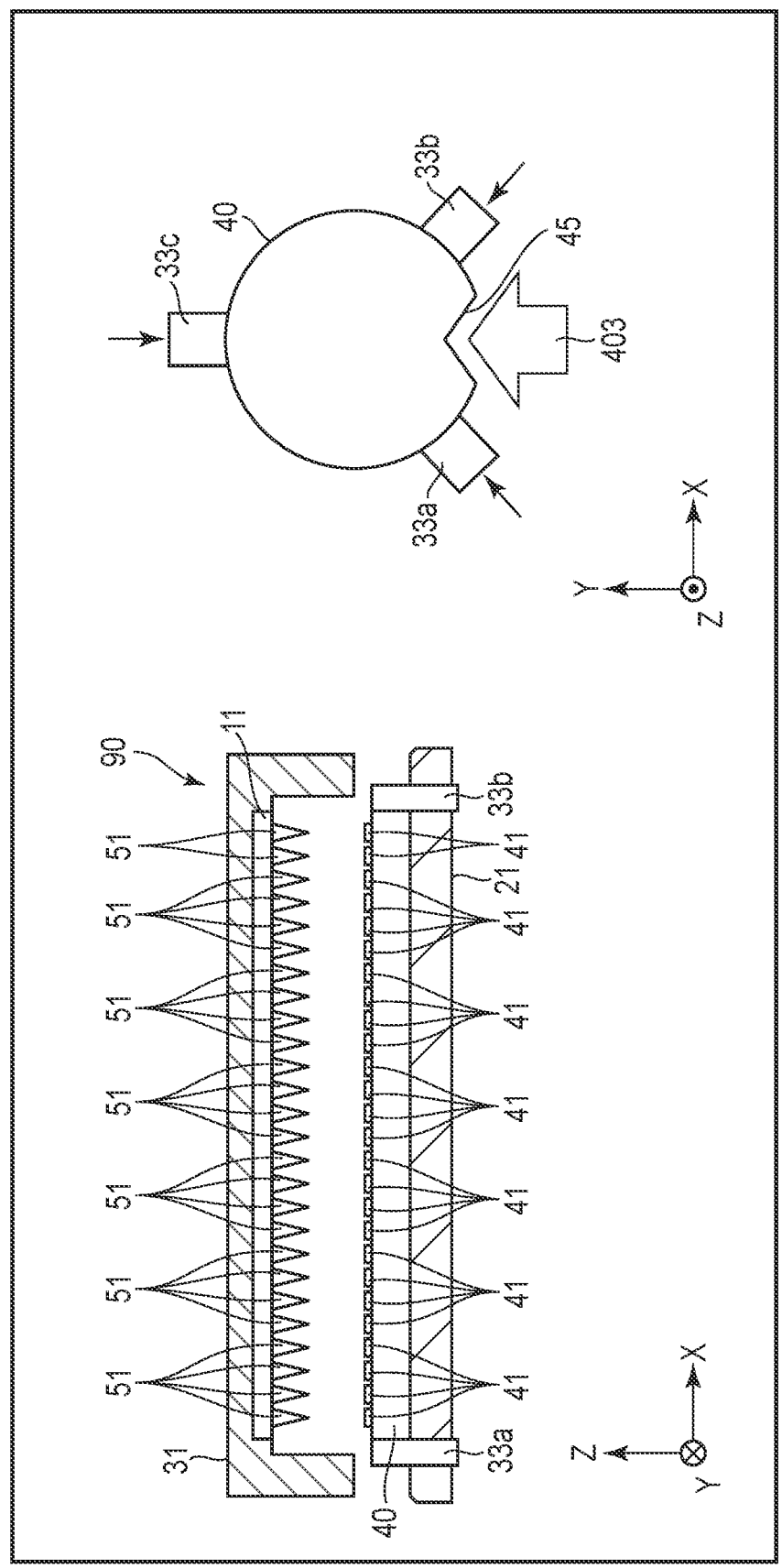
FIG. 28 is a diagram for explaining a centering arm installed in the cassette case according to the embodiment.

Next, another configuration for enabling quick execution of the alignment operation will be described. FIG. 28 is a diagram illustrating three centering arms provided in the lower case 21 of the wafer cassette 90 (that is, cassette case 80) used in the storage system 1.

The left part of FIG. 28 is a side view of the wafer cassette 90. The right part of FIG. 28 is a plan view illustrating the relationship between the semiconductor wafer 40 placed on the lower case 21 and three centering arms 33*a*, 33*b*, and 33*c*. In the assembly operation of the wafer cassette 90, the cassetter 4 places the semiconductor wafer 40 at the center of the wafer mounting region of the lower case 21. In this case, for example, the cassetter 4 first roughly align the semiconductor wafer 40 by mechanically pressing an arm member 403 into a notch 45 formed on the outer circumference of the semiconductor wafer 40. The arm member 403 is a member for an aligning operation of placing the semiconductor wafer 40 at the center of the wafer mounting region. The arm member 403 is provided in the cassetter 4. Then, the cassetter 4 uses the three centering arms 33*a*, 33*b*, and 33*c* provided in the lower case 21 to bring the semiconductor wafer 40 towards the center of the wafer mounting region.

In the lower case 21, the centering arms 33*a* to 33*c* are arranged at equal intervals to each other along a circumference having a predetermined radius from the center of the wafer mounting region and are movable toward the center of the wafer mounting region. The diameter of this circumference is greater than the diameter of the semiconductor wafer 40.

The cassetter 4 moves each of the centering arms 33*a* to 33*c* toward the center of the wafer mounting region. Each of the centering arms 33*a* to 33*c* abuts the outer circumference of the semiconductor wafer 40. Then, the semiconductor wafer 40 is aligned at the center of the wafer mounting region as the centering arms 33*a* to 33*c* is moved, and is fixed at the center of the wafer mounting region by the centering arms 33*a* to 33*c*.

In a case where the probe card 11 is integrated as one body with the upper case 31, an alignment between the plurality of probe pins 51 and the plurality of pads 41 can be performed such that the probe pins 51 are in contact with the pads 41, respectively, by joining the lower case 21 in which the semiconductor wafer 40 is placed at the center of the wafer mounting region and the upper case 31 including the probe card 11 together.

Therefore, by using such a mechanical mechanism to place the semiconductor wafer 40 at the center of the wafer mounting region of the lower case 21, it is possible to perform the alignment operation quickly with a simple configuration as compared to the case of using a configuration in which the alignment operation is executed while finely adjusting the position of the semiconductor wafer 40 using an optical sensor or the like.

Note that the number of centering arms may be four or more.

Figure 29:
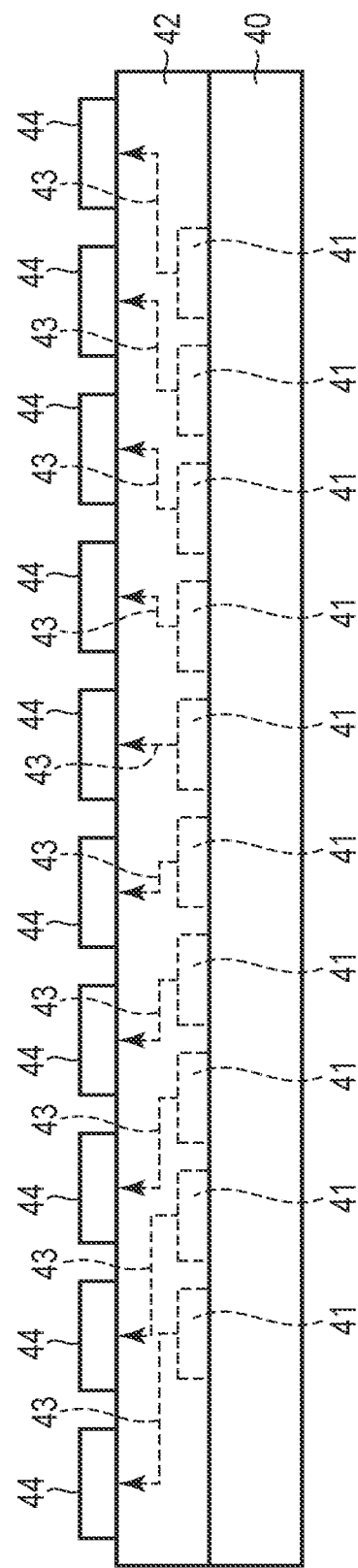
FIG. 29 is a diagram illustrating a redistribution layer formed on a semiconductor wafer according to the embodiment.

Next, still yet another configuration for easier alignment between the plurality of probe pins 51 and the plurality of pads 41 will be described. FIG. 29 is diagram illustrating a redistribution layer formed on a semiconductor wafer 40 used in the storage system 1.

In general, the number of pads provided on a non-volatile memory device such as a NAND-type flash memory is less than the number of pads provided on a dynamic RAM (DRAM) die (or CMOS-LSI die). Therefore, the interval (pitch) between each other of the pads 41 included in the semiconductor wafer 40 can be set wider than the interval (pitch) between each other of the pads included in a semiconductor wafer on which a plurality of DRAM dies or a plurality of CMOS-LSI dies are formed.

By utilizing of the characteristics of the semiconductor wafer 40 that the pitch of the pads can be set relatively wide, it is possible to make the alignment between the plurality of probe pins 51 and the plurality of pads 41 easier.

The semiconductor wafer 40 shown in FIG. 29 includes a redistribution layer (RDL) 42 formed on the semiconductor wafer 40. A plurality of electrodes (pads) 44 included in the redistribution layer 42 are electrically connected to the plurality of pads 41 of the semiconductor wafer 40, respectively, by internal wiring 43 in the redistribution layer 42.

The size of each of the plurality of pads 44 included in the redistribution layer 42 is set greater than the size of each of the plurality of pads 41 of the semiconductor wafer 40. Further, the interval between each other of the plurality of pads 44 included in the redistribution layer 42 is set wider than the interval between each other of the plurality of pads 41 of the semiconductor wafer 40.

This configuration enables easy alignment between the plurality of probe pins 51 and the plurality of pads 44. As a result, the plurality of probe pins 51 and the plurality of pads 41 can be more easily electrically connected respectively to each other. Here, it is preferable to use the semiconductor wafer 40 including the redistribution layer 42 in combination with the centering arms described with reference to FIG. 28.

Next, a configuration of the cassetter 4 to reduce the time required to assemble a wafer cassette 90 to be accessed will be described. FIG. 30 is a diagram illustrating a configuration of the cassetter 4, which has the function of a wafer stocker as well, used in the storage system 1.

When a wafer cassette 90 to be accessed, which includes a semiconductor wafer 40 to be accessed, is not connected to a slot of the host unit 230 and the wafer cassette 90 to be accessed is not stored in the wafer cassette stocker 5, it is necessary to assemble the wafer cassette 90 to be accessed, which includes the semiconductor wafer 40 to be accessed, in the cassetter 4.

As shown in FIG. 30, when the cassetter 4 has the function of the wafer stocker as well, the cassetter 4 can store a plurality of semiconductor wafers 40. Therefore, when a semiconductor wafer 40 to be accessed is stored in the cassetter 4, the cassetter 4 can quickly assemble a wafer cassette 90 including the semiconductor wafer 40 to be accessed, without having to transport the semiconductor wafer 40 to be accessed, from the wafer stocker 3 to the cassetter 4. As a result, the time required until the wafer cassette 90 to be accessed, which includes the semiconductor wafer 40 to be accessed, is connected to a slot of the host unit 230 can be reduced.

Note that the cassetter 4 may have not only the function of a wafer stocker but also the function of a wafer cassette stocker. In this case, several empty cassette cases 80 and several wafer cassettes 90 can be stored in the cassetter 4.

Figure 31:
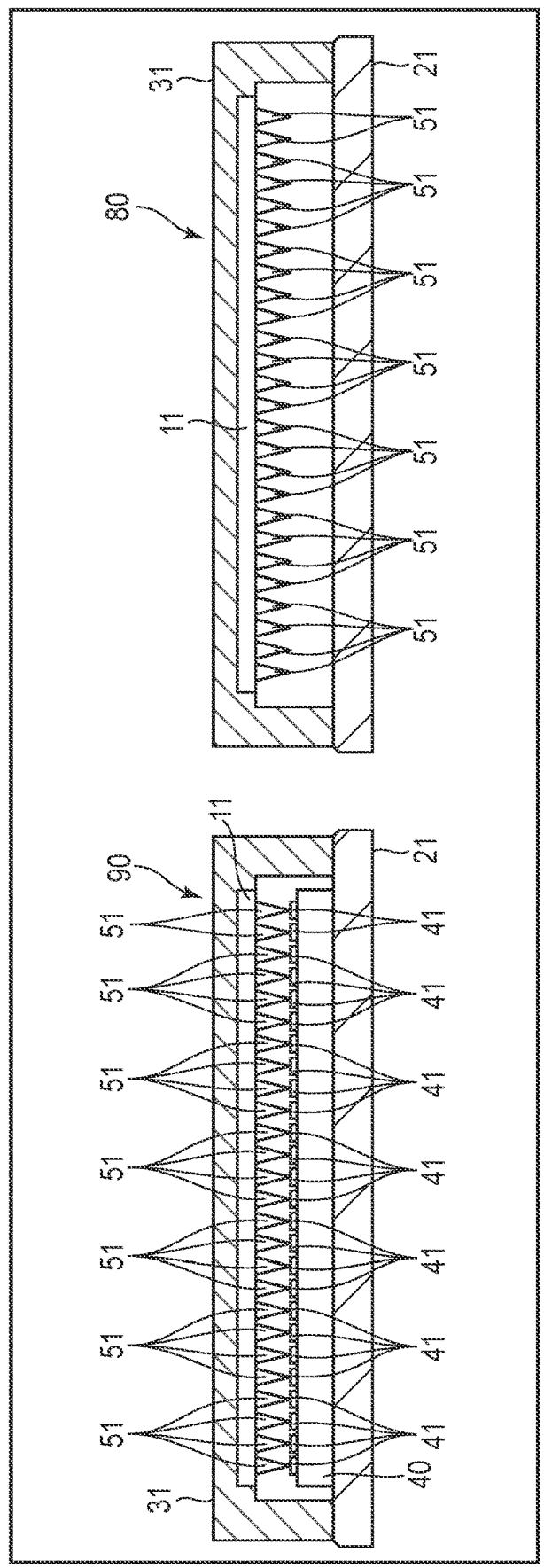
FIG. 31 is a diagram illustrating an example of a configuration of the cassette case according to the embodiment.

Next, other configuration examples of the cassette case 80 will be described. FIG. 31 is a diagram illustrating a configuration of the cassette case 80 used in the storage system 1, which includes the upper case 31 in which the probe card 11 is embedded.

The left part of FIG. 31 shows a configuration of a wafer cassette 90 assembled from a semiconductor wafer 40 and a cassette case 80. The right part of FIG. 31 shows a configuration of the cassette case 80. As shown in FIG. 31, since the probe card 11 is embedded in the upper case 31 of the cassette case 80, the probe card 11 can be disposed at substantially the same location as that of the lower surface of the upper case 31.

As a result, the distance between the lower surface of the upper case 31 and the upper surface of the lower case 21 can be reduced to the total sum of the length of the probe pins 51 and the thickness of the semiconductor wafer 40. As a result, a thin wafer cassette 90 suitable for connection to a slot of the host unit 230 can be realized.

Figure 32:
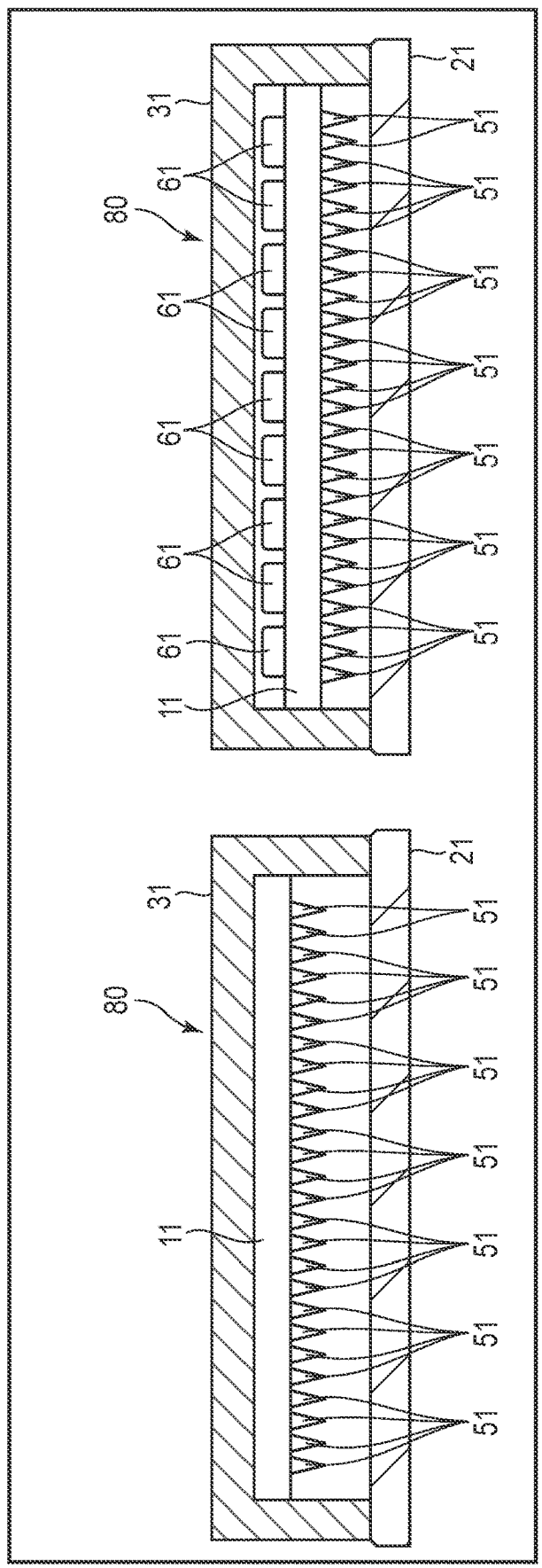
FIG. 32 is a diagram illustrating another example of the configuration of the cassette case according to the embodiment.

FIG. 32 is a diagram illustrating the cassette case 80 used in the storage system 1, in which the probe card 11 is provided inside the upper case 31.

The left part of FIG. 32 shows a configuration of the cassette case 80 in which the probe card 11 provided underneath the upper case 31. The right part of FIG. 32 shows the configuration of the cassette case 80 in which the probe card 11 is provided underneath the upper case 31 and a plurality of controllers 61 are disposed on the upper surface of the probe card 11.

FIG. 33 is a diagram illustrating a configuration of the cassette case 80 in which the probe card 11 is provided on the upper surface of the upper case 31, the cassette case 80 being used in the storage system 1.

Various electronic components may be mounted on the upper surface of the probe card 11. As shown in the left part of FIG. 33, when the probe card 11 is provided on the upper surface of the upper case 31, it is possible to improve the heat dissipation efficiency of the upper surface of the probe card 11 and the heat dissipation efficiency of the electronic components on the upper surface of the probe card 11. As a result, the upper surface of the probe card 11 and the electronic components can be cooled. Note that, as long as at least the upper surface of the probe card 11 is exposed to the external environment, a part of the probe card 11 may be located inside the upper case 31.

Further, as shown in the right part of FIG. 33, the plurality of controllers 61 may be further provided on the upper surface of the probe card 11 that is exposed to the external environment. With this structure, it becomes possible to cool the controllers 61.

The configuration of the cassette case 80 shown in FIG. 33 may be used in combination with the configuration for raising the temperature of the semiconductor wafer 40 using the heater described with reference to FIG. 26. In this case, while raising the temperature of the semiconductor wafer 40, the excessive temperature rises in the electronic components and the controller 61, which are provided on the upper surface of the probe card 11, can be suppressed.

Figure 34:
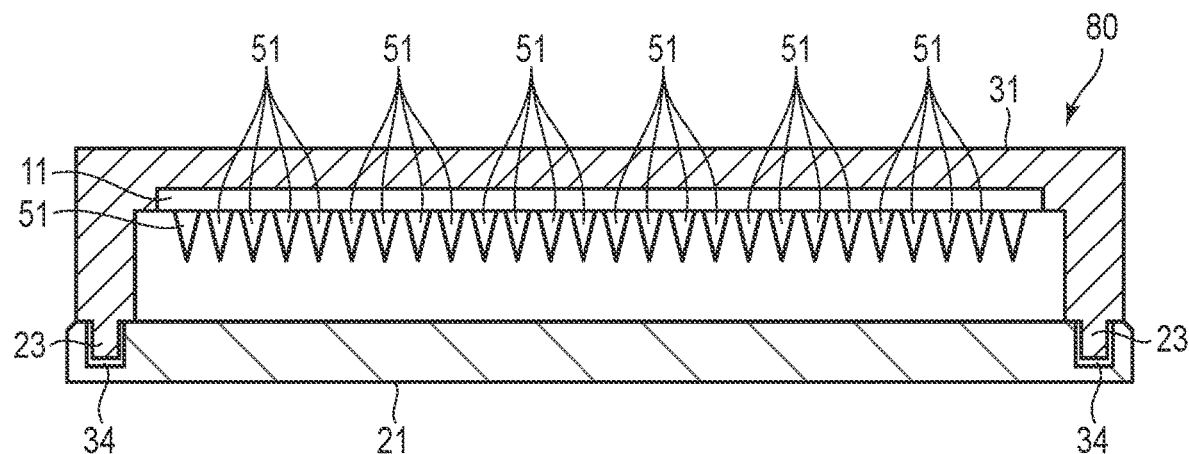
FIG. 34 is a diagram illustrating still another example of the configuration of the cassette case according to the embodiment.

FIG. 34 is a diagram illustrating a configuration of the cassette case 80 used in the storage system 1, which includes a lower case 21 formed with grooves 34, and an upper case 31 formed with protruding portions 23 that can be fitted into the grooves 34 of the lower case 21.

The grooves 34 in the lower case 21 and the protruding portions 23 in the upper case 31 function as a mechanism for mechanically joining the lower case 21 and the upper case 31 together. Further, they can function as a mechanism for alignment between the plurality of pads 41 of a semiconductor wafer 40 placed on the lower case 21 and the plurality of probe pins 51, as well. In other words, by fitting the protruding portions 23 of the upper case 31 into the grooves 34 of the lower case 21, it is possible to perform the alignment between the plurality of pads 41 and the plurality of probe pins 51 such that the probe pins 51 are in contact with the plurality of pads 41, respectively.

The configuration of the cassette case 80 shown in FIG. 34 can be used in combination with the centering arms described with reference to FIG. 28 and/or the redistribution layer 42 described with reference to FIG. 29. With the redistribution layer 42, it is possible to electrically connect the plurality of probe pins 51 to the plurality of pads 41, respectively, merely with rough alignment of the plurality of probe pins 51 and the plurality of pads 44, respectively, with each other. Thus, for example, by using the redistribution layer 42 in combination with the configuration of the cassette case 80 shown in FIG. 34, the time required to assemble the wafer cassette 90 can be further reduced.

Note that grooves 34 may be provided in the upper case 31 and protruding portions 23 that can be fitted into the grooves 34 may be provided in the lower case 21.

Figure 35:
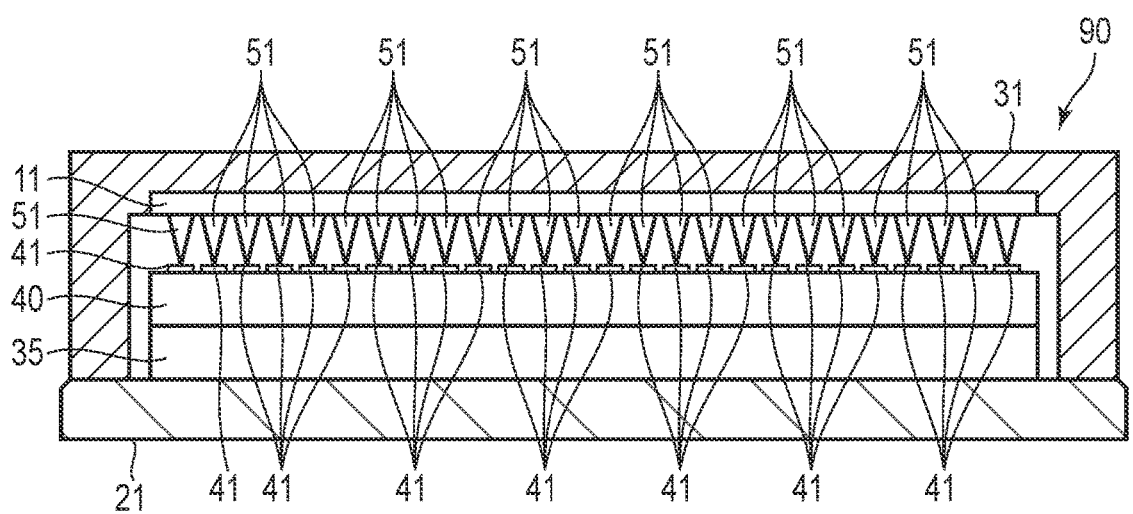
FIG. 35 is a diagram illustrating still another example of the configuration of the cassette case according to the embodiment.

Next, a configuration of the cassette case 80 for supporting the semiconductor wafer 40 placed on the lower case 21 will be described. FIG. 35 is a diagram illustrating a configuration of the wafer cassette 90 used in the storage system 1, which holds the semiconductor wafer 40 to the lower case 21 using a vacuum chuck 35.

The vacuum chuck 35 is a member that holds a semiconductor wafer 40 to the wafer mounting region of the lower case 21 by vacuum absorption. The vacuum chuck 35 is provided in the lower case 21. The semiconductor wafer 40 is placed on the vacuum chuck 35. With the vacuum chuck 35, it is possible to prevent misalignment between the plurality of pads 41 and the plurality of probe pins 51 from occurring during transportation of the wafer cassette 90.

Next, another example of a configuration of the cassette case 80 for holding the semiconductor wafer 40 placed on the lower case 21 will be described.

FIG. 36 is a diagram illustrating an example of a configuration of the wafer cassette 90 including the upper case 31 including a plurality of protruding portions 24 that abut the semiconductor wafer 40 placed on the lower case 21. In the example of the configuration shown in FIG. 36, the probe card 11 may be embedded in the upper case 31. In the upper case 31, the plurality of protruding portions 24 are provided to extend from the lower surface of the upper case 31 toward the lower case 21. When the lower case 21 and the upper case 31 are joined together, each of the plurality of protruding portions 24 abuts a region on the surface of the semiconductor wafer 40 placed on the lower case 21, the region being a region other than the pads 41 on the surface of the semiconductor wafer 40. Therefore, the semiconductor wafer 40 is supported.

Accordingly, the semiconductor wafer 40 is supported by contact between the plurality of pads 41 and the plurality of probe pins 51, and between the plurality of protruding portions 24 and the surface of the semiconductor wafer 40, and thereby the semiconductor wafer 40 is hold to the lower case 21.

With the plurality of protruding portions 24 thus provided, it is possible to hold the semiconductor wafer 40 to the lower case 21 without strongly pressing the pads 41 by the probe pins 51, respectively. With this configuration, the wafer cassette 90 can be quickly assembled by a simple process of mechanically joining the lower case 21 and the upper case 31 to each other.

Figure 37:
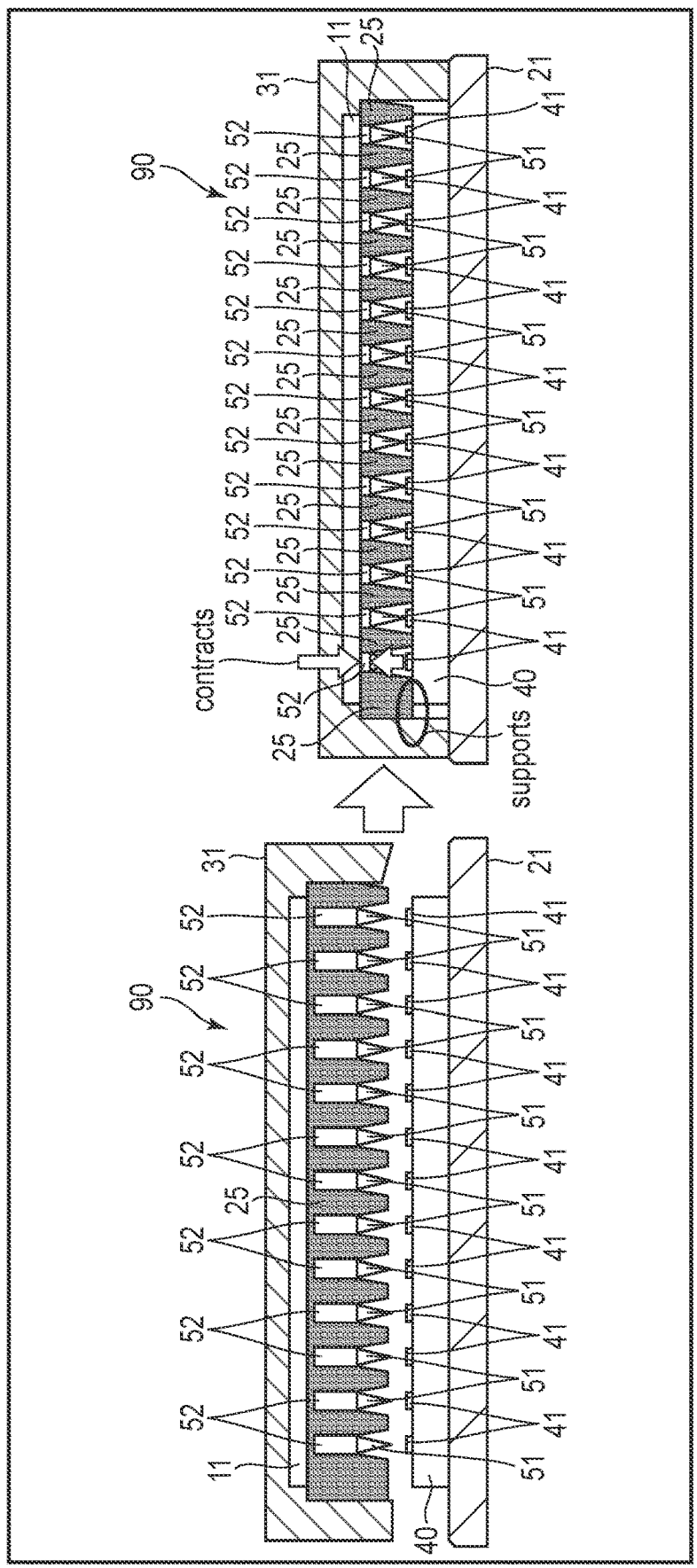
FIG. 37 is a diagram illustrating still another example of the configuration of the cassette case according to the embodiment.

Next, still another example of a configuration of the cassette case 80 for holding the semiconductor wafer 40 placed on the lower case 21 will be described. FIG. 37 is a diagram illustrating an example of a configuration of the wafer cassette 90 used in the storage system 1, which includes an upper case 31 provided with a cushion material 25 that abuts the semiconductor wafer 40 placed on the lower case 21 and expands and contracts.

The left part of FIG. 37 shows a state in which the lower case 21 and the upper case 31 are separated from each other. The right part of FIG. 37 shows a state in which the lower case 21 and the upper case 31 are mechanically joined to each other.

The probe card 11 may be embedded in the upper case 31. The cushion material 25 is provided in the upper case 31. Each of the plurality of probe pins 51 is connected to the lower surface of the probe card 11 through a conductive elastic member 52 so as to penetrate the cushion material 25. The elastic member 52 is, for example, conductive rubber.

When the lower case 21 and the upper case 31 are joined to each other, the cushion material 25 abuts a region on the surface of the semiconductor wafer 40 placed on the lower case 21 and contracts, the region being a region other than the pad 41 on the surface of the semiconductor wafer 40. Thereby, the cushion material 25 supports the semiconductor wafer 40.

When the lower case 21 and the upper case 31 are joined together, each of the plurality of probe pins 51 is in contact with the corresponding pad 41 and thus the elastic member 52 contracts.

Accordingly, the semiconductor wafer 40 is supported by contact between the plurality of pads 41 and the plurality of probe pins 51 and between the cushion material 25 and the surface of the semiconductor wafer 40, and thereby the semiconductor wafer 40 is hold to the lower case 21. Further, since each of the plurality of probe pins 51 is connected to the lower surface of the probe card 11 via the conductive elastic member 52, the pressure of all probe pins 51 can be equalized.

In this manner, with the cushion material 25 thus provided, it is possible to hold the semiconductor wafer 40 to the lower case 21 without strongly pressing the pads 41 by the probe pins 51. With this configuration, the wafer cassette 90 can be quickly assembled by a simple process of mechanically joining the lower case 21 and the upper case 31 to each other.

Next, an example of the arrangement of the host interface in the wafer cassette 90 used in the storage system 1 will be described.

Figure 38:
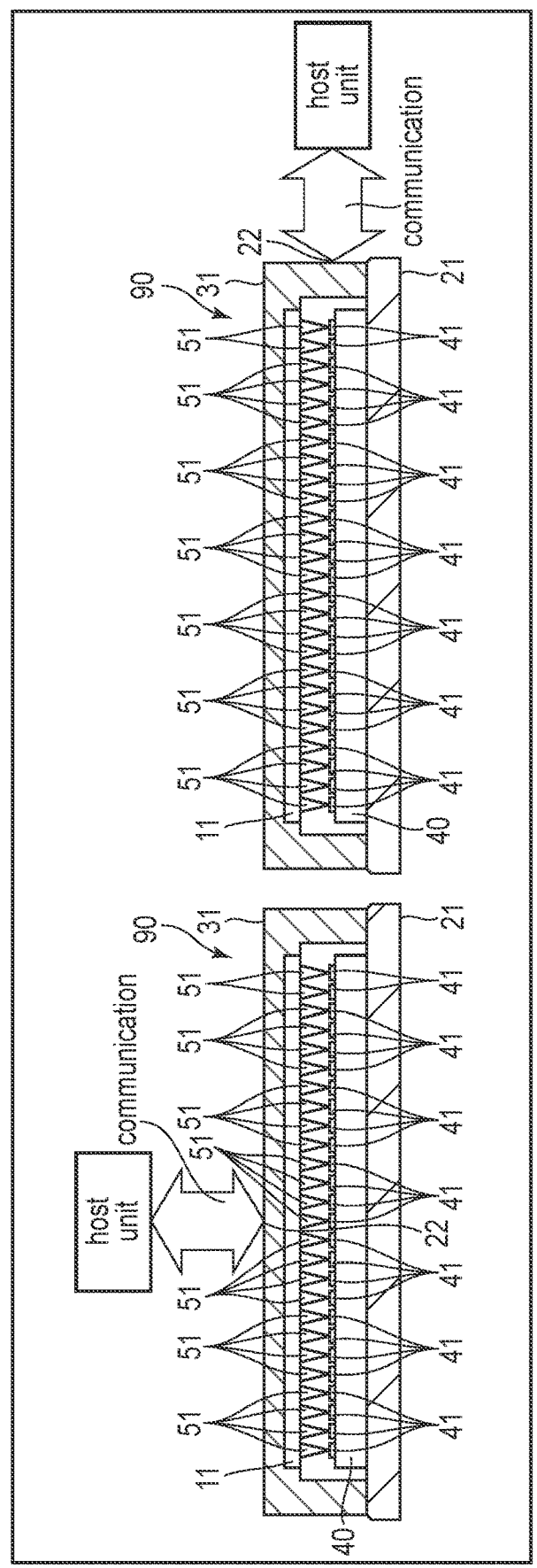
FIG. 38 is a diagram illustrating an example of arrangement of a host interface in a cassette case according to the embodiment.

The left part of FIG. 38 shows an example of a configuration of a wafer cassette 90 in which the host interface is disposed on the upper surface of the upper case 31. As the host interface, for example, the plug terminal 22 described with reference to FIG. 12 may be used.

The right part of FIG. 38 shows an example of a configuration of a wafer cassette 90 in which the host interface is located on a side surface of the upper case 31. As the host interface, for example, the plug terminal 22 described with reference to FIG. 12 may be used.

As described above, according to this embodiment, the host unit 230 includes a slot to which a wafer cassette 90 is connectable. The host unit 230 may read and write data from and to the semiconductor wafer 40 included in the wafer cassette 90 connected to this slot. The host unit 230 determines a semiconductor wafer 40 to be accessed among the plurality of semiconductor wafers 40 managed in the storage system 1.

When a wafer cassette 90 to be accessed, which includes the semiconductor wafer 40 to be accessed, is connected to a slot of the host unit 230, the host unit 230 executes reading or writing data from or to the semiconductor wafer 40 to be accessed.

When the wafer cassette 90 to be accessed is not connected to a slot of the host unit 230 and is stored in the wafer cassette stocker 5, the host unit 230 causes the wafer cassette transport device 9 to transport the wafer cassette 90 to be accessed, to a slot of the host unit 230, and to connect it to the slot.

When the wafer cassette 90 to be accessed is not connected to a slot of the host unit 230 and is not stored in the wafer cassette stocker 5, the host unit 230 causes the wafer transport device 8 to transport the semiconductor wafer 40 to be accessed, from the wafer stocker 3 to the cassetter 4, causes the cassetter 4 to assemble a wafer cassette 90 to be accessed, which includes the transported semiconductor wafer 40 to be accessed, and causes the wafer cassette transport device 9 to transport the assembled wafer cassette 90 to be accessed, to a slot of the host unit 230, and to connect it to the slot.

In this manner, in the storage system 1, the wafer cassette 90 assembled from the cassette case 80 and the semiconductor wafer 40 is connected to a slot of the host unit 230. As a result, the wafer cassette 90 connected to the slot of the host unit 230 can be used as a storage device accessible by the host unit 230. Therefore, the host unit 230 can read or write data from or to any semiconductor wafer 40 among the plurality of semiconductor wafers 40 managed in the storage system 1 simply by changing the wafer cassette 90 connected to a slot of the host unit 230 to another wafer cassette 90.

In the case of employing the configuration in which the host apparatus accesses a semiconductor wafer via a prober, when a semiconductor wafer that has once been removed from the prober is to be accessed again, this semiconductor wafer is placed back on the stage of the prober, and further, the alignment between the plurality of probe pins of the probe card and the plurality of electrodes of the semiconductor wafer need to be executed on the stage once again.

In this embodiment, when the wafer cassette 90 including the semiconductor wafer 40 to be accessed is stored in the wafer cassette stocker 5, there is no need to re-assemble the wafer cassette 90 including the semiconductor wafer 40 to be accessed. Therefore, as compared to the configuration in which the host apparatus accesses a semiconductor wafer via the prober, the time required until data can actually be read from or written to the semiconductor wafer 40 to be accessed can be reduced. As a result, it is possible to realize the storage system 1 suitable for processing large amounts of data required in the data center.

The wafer transport device 8 can transport semiconductor wafers 40 between the wafer stocker 3a and the wafer stocker 3b through the opening a1 and the opening b2. Furthermore, the wafer transport device 8 can transport semiconductor wafers 40 between the wafer stocker 3b and the cassetter 4 through the opening a2 and the opening b3. Thus, the semiconductor wafers 40 can be quickly transported from any wafer stocker 3 to the cassetter 4.

Further, the wafer cassette transport device 9 can transport wafer cassettes 90 between the cassetter 4 and the wafer cassette stocker 5 through the opening a3 and the opening b4. Furthermore, the wafer cassette transport device 9 can transport wafer cassettes 90 between the wafer cassette stocker 5 and the host computer 2 through the opening a4 and the opening b5. Therefore, the wafer cassettes 90 can be quickly transported among the cassetter 4, the wafer cassette stocker 5, and the host computer 2.

In this manner, the latency required until data can actually be read from or written to the semiconductor wafer 40 to be accessed can be shortened.

Further, the semiconductor wafer 40 to be accessed is transported between the cassetter 4 or wafer cassette stocker 5 and the host computer 2 while it is stored in the wafer cassette 90. With this operation, damage to the semiconductor wafer 40 during transport can be prevented.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A storage system comprising:
   a first stocker that is capable of storing a plurality of memory devices, each of the plurality of memory devices including a plurality of non-volatile memory chips;
   a mounter configured to mount at least one of the plurality of memory devices in a case;
   a second stocker that is capable of storing a case-mounted memory device, the case-mounted memory device including the case and the at least one of the plurality of memory devices mounted in the case;
   a host apparatus including at least one slot to which the case-mounted memory device is connectable, the host apparatus being configured to read or write data from or to the at least one of the plurality of memory devices included in the case-mounted memory device connected to the slot;
   a first transport device configured to transport the plurality of memory devices between the first stocker and the mounter; and
   a second transport device configured to transport the case-mounted memory device among the mounter, the second stocker, and the host apparatus, wherein
   the host apparatus is further configured to:
      determine a first memory device to be accessed among the plurality of memory devices;
      when a first case-mounted memory device, which is the case-mounted memory device that includes the first memory device, is connected to the slot of the host apparatus, execute reading or writing of data from or to the first memory device;
      when the first case-mounted memory device is not connected to the slot of the host apparatus and is stored in the second stocker, cause the second transport device to transport the first case-mounted memory device to the slot of the host apparatus, and to connect the first case-mounted memory device to the slot; and
      when the first case-mounted memory device is not connected to the slot of the host apparatus and is not stored in the second stocker, cause the first transport device to transport the first memory device from the first stocker to the mounter, cause the mounter to mount the transported first memory device in the case for assembling the first case-mounted memory device, and cause the second transport device to transport the first case-mounted memory device to the slot of the host apparatus, and to connect the first case-mounted memory device to the slot.

2. The storage system of claim 1, wherein
the host apparatus is configured to:
when the first case-mounted memory device that is connected to the slot is not recognized as a storage device,
cause the second transport device to remove the first case-mounted memory device from the slot and to reconnect the first case-mounted memory device to the slot.

3. The storage system of claim 1, wherein
the host apparatus is configured to:
manage a priority of each of the plurality of memory devices, and
control a location where each of the plurality of memory devices is present, based on the priority of each of the plurality of memory devices, such that the case-mounted memory device including a memory device having a priority of a first level is connected to the slot of the host apparatus, the case-mounted memory device including a memory device having a priority of a second level lower than the first level is stored in the second stocker, and a memory device having a priority of a third level lower than the second level is stored in the first stocker.

4. The storage system of claim 3, wherein
the host apparatus is configured to:
when the priority of a second memory device among the plurality of memory devices stored in the first stocker is raised from the third level to the second level,
cause the first transport device to transport the second memory device from the first stocker to the mounter,
cause the mounter to mount the transported second memory device in the case for assembling a second case-mounted memory device, and cause the second transport device to transport the second case-mounted memory device from the mounter to the second stocker.

5. The storage system of claim 1, wherein
the case includes a plug terminal, and
the host apparatus includes:
   a host case including the slot; and
   a receptacle terminal provided in the host case, which is connected to the plug terminal of the case when the case-mounted memory device is inserted to the slot.

6. The storage system of claim 1, wherein
the plurality of memory devices are a plurality of semiconductor wafers, respectively,
the first stocker is capable of storing the plurality of semiconductor wafers,
the case is a cassette case that is capable of accommodating at least one of the plurality of semiconductor wafers,
the mounter is configured to accommodate the at least one of the plurality of semiconductor wafers in the cassette case,
the second stocker is capable of storing a wafer cassette, the wafer cassette including the cassette case and the at least one of the plurality of semiconductor wafers accommodated in the cassette case,
the first transport device is configured to transport the plurality of semiconductor wafers between the first stocker and the mounter,
the second transport device is configured to transport the wafer cassette among the mounter, the second stocker, and the host apparatus,
the host apparatus includes the at least one slot to which the wafer cassette is connectable, and configured to read or write data from or to the at least one of the plurality of semiconductor wafers included in the wafer cassette connected to the slot, and
the host apparatus is configured to:
   determine a first semiconductor wafer to be accessed among the plurality of semiconductor wafers;
   when a first wafer cassette, which is the wafer cassette that includes the first semiconductor wafer, is connected to the slot of the host apparatus, execute reading or writing of data from or to the first semiconductor wafer;
   when the first wafer cassette is not connected to the slot of the host apparatus and is stored in the second stocker, cause the second transport device to transport the first wafer cassette to the slot of the host apparatus, and to connect the first wafer cassette to the slot; and
   when the first wafer cassette is not connected to the slot of the host apparatus and is not stored in the second stocker, cause the first transport device to transport the first semiconductor wafer from the first stocker to the mounter, cause the mounter to accommodate the transported first semiconductor wafer in the cassette case for assembling the first wafer cassette, and cause the second transport device to transport the first wafer cassette to the slot of the host apparatus, and to connect the first wafer cassette to the slot.

7. The storage system of claim 6, wherein
the host apparatus is configured to:
when the first wafer cassette that is connected to the slot is not recognized as a storage device,
cause the second transport device to remove the first wafer cassette from the slot and to reconnect the first wafer cassette to the slot.

8. The storage system of claim 6, wherein
the host apparatus is configured to:
manage a priority of each of the plurality of semiconductor wafers, and
control a location where each of the plurality of semiconductor wafers is present, based on the priority of each of the plurality of semiconductor wafers, such that the wafer cassette including a semiconductor wafer having a priority of a first level is connected to the slot of the host apparatus, the wafer cassette including a semiconductor wafer having a priority of a second level lower than the first level is stored in the second stocker, and a semiconductor wafer having a priority of a third level lower than the second level is stored in the first stocker.

9. The storage system of claim 8, wherein
the host apparatus is configured to:
when the priority of a second semiconductor wafer among the plurality of semiconductor wafers stored in the first stocker is raised from the third level to the second level,
   cause the first transport device to transport the second semiconductor wafer from the first stocker to the mounter,
   cause the mounter to accommodate the transported second semiconductor wafer in the cassette case for assembling a second wafer cassette, and
   cause the second transport device to transport the second wafer cassette from the mounter to the second stocker.

10. The storage system of claim 6, wherein
a plurality of electrodes are formed on each of the plurality of semiconductor wafers,
the cassette case includes:
   a lower case on which the at least one of the plurality of semiconductor wafers is capable of being placed;
   an upper case;
   a probe card including a plurality of probe pins contactable to the plurality of electrodes of the at least one of the plurality of semiconductor wafers placed on the lower case; and
   a controller configured to execute reading or writing of data from or to at least one of the plurality of nonvolatile memory chips through the probe card based on a read request or a write request received from the host apparatus, and
the mounter is configured to bring the plurality of electrodes and the plurality of probe pins into contact with each other by joining the upper case and the lower case on which the at least one of the plurality of semiconductor wafers is placed, to each other.

11. The storage system of claim 10, wherein
the lower case includes three or more centering arms, the three or more centering arms being arranged at equal intervals from each other along a circumference having a predetermined radius from a center of a wafer mounting region in the lower case, the three or more centering arms being movable toward the center of the wafer mounting region, and
the cassetter aligns a center of the at least one of the plurality of semiconductor wafers placed on the lower case with the center of the wafer mounting region by moving the three or more centering members toward the center of the wafer mounting region.

12. The storage system of claim 10, wherein
one of the upper case and the lower case includes a groove, and
the other of the upper case and the lower case includes a protruding portion that is to be fitted into the groove.

13. The storage system of claim 10, wherein
the upper case includes a plurality of protruding portions that abut a region on a surface of the at least one of the plurality of semiconductor wafers placed on the lower case when the upper case and the lower case are joined to each other, the region being a region other than the plurality of electrodes on the surface of the at least one of the plurality of semiconductor wafers.

14. The storage system of claim 10, wherein
the upper case include a cushion material that abuts a region on a surface of the at least one of the plurality of semiconductor wafers placed on the lower case and contracts when the upper case and the lower case are joined to each other, the region being a region other than the plurality of electrodes on the surface of the at least one of the plurality of semiconductor wafers,
each of the plurality of probe pins is connected to the probe card via a conductive elastic member, and
when the upper case and the lower case are joined together, each of the plurality of probe pins is contact with a corresponding electrode, and the conductive elastic member contracts.

15. The storage system of claim 10, wherein
in each of the plurality of semiconductor wafers stored in the first stocker, edge processing to uniformize diameters of the plurality of semiconductor wafers to a first length has been subjected.

16. The storage system of claim 6, wherein
the first stocker includes a first side plate having a first opening,
the mounter includes a second side plate opposing the first side plate of the first stocker, the second side plate having a second opening disposed in a position opposing the first opening, and
the first transport device is configured to transport the plurality of semiconductor wafers between the first stocker and the mounter through the first opening and the second opening.

17. The storage system of claim 16, wherein
the first transport device includes a first robot arm disposed in the first stocker and a second robot arm disposed in the mounter, and
each of the plurality of semiconductor wafers is configured to be passed between the first robot arm and the second robot arm through the first opening and the second opening.

18. The storage system of claim 16, wherein
the mounter includes a third side plate located on an opposite to the second side plate, and the third side plate having a third opening,
the second stocker includes a fourth side plate opposing the third side plate of the mounter and a fifth side plate located on an opposite side to the fourth side plate, the fourth side plate having a fourth opening located at a position opposing the third opening, and the fifth side plate having a fifth opening,
the host apparatus is included in a server rack, and the server rack including a sixth side plate opposing the fifth side plate of the second stocker, and the sixth side plate having a sixth opening located at a position opposing the fifth opening, and
the second transport device is configured to:
transport the wafer cassette between the mounter and the second stocker, through the third opening and the fourth opening; and
transport the wafer cassette between the second stocker and the server rack including the host apparatus, through the fifth opening and the sixth opening.

19. The storage system of claim 6, wherein
the cassette case includes a plug terminal, and
the host apparatus includes:
a host case including the slot; and
a receptacle terminal provided in the host case, which is connected to the plug terminal of the cassette case when the wafer cassette is inserted to the slot.

20. The storage system of claim 6, wherein
each of the plurality of semiconductor wafers includes a redistribution layer,
a plurality of electrodes included in the redistribution layer are electrically connected to a plurality of electrodes of the nonvolatile memory chip, respectively, by internal wiring in the redistribution layer,
a size of each of the plurality of electrodes included in the redistribution layer is larger than a size of each of the plurality of electrodes of the nonvolatile memory chip, and
an interval between each other of the plurality of electrodes included in the redistribution layer is wider than an interval between each other of the plurality of electrodes of the nonvolatile memory chip.

* * * * *